(12) United States Patent
Park et al.

(10) Patent No.: US 12,255,025 B2
(45) Date of Patent: Mar. 18, 2025

(54) MULTILAYER ELECTRONIC COMPONENT

(71) Applicant: SAMSUNG ELECTRO-MECHANICS CO., LTD., Suwon-si (KR)

(72) Inventors: YoonA Park, Suwon-si (KR); KangHa Lee, Suwon-si (KR); Myung Jun Park, Suwon-si (KR); WooKyung Sung, Suwon-si (KR); JinSoo Park, Suwon-si (KR); SoEun Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 68 days.

(21) Appl. No.: 17/943,605

(22) Filed: Sep. 13, 2022

(65) Prior Publication Data

US 2023/0215655 A1 Jul. 6, 2023

(30) Foreign Application Priority Data

Dec. 31, 2021 (KR) .......................... 10-2021-0193638

(51) Int. Cl.
*H01G 4/30* (2006.01)
*H01G 2/06* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01);
(Continued)

(58) Field of Classification Search
CPC .......... H01G 4/30; H01G 2/065; H01G 4/008; H01G 4/012; H01G 4/12; H01G 4/232; H01G 4/224
See application file for complete search history.

(56) References Cited

U.S. PATENT DOCUMENTS

| | | | |
|---|---|---|---|
| 10,361,035 B1* | 7/2019 | Song | H01G 4/1227 |
| 2009/0059471 A1* | 3/2009 | Fukuda | C04B 35/4682 |
| | | | 264/615 |

(Continued)

FOREIGN PATENT DOCUMENTS

| | | |
|---|---|---|
| JP | 2016-178219 A | 10/2016 |
| JP | 2021-015950 A | 2/2021 |

(Continued)

*Primary Examiner* — Michael P McFadden
(74) *Attorney, Agent, or Firm* — MORGAN, LEWIS & BOCKIUS LLP

(57) ABSTRACT

An electronic component includes: a body including a dielectric layer and internal electrodes, and including first to sixth surfaces; a first external electrode including a connection portion on the third surface, and first and third band portions respectively on the first and second surfaces; a second external electrode including a connection portion on the fourth surface, and second and fourth band portions respectively on the first and second surfaces; an insulating layer disposed on the connection portions, and covering the second surface and the third and fourth band portions; plating layers respectively disposed on the first and second band portions; and first and second additional electrode layers respectively disposed between the connection portion and the third surface and between the connection portion and the fourth surface. The first or second external electrode includes copper. The first or second additional electrode layer includes one of nickel and an alloy of nickel.

30 Claims, 23 Drawing Sheets

(51) Int. Cl.
   *H01G 4/008*   (2006.01)
   *H01G 4/012*   (2006.01)
   *H01G 4/12*    (2006.01)
   *H01G 4/224*   (2006.01)
   *H01G 4/232*   (2006.01)

(52) U.S. Cl.
   CPC .............. *H01G 4/12* (2013.01); *H01G 4/224* (2013.01); *H01G 4/232* (2013.01)

(56) References Cited

U.S. PATENT DOCUMENTS

| | | | |
|---|---|---|---|
| 2013/0020913 A1* | 1/2013 | Shirakawa | H01G 4/232 |
| | | | 336/200 |
| 2015/0022945 A1* | 1/2015 | Park | H01G 4/2325 |
| | | | 156/89.18 |
| 2015/0084487 A1* | 3/2015 | Mori | H01G 4/248 |
| | | | 336/200 |
| 2015/0223340 A1* | 8/2015 | Jung | H01G 4/008 |
| | | | 156/89.12 |
| 2016/0276104 A1 | 9/2016 | Nishisaka et al. | |
| 2016/0284471 A1* | 9/2016 | Mizuno | H01G 4/1227 |
| 2017/0154731 A1* | 6/2017 | Tahara | H01G 4/232 |
| 2017/0250028 A1* | 8/2017 | Makino | H01G 4/248 |
| 2017/0256359 A1* | 9/2017 | Masunari | H01G 4/005 |
| 2017/0323725 A1 | 11/2017 | Iso et al. | |
| 2018/0068795 A1 | 3/2018 | Park et al. | |
| 2019/0096583 A1* | 3/2019 | Sasaki | H01G 4/232 |
| 2021/0020377 A1 | 1/2021 | Kurosu et al. | |

FOREIGN PATENT DOCUMENTS

| | | |
|---|---|---|
| KR | 10-2017-0102919 A | 9/2017 |
| KR | 10-2018-0028237 A | 3/2018 |

\* cited by examiner

MULTILAYER ELECTRONIC COMPONENT

CROSS-REFERENCE TO RELATED APPLICATION(S)

This application claims benefit of priority to Korean Patent Application No. 10-2021-0193638 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on a printed circuit board of any of various electronic products, such as an imaging device such as a liquid crystal display (LCD) or a plasma display panel (PDP), a computer, a smartphone or a mobile phone, to serve to charge or discharge electricity therein or therefrom.

The MLCC may be used as a component of any of various electronic apparatuses because the MLCC is small, has high capacity, and is easily mounted.

In recent years, as the electronic product becomes small and multifunctional, there has been also increasing demand for the MLCC having higher integration and higher capacitance, which results in a minimized space between the MLCCs.

In addition, as the MLCC is used in an automobile or an infotainment system, there has been increasing demand for its higher reliability, higher strength characteristic and smaller size.

In order to have the smaller size and the higher capacitance, it may be necessary for the MLCC to have the increased number of stacks by including internal electrodes and dielectric layers made thinner, and to have increased effective volume fractions required to implement the capacitance by allowing a portion unrelated to capacitance formation to have a minimum volume.

In addition, it may be necessary to minimize a space in which the MLCC is mounted in order to mount as many components as possible in a limited area of a board.

In addition, the MLCC having the smaller size and the higher capacitance may have a margin made thinner, and thus be vulnerable to penetration of external moisture or penetration of a plating solution, thus having lower reliability. Accordingly, required is a need for a method for protecting the MLCC from the penetration of external moisture or the penetration of a plating solution.

SUMMARY

An aspect of the present disclosure may provide a multilayer electronic component having improved capacitance per unit volume.

Another aspect of the present disclosure may provide a multilayer electronic component having higher reliability.

Another aspect of the present disclosure may provide a multilayer electronic component which may be mounted in a minimal space.

However, the present disclosure is not limited to the description above, and may be more readily understood in the description of exemplary embodiments of the present disclosure.

According to an aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extended from the first connection portion onto a portion of the first surface, and a third band portion extended from the first connection portion onto a portion of the second surface; a second external electrode including a second connection portion disposed on the fourth surface, a second band portion extended from the second connection portion onto a portion of the first surface, and a fourth band portion extended from the second connection portion onto a portion of the second surface; an insulating layer disposed on the first and second connection portions, and covering the second surface and the third and fourth band portions; a first plating layer disposed on the first band portion; a second plating layer disposed on the second band portion; a first additional electrode layer disposed between the first connection portion and the third surface; and a second additional electrode layer disposed between the second connection portion and the fourth surface. The first or second external electrode may include copper (Cu), and the first or second additional electrode layer may include at least one of nickel (Ni) and an alloy of nickel (Ni).

According to another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extended from the first connection portion onto a portion of the first surface, and a third band portion extended from the first connection portion onto a portion of the second surface; a second external electrode including a second connection portion disposed on the fourth surface, a second band portion extended from the second connection portion onto a portion of the first surface, and a fourth band portion extended from the second connection portion onto a portion of the second surface; an insulating layer disposed on the first and second connection portions, and covering the second surface and the third and fourth band portions; a first plating layer disposed on the first band portion; and a second plating layer disposed on the second band portion. The first or second external electrode may include at least one of nickel (Ni) and an alloy of nickel (Ni), and $H1 \geq H2$ in which $H1$ indicates an average size of a region in the first direction, measured from the first surface to the internal electrode disposed closest to the first surface among the first and second internal electrodes, and $H2$ indicates an average size of the plating layer in the first direction, measured from an extension line of the first surface to an end of the plating layer disposed on the first or second connection portion.

According to another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extended from the first connection portion onto a portion of the first surface, and a third band portion extended from the first connection portion onto a portion of the second surface; a second external electrode including a second connection portion disposed on the fourth surface, a second band portion extended from the second connection portion onto a portion of the first surface, and a fourth band portion extended from the second connection portion onto a portion of the second surface; an insulating layer disposed on the first and second connection portions, and covering the second surface and the third and fourth band portions; a first plating layer disposed on the first band portion; and a second plating layer disposed on the second band portion. The first or second external electrode may include at least one of nickel (Ni) and an alloy of nickel (Ni), and no plating layer may be disposed on the third or fourth band portion.

According to another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extended from the first connection portion onto a portion of the first surface, and a third band portion extended from the first connection portion onto a portion of the second surface; a second external electrode including a second connection portion disposed on the fourth surface, a second band portion extended from the second connection portion onto a portion of the first surface, and a fourth band portion extended from the second connection portion onto a portion of the second surface; an insulating layer disposed on the first and second connection portions; a first plating layer disposed on the first band portion; and a second plating layer disposed on the second band portion. The first or second external electrode may include at least one of nickel (Ni) and an alloy of nickel (Ni), and the insulating layer may be extended to the second surface to cover ends of the third and fourth band portions.

According to another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and a first band portion extended from the first connection portion onto a portion of the first surface; a second external electrode including a second connection portion disposed on the fourth surface and a second band portion extended from the second connection portion onto a portion of the first surface; an insulating layer disposed on the first and second connection portions, and covering the second surface and the third and fourth band portions; a first plating layer disposed on the first band portion; and a second plating layer disposed on the second band portion. The first or second external electrode may include at least one of nickel (Ni) and an alloy of nickel (Ni), and the first or second external electrode may be disposed below an extension line of the second surface.

According to another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extended from the first connection portion onto a portion of the first surface, and a first corner portion extended from the first connection portion onto a corner connecting the second and third surfaces to each other; a second external electrode including a second connection portion disposed on the fourth surface, a second band portion extended from the second connection portion onto a portion of the first surface, and a second corner portion extended from the second connection portion onto a corner connecting the second and fourth surfaces to each other; an insulating layer disposed on the first and second connection portions, and covering the second surface and the first and second corner portions; a first plating layer disposed on the first band portion; a second plating layer disposed on the second band portion; a first additional electrode layer disposed between the first connection portion and the third surface; and a second additional electrode layer disposed between the second connection portion and the fourth surface. B3≤G1 and B4≤G2 in which B3 indicates an average size of the first corner portion in the second direction, measured from an extension line of the third surface to an end of the first corner portion, B4 indicates an average size of the second corner portion in the second direction, measured from an extension line of the fourth surface to an end of the second corner portion, G1 indicates an average size of a region in the second direction, where the third surface and the second internal electrode are spaced apart from each other, and G2 indicates an average size of a region in the second direction, where the fourth surface and the first internal electrode are spaced apart from each other. The first or second external electrode may include copper (Cu), and the first or second additional electrode layer may include at least one of nickel (Ni) and an alloy of nickel (Ni).

According to another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection electrode disposed on the third surface and a first band electrode disposed on the first surface and connected to the first connection electrode; a second external electrode including a second connection electrode disposed on the fourth surface and a second band electrode disposed on the first surface and connected to the second connection electrode; a first insulating layer disposed on the first connection electrode; a second insulating layer disposed on the second connection electrode; a first plating layer disposed on the first band electrode; a second plating layer disposed on the second band electrode; a first additional electrode layer disposed between the first connection electrode and the third surface, and a second additional electrode layer disposed between the second connection electrode and the fourth surface. The first or second connection electrode may include copper (Cu), and the first or second additional electrode layer may include at least one of nickel (Ni) and an alloy of nickel (Ni).

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
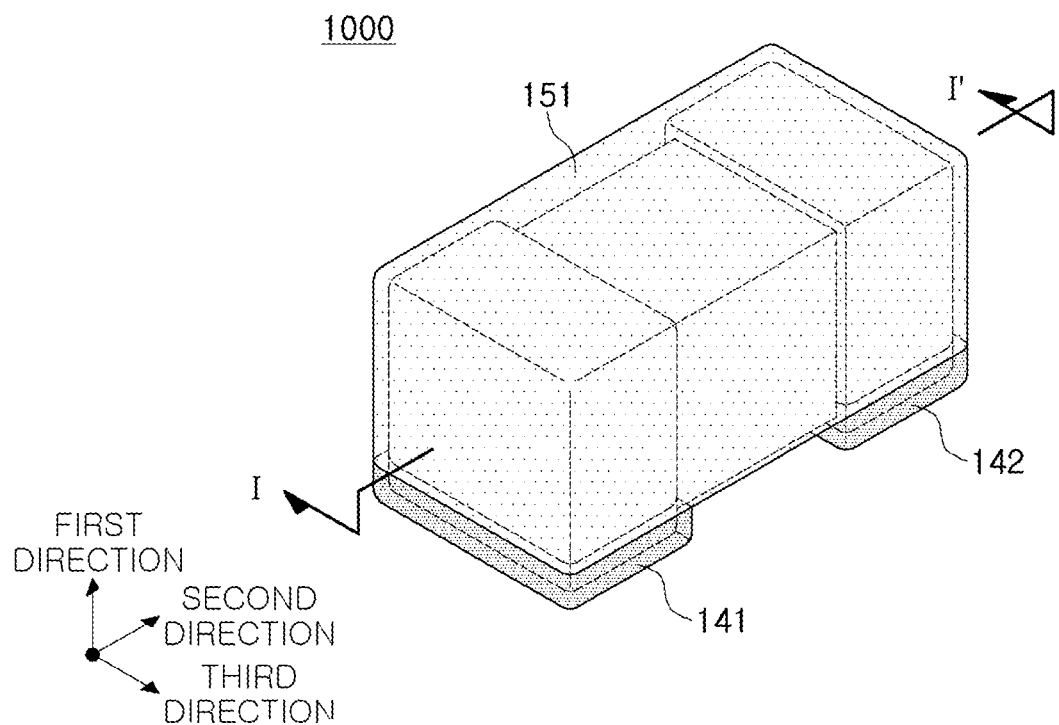
FIG. 1 is a perspective view schematically illustrating a multilayer electronic component according to another exemplary embodiment of the present disclosure.
Figure 2:
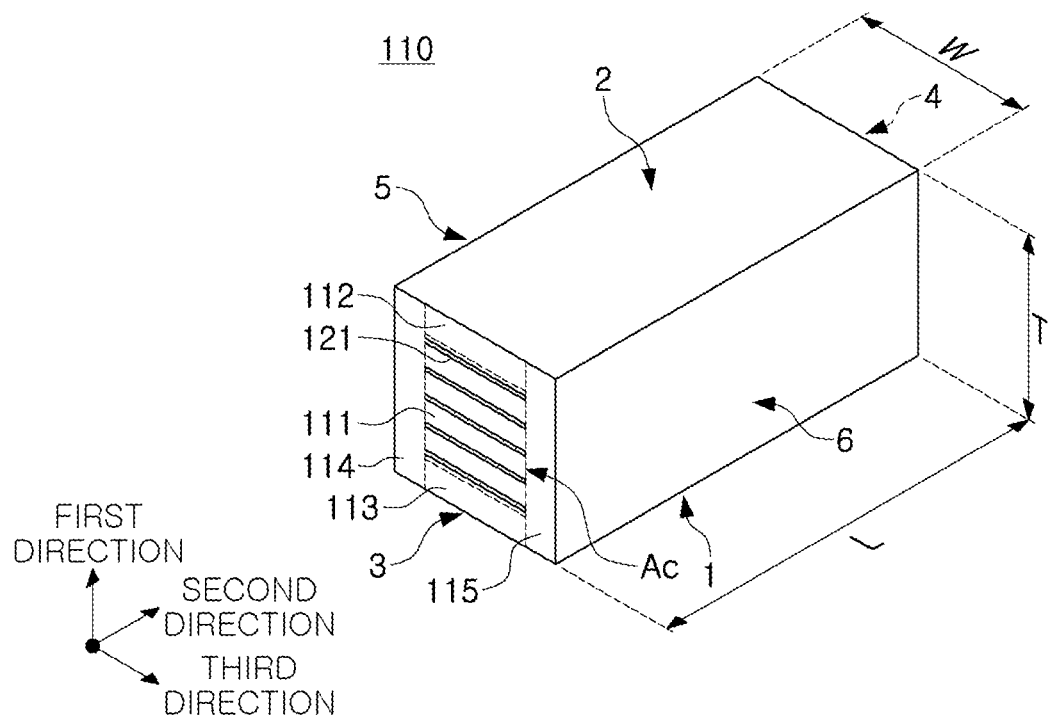
FIG. 2 is a perspective view schematically illustrating a body of the multilayer electronic component of FIG. 1.

Hereinafter, exemplary embodiments of the present disclosure will now be described in detail with reference to the accompanying drawings.

In the drawings, a first direction may indicate a thickness (T) direction, a second direction may indicate a length (L) direction, and a third direction may indicate a width (W) direction.

Hereinafter, a multilayer electronic component 1000 according to an exemplary embodiment of the present disclosure is described with reference to FIGS. 1 through 5.

The multilayer electronic component 1000 according to another exemplary embodiment of the present disclosure may include: a body 110 including a dielectric layer 111 and first and second internal electrodes 121 and 122 alternately disposed while having the dielectric layer interposed therebetween, and including first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; a first external electrode 131 including a first connection portion 131*a* disposed on the third surface, a first band portion 131*b* extended from the first connection portion 131*a* onto a portion of the first surface 1, and a third band portion 131*c* extended from the first connection portion 131*a* onto a portion of the second surface 2; a second external electrode 132 including a second connection portion 132*a* disposed on the fourth surface, a second band portion 132*b* extended from the second connection portion 132*a* onto a portion of the first surface 1, and a fourth band portion 132*c* extended from the second connection portion 132*a* onto a portion of the second surface 2; an insulating layer 151 disposed on the first and second connection portions 131*a* and 132*a*, and covering the third and fourth band portions 131*c* and 132*c*; a first plating layer 141 disposed on the first band portion 131*b*; and a second plating layer 142 disposed on the second band portion 132*b*.

The body 110 may include the dielectric layer 111 and the internal electrode 121 or 122, which are alternately stacked on each other.

The body 110 is not limited to a particular shape, and may have a hexahedral shape or a shape similar to the hexahedral shape, as shown in the drawings. The body 110 may not have the hexahedral shape having perfectly straight lines due to contraction of ceramic powder particles included in the body 110 in a sintering process, the body 110 may have substantially the hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

In another exemplary embodiment, the body 110 may have a 1-3 corner connecting the first and third surfaces 1 and 3 to each other, a 1-4 corner connecting the first and fourth surfaces 1 and 4 to each other, a 2-3 corner connecting the second and third surfaces 2 and 3 to each other, and a 2-4 corner connecting the second surface 2 and the fourth surface 4 to each other. The 1-3 corner and the 1-4 corner may be contracted toward a center of the body in the first direction as being closer to the third surface 3, and the 2-3 corner and the 2-4 corner may be contracted toward the center of the body in the first direction as being closer to the fourth surface 4.

Margin regions in which none of the internal electrodes 121 and 122 is disposed may overlap each other on the dielectric layer 111, and a step difference may thus occur due to thicknesses of the internal electrodes 121 and 122. Accordingly, the corners connecting the first surface and the third to sixth surfaces to each other and/or the corners connecting the second surface and the third to the fifth surfaces to each other may be contracted toward the center of the body 110 in the first direction, based on the first surface or the second surface. Alternatively, due to a contraction phenomenon in the sintering process of the body, the corners connecting the first surface 1 and the third to sixth surfaces 3, 4, 5 and 6 to each other and/or the corners connecting the second surface 2 and the third to the sixth surfaces 3, 4, 5 and 6 to each other may be contracted toward the center of the body 110 in the first direction, based on the first surface or the second surface. Alternatively, a separate process may be performed to round the corners connecting respective surfaces of the body 110 to each other in order to prevent a chipping defect or the like, and the corners connecting the first and third to sixth surfaces to each other and/or the corners connecting the second surface and the third to sixth surfaces to each other may thus each have a round shape.

The corners may include the 1-3 corner connecting the first surface 1 and the third surface 3 to each other, the 1-4 corner connecting the first surface 1 and the fourth surface 4 to each other, the 2-3 corner connecting the second surface 2 and the third surface 3 to each other, and the 2-4 corner connecting the second surface 2 and the fourth surface 4 to each other. In addition, the corners may include a 1-5 corner connecting the first surface 1 and the fifth surface 5 to each other, a 1-6 corner connecting the first surface 1 and the sixth surface 6 to each other, a 2-5 corner connecting the second surface 2 and the fifth surface 5 to each other, and a 2-6 corner connecting the second surface 2 and the sixth surface 6 to each other. However, in order to suppress the step difference caused by the internal electrodes 121 and 122, the internal electrodes may be stacked on each other and then cut to be exposed to the fifth and sixth surfaces 5 and 6 of the body, and one dielectric layer or two or more dielectric layers may be stacked on both sides of a capacitance formation portion Ac in the third direction (i.e., the width direction) to form margin portions 114 and 115. In this case, the corner connecting the first surface 1 and the fifth or sixth surface 5 or 6 to each other and the corner connecting the second surface 2 and the fifth or sixth surface 5 or 6 to each other may not be contracted.

Meanwhile, the first to sixth surfaces 1 to 6 of the body 110 may generally be flat surfaces, and non-flat regions may be the corners. Hereinafter, an extension line of each surface may indicate a line extended based on a flat portion of each surface.

The plurality of dielectric layers 111 included in the body 110 may be in a sintered state, and adjacent dielectric layers 111 may be integrated with each other so that boundaries therebetween are not readily apparent without using a scanning electron microscope (SEM).

According to another exemplary embodiment of the present disclosure, a raw material of the dielectric layer 111 is not particularly limited as long as sufficient capacitance is obtained from the raw material. For example, the dielectric layer may use a material such as a barium titanate-based material, a lead composite perovskite-based material or a strontium titanate-based material. The barium titanate-based material may include barium titanate ($BaTiO_3$) based ceramic powder particles, and the ceramic powder particles may be, for example, $BaTiO_3$ or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$), in which calcium (Ca), zirconium (Zr) or the like is partially dissolved in $BaTiO_3$.

In addition, the raw material of the dielectric layer 111 may be prepared by adding various ceramic additives, organic solvents, binders, dispersing agents and the like, to the powder particles such as the barium titanate ($BaTiO_3$) powder particles, based on an object of the present disclosure.

Meanwhile, an average thickness td of the dielectric layer 111 may not need to be particularly limited.

However, the multilayer electronic component may generally have lower reliability when the dielectric layer has a small thickness of less than 0.6 μm, in particular, when the dielectric layer has a thickness of 0.35 μm or less.

The multilayer electronic component according to another exemplary embodiment of the present disclosure may include the insulating layer disposed on the connection portion of the external electrode, and the plating layer disposed on the band portion of the external electrode to prevent penetration of external moisture, penetration of a plating solution or the like, thereby having higher reliability and thus ensuring excellent reliability even when the dielectric layer 111 has the average thickness of 0.35 μm or less.

Therefore, when the dielectric layer 111 has the average thickness of 0.35 μm or less, the multilayer electronic component according to the present disclosure may reveal more significantly improved reliability.

The average thickness td of the dielectric layer 111 may indicate an average thickness of the dielectric layer 111 disposed between the first and second internal electrodes 121 and 122.

The average thickness of the dielectric layer 111 may be measured by scanning an image of a cross section of the body 110 in a length-thickness (L-T) direction by using the scanning electron microscope (SEM) with a magnification of 10,000. In more detail, an average value of the dielectric layer may be measured by measuring a thickness of one dielectric layer at thirty equally spaced points in the length direction in the scanned image. The thirty equally spaced points may be designated in the capacitance formation part Ac. In addition, when an average thickness of ten or more dielectric layers is measured, the average thickness of the dielectric layers may further be generalized.

The body 110 may further include the capacitance formation portion Ac disposed in the body 110, and forming capacitance of the capacitor by including the first and second internal electrodes 121 and 122 disposed to oppose each other while having the dielectric layer 111 interposed therebetween, and include cover portions 112 and 113 disposed on the upper and lower surfaces of the capacitance formation portion Ac in the first direction.

In addition, the capacitance formation portion Ac may be a portion contributing to forming the capacitance of the capacitor, and formed by repeatedly stacking the plurality of first and second internal electrodes 121 and 122 on each other while having the dielectric layer 111 interposed therebetween.

The cover portions 112 and 113 may include the upper cover portion 112 disposed on the upper surface of the capacitance formation portion Ac in the first direction and the lower cover portion 113 disposed on the lower surface of the capacitance formation portion Ac in the first direction.

The upper cover portion 112 and the lower cover portion 113 may be formed by stacking one dielectric layer or two or more dielectric layers on the upper and lower surfaces of the capacitance formation portion Ac in the thickness direction, respectively, and may basically serve to prevent damage to the internal electrodes, caused by physical or chemical stress.

The upper and lower cover portions 112 and 113 may include no internal electrode and may include the same material as the dielectric layer 111.

That is, the upper and lower cover portions 112 and 113 may include a ceramic material such as a barium titanate ($BaTiO_3$)-based ceramic material.

Meanwhile, an average thickness of the cover portion 112 or 113 may not need to be particularly limited. However, 15 μm or less may be an average thickness tc of the cover portion 112 or 113 in order for the multilayer electronic component to more easily have a smaller size and higher capacitance. In addition, the multilayer electronic component according to another exemplary embodiment of the present disclosure may include the insulating layer disposed on the connection portion of the external electrode, and the plating layer disposed on the band portion of the external electrode to prevent the penetration of the external moisture, the penetration of the plating solution or the like, thereby having the higher reliability and thus ensuring the excellent reliability even when the cover portion 112 or 113 has an average thickness of 15 μm or less.

The average thickness tc of the cover portion 112 or 113 may indicate its size in the first direction, and may have a value obtained by averaging the sizes of the cover portions 112 and 113 in the first direction, measured at five equally spaced points on upper and lower surfaces of the capacitance formation portion Ac.

In addition, the margin portions 114 and 115 may each be disposed on a side surface of the capacitance formation portion Ac.

The margin portions 114 and 115 may be the first margin portion 114 disposed on the fifth surface 5 of the body 110 and the second margin portion 115 disposed on the sixth surface 6 of the body 110. That is, the margin portion 114 or 115 may be disposed on an end surface of the body 110 in the width direction.

Figure 3:
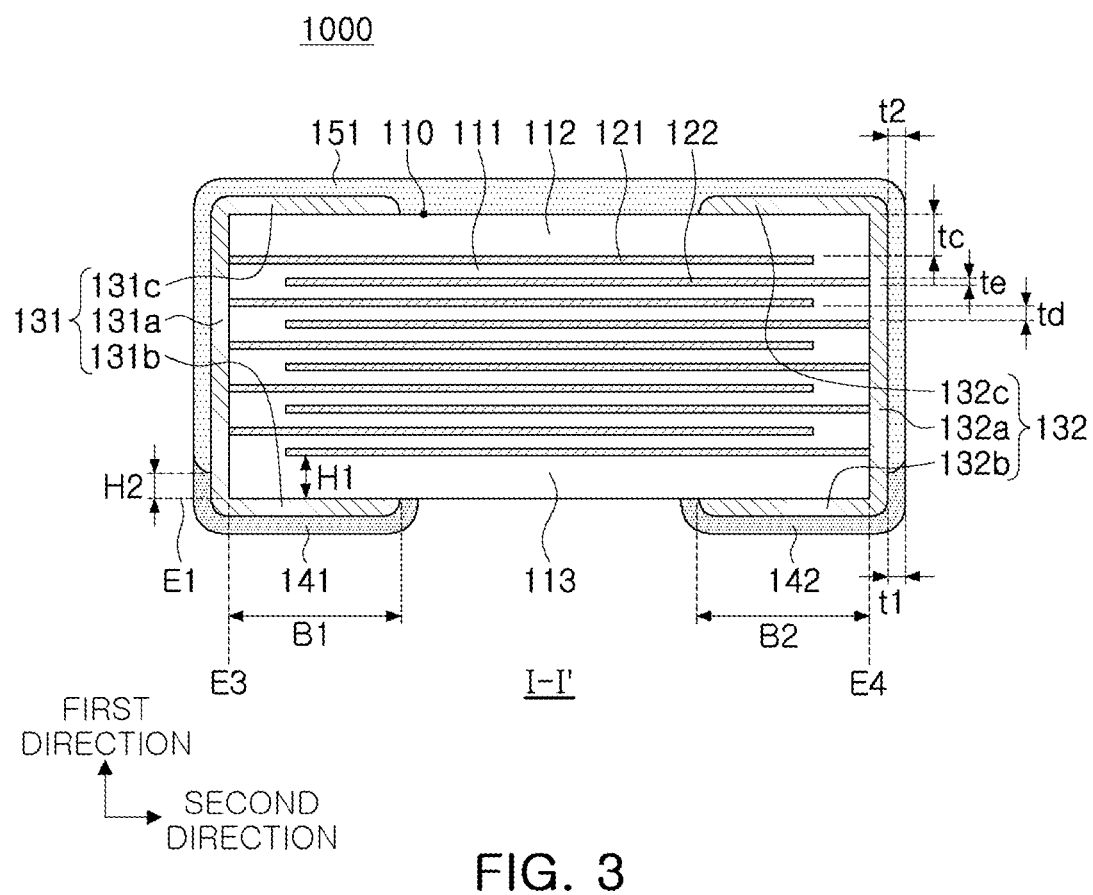
FIG. 3 is a cross-sectional view taken along line I-I' of FIG. 1.
Figure 4:
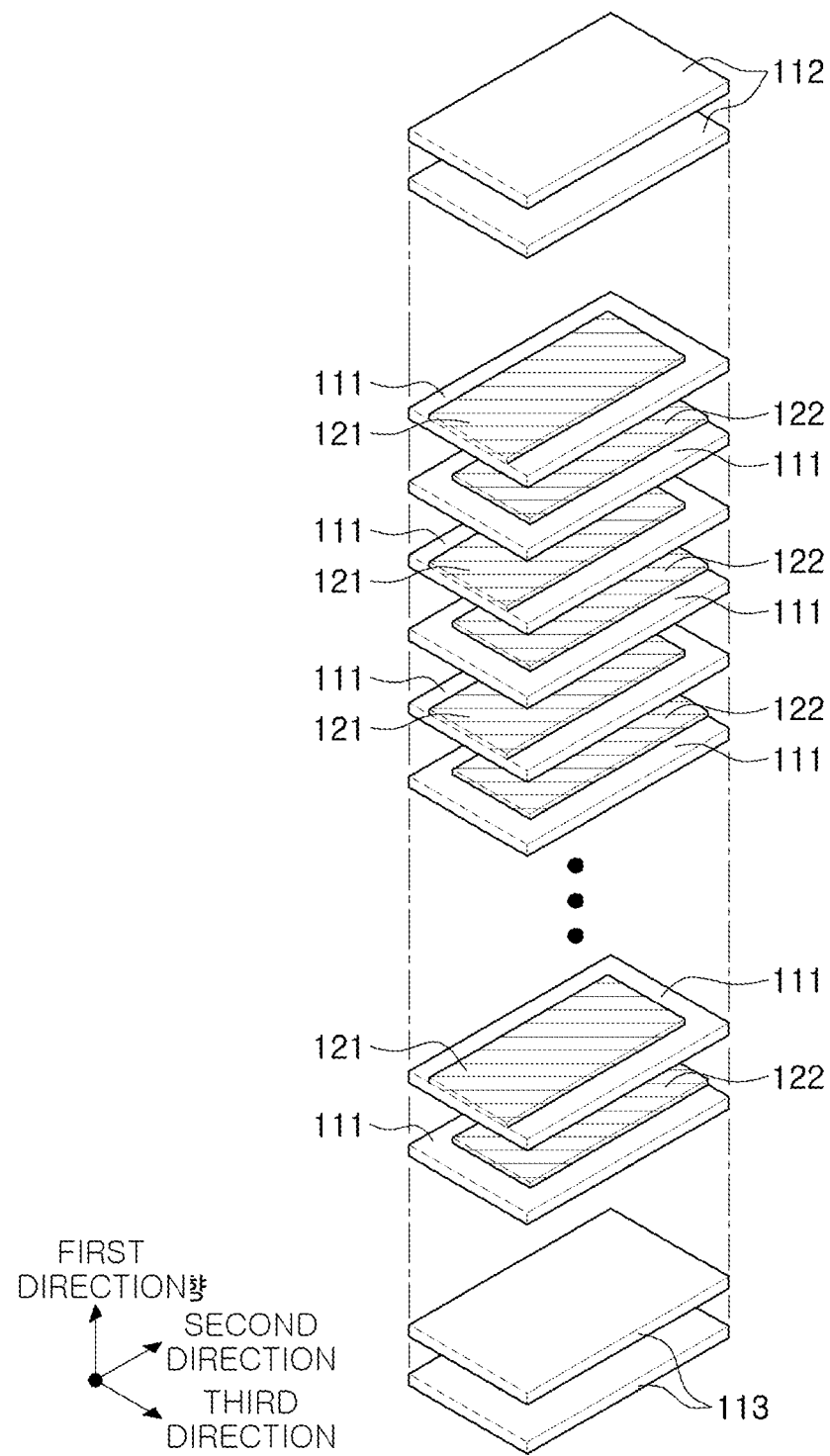
FIG. 4 is an exploded perspective view schematically illustrating an exploded body of FIG. 2.

As shown in FIG. 3, the margin portions 114 and 115 may each indicate a region between either end of the first and second internal electrodes 1 and 122 and a boundary surface of the body 110, based on a cross section of the body 110 cut in a width-thickness (W-T) direction.

The margin portions 114 and 115 may basically serve to prevent the damage to the internal electrode, caused by the physical or chemical stress.

The margin portions 114 and 115 may be formed by forming the internal electrode by applying a conductive paste on a ceramic green sheet except its portion where the margin portion is to be positioned.

Alternatively, in order to suppress the step difference occurring due to the internal electrode 121 or 122, the margin portion 114 or 115 may be formed by stacking the internal electrodes on each other, then cutting the internal electrodes to be exposed to the fifth and sixth surfaces 5 and 6 of the body, and then stacking one dielectric layer or two or more dielectric layers on both the sides of the capacitance formation portion Ac in the third direction (i.e., the width direction).

Meanwhile, an average thickness of the cover portion 114 or 115 may not need to be particularly limited. However, 15 μm or less may be the average thickness of the cover portion 114 or 115 in order for the multilayer electronic component to more easily have the smaller size and the higher capacitance. In addition, the multilayer electronic component according to another exemplary embodiment of the present disclosure may include the insulating layer disposed on the connection portion of the external electrode, and the plating layer disposed on the band portion of the external electrode to prevent the penetration of the external moisture, the penetration of the plating solution or the like, thereby having the higher reliability and thus ensuring the excellent reliability even when the margin portion 114 or 115 has an average width of 15 µm or less.

The average width of the margin portion 114 or 115 may indicate its size in the third direction, and may have a value obtained by averaging the sizes of the cover portions 112 and 113 in the third direction, measured at five equally spaced points on the side of the capacitance formation portion Ac.

The internal electrodes 121 and 122 may be alternately stacked on each other while having the dielectric layer 111 interposed therebetween.

The internal electrodes 121 and 122 may be the first internal electrode 121 and the second internal electrode 122. The first and second internal electrodes 121 and 122 may be alternately disposed to oppose each other while having the dielectric layer 111, included in the body 110, interposed therebetween, and may respectively be exposed to the third and fourth surfaces 3 and 4 of the body 110.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body to be connected to the first internal electrode 121, and the second external electrode 132 may be disposed on the fourth surface 4 of the body to be connected to the internal electrode 122.

That is, the first internal electrode 121 may not be connected to the second external electrode 132 and connected to the first external electrode 131, and the second internal electrode 122 may not be connected to the first external electrode 131 and connected to the second external electrode 132. Accordingly, the first internal electrode 121 may be spaced apart from the fourth surface 4 by a predetermined distance, and the second internal electrode 122 may be spaced apart from the third surface 3 by the predetermined distance.

Here, the first and second internal electrodes 1 and 122 may be electrically separated from each other by the dielectric layer 111 interposed therebetween.

The body 110 may be formed by alternately stacking a ceramic green sheet on which the first internal electrode 121 is printed and a ceramic green sheet on which the second internal electrode 122 is printed on each other and then sintering the same.

The material for forming the internal electrodes 121 and 122 is not particularly limited, and may be a material having excellent electrical conductivity. For example, the internal electrode 121 or 122 may include at least one of nickel (Ni), copper (Cu), palladium (Pd), silver (Ag), gold (Au), platinum (Pt), tin (Sn), tungsten (W), titanium (Ti) and alloys thereof.

In addition, the internal electrodes 121 and 122 may be formed by printing, on the ceramic green sheet, a conductive paste for internal electrodes including at least one of nickel (Ni), copper (Cu), palladium (Pd), silver (Ag), gold (Au), platinum (Pt), tin (Sn), tungsten (W), titanium (Ti) and alloys thereof. A method of printing the conductive paste for the internal electrodes may be a screen-printing method, the gravure printing method or the like, and the present disclosure is not limited thereto.

Meanwhile, an average thickness te of the internal electrode 121 or 122 may not need to be particularly limited.

However, the multilayer electronic component may generally have lower reliability when the internal electrode has a small thickness of less than 0.6 µm, in particular, when the internal electrode has a thickness of 0.35 µm or less.

The multilayer electronic component according to another exemplary embodiment of the present disclosure may include the insulating layer disposed on the connection portion of the external electrode, and the plating layer disposed on the band portion of the external electrode to prevent the penetration of the external moisture, the penetration of the plating solution or the like, thereby having the higher reliability and thus ensuring the excellent reliability even when the internal electrode 121 or 122 has the average thickness of 0.35 µm or less.

Therefore, when the internal electrode 121 or 122 has the average thickness of 0.35 µm or less, the multilayer ceramic electronic component according to the present disclosure may have the more remarkably improved reliability, and may thus more easily have the smaller size and the higher capacitance.

The average thickness te of the internal electrode 121 or 122 may indicate the average thickness of the internal electrode 121 or 122.

The average thickness of the internal electrode 121 or 122 may be measured by scanning an image of the cross section of the body 110 in the length-thickness (L-T) direction by using the scanning electron microscope (SEM) with a magnification of 10,000. In more detail, the average value of the internal electrode may be measured by measuring a thickness of one internal electrode at thirty equally spaced points in the length direction in the scanned image. The thirty equally spaced points may be designated in the capacitance formation part Ac. In addition, it is possible to obtain the more general average thickness of the internal electrode when measuring its average value by extending a measurement target of the average value to ten internal electrodes.

The external electrodes 131 and 132 may respectively be disposed on the third surface 3 and fourth surface 4 of the body 110. The external electrodes 131 and 132 may be the first and second external electrodes 131 and 132 respectively disposed on the third and fourth surfaces 3 and 4 of the body 110, and respectively connected to the first and second internal electrodes 121 and 122.

The external electrodes 131 and 132 may be the first external electrode 131 including the first connection portion 131*a* disposed on the third surface 3 and the first band portion 131*b* extended from the first connection portion 131*a* onto a portion of the first surface 1, and the second external electrode 132 including the second connection portion 132*a* disposed on the fourth surface 4 and the second band portion 132*b* extended from the second connection portion 132*a* onto a portion of the first surface 1. The first connection portion 131*a* may be connected to the first internal electrode 121 on the third surface 3, and the second connection portion 132*a* may be connected to the second internal electrode 122 on the fourth surface 4.

In addition, the first external electrode 131 may include the third band portion 131*c* extended from the first connection portion 131*a* to a portion of the second surface 2, and the second external electrode 132 may include the fourth band portion 132*c* extended from the second connection portion 132*a* to a portion of the second surface 2. Further, the first external electrode 131 may include a first side band portion extended from the first connection portion 131*a* to portions of the fifth and sixth surfaces 5 and 6, and the second external electrode 132 may include a second side band portion extended from the second connection portion 132*a* to portions of the fifth and sixth surfaces 5 and 6. The first or second external electrode 131 or 132 may not be disposed on the second surface 2 or may not be disposed on the fifth or sixth surface 5 or 6. As the first or second external electrode 131 or 132 is not disposed on the second surface, the first or second external electrode 131 or 132 may be disposed below the extension line of the second surface 2 of the body 110. In addition, the first or second connection portion 131a or 132a may be spaced apart from the fifth and sixth surfaces 5 and 6, and the first or second connection portion 131a or 132a may be spaced apart from the second surface 2. In addition, the first or second band portion 131b or 132b may also be spaced apart from the fifth and sixth surfaces 5 and 6.

Meanwhile, the drawings show that the insulating layer is disposed on the third or fourth band portion 131c or 132c when the first or second external electrode 131 and 132 includes the third or fourth band portion 131c or 132c. However, the present disclosure is not limited thereto, and the plating layer may be disposed on the third or fourth band portion 131c or 132c for the multilayer electronic component to be more easily mounted on the board. In addition, the first and second external electrodes 131 and 132 may respectively include the third and fourth band portions 131c and 132c, and may not include the side band portions. In this case, the first and second connection portions 131a and 132a, and the first to fourth band portions 131b, 132b, 131c and 132c may be spaced apart from the fifth and sixth surfaces 5 and 6.

This exemplary embodiment describes that the multilayer ceramic electronic component 1000 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity such as metal, may use a specific material determined in consideration of an electrical characteristic, structural stability or the like, and may have a multilayer structure.

The external electrode 131 or 132 may be a fired electrode including conductive metal and glass, or a resin-based electrode including the conductive metal and resin.

In addition, the electrode layer 131a or 132a may be made by sequentially forming the fired electrode and the resin-based electrode on the body. In addition, the external electrode 131 or 132 may be formed by transferring a sheet including the conductive metal to the body or by transferring the sheet including the conductive metal to the fired electrode.

The conductive metal included in the external electrode 131 or 132 may use the material having excellent electrical conductivity, and is not particularly limited. For example, the conductive metal may be at least one of copper (Cu), nickel (Ni), palladium (Pd), silver (Ag), tin (Sn), chromium (Cr) and alloys thereof. The external electrode 131 or 132 may include at least one of nickel (Ni) and an alloy of nickel (Ni), thereby further improving its connectivity with the internal electrode 121 or 122 including nickel (Ni).

The insulating layer 151 may be disposed on the first and second connection portions 131a and 132a.

The first or second connection portion 131a or 132a may be a portion connected to the internal electrode 121 or 122, and thus be a pathway for the penetration of the plating solution in a plating process or the penetration of the moisture when the multilayer electronic component is actually used. In the present disclosure, the insulating layer 151 may be disposed on the connection portions 131a and 132a, thereby preventing the penetration of the external moisture or the penetration of the plating solution.

The insulating layer 151 may be in contact with the first and second plating layers 141 and 142. Here, the insulating layer 151 may be in contact with the first and second plating layers 141 and 142 to partially cover the ends thereof, or the first and second plating layers 141 and 142 may be in contact with the insulating layer 151 to partially cover the end thereof.

The insulating layer 151 may be disposed on the first and second connection portions 131a and 132a, and may cover the second surface and the third and fourth band portions 131c and 132c. Here, the insulating layer 151 may cover a region of the second surface, where the third and fourth band portions 131c and 132c are not disposed, and the third and fourth band portions 131c and 132c. Accordingly, the insulating layer 151 may cover a region where an end of the third or fourth band portion 131c or 132c and the body 110 are in contact with each other to prevent the pathway for the penetration of the moisture, thereby further improving moisture resistance reliability of the multilayer electronic component.

The insulating layer 151 may be disposed on the first and second connection portions 131a and 132a and extended to the second surface to cover the ends of the third and fourth band portions 131c and 132c. That is, the insulating layer 151 may not completely cover the entire second surface 2 of the body 110. However, the insulating layer 151 may cover all the regions where the third and fourth band portions 131c and 132c are disposed on the second surface 2. In particular, the insulating layer may cover the ends of the third and fourth band portions 131c and 132c positioned on the second surface 2. Accordingly, the insulating layer 151 may seal a gap between the third or fourth band portion 131c or 132c and the body, thereby improving airtightness of the multilayer electronic component 1000.

The insulating layer 151 may be disposed on the second surface and extended to the first and second connection portions 131a and 132a. In addition, the insulating layer 151 may cover the entire second surface 2 when none of the external electrodes 131 and 132 is disposed on the second surface 2. Meanwhile, the insulating layer 151 may not be necessarily disposed on the second surface 2, the insulating layer 151 may not be disposed on the partial or entire second surface 2, and the insulating layer 151 may be separated into two layers and disposed on each of the first and second connection portions 131a and 132a. The insulating layer 151 may be disposed below the extension line of the second surface 2 when not disposed on the entire second surface 2. In addition, even when not disposed on the second surface 2, the insulating layer 151 may be disposed on the first and second connection portions 131a and 132a extended to the fifth and sixth surfaces 5 and 6 to be a single insulating layer.

Further, the insulating layer 151 may cover the first and second side band portions and the partial fifth and sixth surfaces 5 and 6. Here, portions of the fifth and sixth surfaces 5 and 6, which are not covered by the insulating layer 151, may be externally exposed.

In addition, the insulating layer 151 may cover the first and second side band portions and the entire fifth and sixth surfaces 5 and 6. In this case, none of the fifth and sixth surfaces may be externally exposed to improve the moisture resistance reliability, and none of the connection portions 131a and 132a may be directly and externally exposed to improve the reliability of the multilayer electronic component 1000. In more detail, the insulating layer 151 may cover both the first and second side band portions, and cover all regions of the fifth and sixth surfaces 5 and 6 except for regions where the first and second side band portions are formed.

The insulating layer 151 may serve to prevent the plating layers 141 and 142 from being formed on the external electrodes 131 and 132 on which the insulating layer 151 is disposed, and improve a sealing characteristic to minimize the penetration of the external moisture, plating solution or the like.

A material included in the insulating layer 151 may not need to be particularly limited, and the insulating layer 151 may have an electrical insulation property by including an insulation material. For example, the insulation material included in the insulating layer 151 may be one or more selected from epoxy resin, acrylic resin, ethyl cellulose or the like, or glass. In more detail, the material included in the insulating layer 151 may be a glass material having excellent resistance to the plating solution and a mole fraction of silicon (Si) of 20 mol % or more and 65 mol % or less. In an exemplary embodiment, the multilayer electronic component 1000 may include the insulating layer 151 including glass and then be mounted on the board. In this case, it is possible to prevent a crack from occurring in the multilayer electronic component 1000 due to its thermal contraction which may occur in a solder reflow process.

Meanwhile, a temperature for firing the glass may be high when the insulating layer 151 includes glass, and thermal stress may thus be induced in the multilayer electronic component in a process of forming the insulating layer 151. In addition, a radiation cracking may be induced by diffusion of nickel (Ni) to the internal electrode when the external electrode 131 or 132 includes copper (Cu).

According to the multilayer electronic component 1000 according to an exemplary embodiment of the present disclosure, the external electrode 131 or 132 may include at least one of nickel (Ni) and an alloy of nickel (Ni), thereby effectively suppressing the occurrence and propagation of the radiation cracking; and according to a multilayer electronic component 1000' (shown in FIGS. 6 and 7) according to another exemplary embodiment of the present disclosure, a first or second additional electrode layer 134 or 135 including at least one of nickel (Ni) and the alloy of nickel (Ni) may be disposed between an external electrode 131' or 132', including copper (Cu), and the third or fourth surface, thereby effectively suppressing the occurrence and propagation of the radiation cracking. It is thus possible to more remarkably suppress the occurrence and propagation of the radiation cracking when the insulating layer 151 includes glass.

A method of forming the insulating layer 151 may not need to be particularly limited. For example, the external electrodes 131 and 132 may be formed on the body 110 and the insulating layer 151 may then be made by applying a paste including glass powder to the external electrodes or by dipping the external electrodes into the paste including glass and then heat-treating the same.

The first and second plating layers 141 and 142 may respectively be disposed on the first and second band portions 131b and 132b. The plating layers 141 and 142 may allow the multilayer electronic component to be more easily mounted on the board, be disposed on the first and second band portions 131b and 132b to minimize a space in which the multilayer electronic component is mounted, and minimize the penetration of the plating solution to the internal electrode, thereby improving the reliability of the multilayer electronic component. One end of the first and second plating layer 141 or 142 may be in contact with the first surface 1, and the other end thereof may be in contact with the insulating layer 151.

Meanwhile, the plating layer 141 or 142 may not be disposed on the third or fourth band portion 131c or 132c. Accordingly, it is possible to minimize a volume of the plating layer 141 or 142, thereby increasing the capacitance of the multilayer electronic component 1000 per unit volume.

The plating layer 141 or 142 is not limited to a particular type, may include at least one of copper (Cu), nickel (Ni), tin (Sn), silver (Ag), gold (Au), palladium (Pd) and alloys thereof, or may include the plurality of layers.

As a more specific example of the plating layer 241 or 242, the plating layer 241 or 242 may be a nickel (Ni) plating layer or a tin (Sn) plating layer for example, and may have the Ni plating layer and the Sn plating layer sequentially formed on the first or second band portion 131b or 132b.

In an exemplary embodiment, the first and second plating layers 141 and 142 may respectively be extended to partially cover the first and second connection portions 131a and 132a. H1≥H2 when H1 indicates an average size of a region in the first direction, measured from the first surface 1 to the internal electrode disposed closest to the first surface 1 among the first and second internal electrodes 121 and 122, and H2 indicates an average size of the first or second plating layer 141 or 142 in the first direction, measured from the extension line of the first surface 1 to an end of the plating layer disposed on the first or second connection portion 131a or 132a. Accordingly, it is possible suppress the plating solution from penetrating into the internal electrode during the plating process, thereby allowing the multilayer electronic component to have the improved reliability.

H1 and H2 may be values each obtained by averaging values measured in the cross section (i.e., L-T cross section) of the body 110, cut in the first and second directions, at five equally spaced points in the third direction. H1 may indicate an average of values measured at a point where the internal electrode, disposed closest to the first surface 1 in each cross section, is connected to the external electrode, H2 may indicate an average of values measured based on the end of the plating layer in contact with the external electrode, and the extension line of the first surface serving as a reference when measuring H1 and H2 may be the same.

In an exemplary embodiment, the first plating layer 141 may cover the end of the insulating layer 151, disposed on the first external electrode 131, and the second plating layer 142 may cover the end of the insulating layer 151, disposed on the second external electrode 132. Accordingly, it is possible to strengthen a bonding force of the insulating layer 151 and the plating layer 141 or 142, thereby improving the reliability of the multilayer electronic component 1000.

In an exemplary embodiment, the insulating layer 151 may cover an end of the first plating layer 141, disposed on the first external electrode 131, and the insulating layer 151 may cover an end of the second plating layer 142, disposed on the second external electrode 132. Accordingly, it is possible to strengthen the bonding force of the insulating layer 151 and the plating layer 141 or 142, thereby improving the reliability of the multilayer electronic component 1000.

In an exemplary embodiment, $0.2 \leq B1/L \leq 0.4$ and $0.2 \leq B2/L \leq 0.4$ when L indicates an average size of the body 110 in the second direction, B1 indicates an average size of the first band portion in the second direction, measured from the extension line of the third surface to an end of the band portion, and B2 indicates an average size of the second band portion in the second direction, measured from the extension line of the fourth surface to an end of the band portion.

When B1/L and B2/L are less than 0.2, it may be difficult to secure sufficient bonding strength. On the other hand, when B2/L is greater than 0.4, a leakage current may occur between the first band portion 131b and the second band portion 132b under a high-voltage current, and the first band portion 131b and the second band portion 132b may be electrically connected with each other due to plating spread or the like during the plating process.

B1, B2 and L may be values each obtained by averaging values measured in the cross section (i.e., L-T cross section) of the body 110, cut in the first and second directions at five equally spaced points in the third direction.

Figure 5:
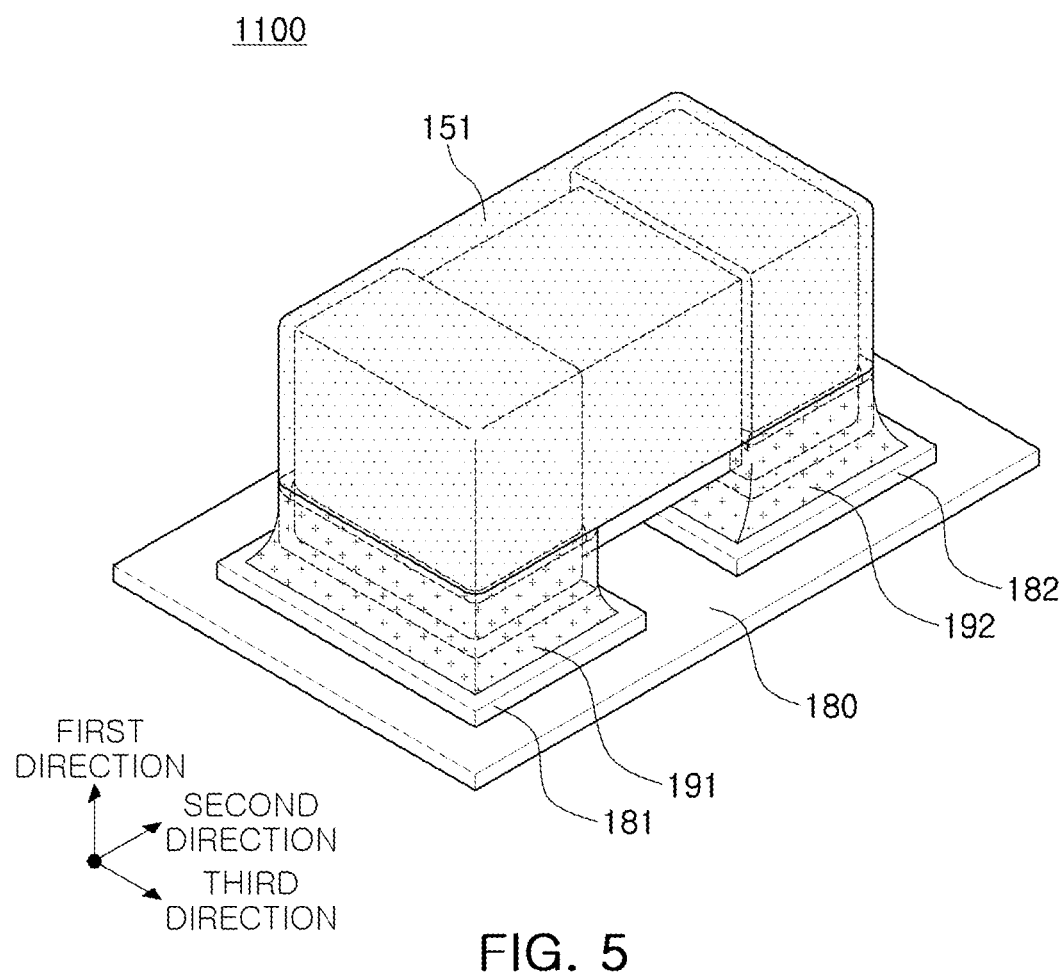
FIG. 5 is a perspective view schematically illustrating a board on which the multilayer electronic component of FIG. 1 is mounted.

Referring to FIG. 5 showing a mounting board 180 on which a multilayer electronic component 1000 is mounted, the plating layers 141 and 142 of the multilayer electronic component 1000 may be joined to the board 180 by electrode pads 181 and 182 and solders 191 and 192, disposed on the board 180.

Meanwhile, when the internal electrodes 121 and 122 are stacked on each other in the first direction, the multilayer electronic component 1000 may be horizontally mounted on the board 180 so that the internal electrodes 121 and 122 are parallel to a surface on which the multilayer electronic component is mounted. However, the present disclosure is not limited to the horizontal mounting, and when the internal electrodes 121 and 122 are stacked on each other in the third direction, the multilayer electronic component may be vertically mounted on the board so that the internal electrodes 121 and 122 are perpendicular to the surface on which the multilayer electronic component is mounted.

The multilayer electronic component 1000 may not need to be limited to a particular size.

However, in order for the multilayer electronic component to have the smaller size and simultaneously have the higher capacitance, it is necessary to increase the number of stacks by allowing the dielectric layer and the internal electrode to each have a smaller thickness. The multilayer electronic component 1000 having a size of 1005 (i.e., length×width of 1.0 mm×0.5 mm) or less may thus have more remarkably improved reliability and capacitance per unit volume according to the present disclosure.

Therefore, in consideration of a manufacturing error, a size of the external electrode and the like, when having a length of 1.1 mm or less and a width of 0.55 mm or less, the multilayer ceramic electronic component 1000 may have the more remarkably improved reliability according to the present disclosure. Here, the length of the multilayer electronic component 1000 may indicate a maximum size of the multilayer electronic component 1000 in the second direction, and the width of the multilayer electronic component 1000 may indicate a maximum size of the multilayer electronic component 1000 in the third direction.

A conventional multilayer electronic component may be under processes in which an external electrode is formed on a sintered body and then fired. Here, stress may occur during the firing process, and the radiation cracking may occur by the stress.

In particular, a firing temperature for forming the insulating layer may be increased when the insulating layer includes the glass material, which may further increase a possibility of occurrence of such a radiation cracking.

The first or second external electrode 131 or 132 of the multilayer electronic component 1000 according to an exemplary embodiment of the present disclosure may include at least one of nickel (Ni) and the alloy of nickel (Ni).

Accordingly, it is possible to suppress the diffusion of nickel (Ni) included in a conductive metal of the external electrode 131 or 132 to the internal electrode 121 or 122 including nickel (Ni), thereby suppressing the occurrence and propagation of the radiation cracking. In addition, the external electrode 131 or 132 may include at least one of nickel (Ni) and the alloy of nickel (Ni), thereby improving hermetic sealing of the body 110 to prevent the multilayer electronic component to have a lower reliability due to the penetration of the plating solution. This effect may be more remarkable when the external electrode 131 or 132 includes nickel (Ni) as its main component.

Content of nickel (Ni) included in the first or second external electrode may be 50 mol % or more compared to 100 mol of the conductive metal included in the external electrode, and is not limited thereto.

In addition, the alloy of nickel (Ni) is not particularly limited as long as the alloy is the conductive metal having the excellent electrical conductivity. For example, the alloy of nickel (Ni) may be an alloy including nickel (Ni), and further including at least one selected from copper (Cu), chromium (Cr), silver (Ag), tin (Sn) and palladium (Pd).

A component of the first or second external electrode 131 or 132 may be calculated from an image observed using a scanning electron microscope-energy dispersive X-ray spectroscopy (SEM-EDS). In detail, the multilayer electronic component may be polished to its central position in the width direction (i.e., third direction) to expose a cross section in the length and thickness direction (i.e., L-T cross section), and the number of moles of each conductive metal element included in the external electrode may then be measured from a central region among the regions obtained by dividing the external electrode into five equal portions in the thickness direction by using the EDS.

Meanwhile, in an exemplary embodiment, the first and second plating layers 141 and 142 may respectively be extended to partially cover the first and second connection portions 131a and 132a. Here, the first and second plating layers 141 and 142 may each be in contact with the end of the insulating layer 151.

In the multilayer electronic component 1000 according to an exemplary embodiment, H1≥H2 when H1 indicates an average size of a region in the first direction, measured from the first surface 1 to the internal electrode disposed closest to the first surface 1 among the first and second internal electrodes 121 and 122, and H2 indicates an average size of the plating layer 141 or 142 in the first direction, measured from the extension line of the first surface 1 to the end of the plating layer 141 or 142 disposed on the first or second connection portion 131a or 132a. Accordingly, it is possible suppress the plating solution from penetrating into the internal electrode during the plating process, thereby allowing the multilayer electronic component to have the further improved reliability.

H1 and H2 may be values each obtained by averaging values measured in the cross section (i.e., L-T cross section) of the body 110, cut in the first and second directions, at five equally spaced points in the third direction. H1 may indicate an average of values measured at a point where the internal electrode, disposed closest to the first surface 1 in each cross section, is connected to the external electrode, H2 may indicate an average of values measured based on the end of the plating layer in contact with the external electrode, and the extension line E1 of the first surface 1 serving as a reference when measuring H1 and H2 may be the same.

Hereinafter, the multilayer electronic component 1000' according to another exemplary embodiment of the present disclosure is described with reference to FIGS. 6 and 7, and omitted is a description overlapping that of the multilayer electronic component 1000 according to an exemplary embodiment of the present disclosure.

Figure 6:
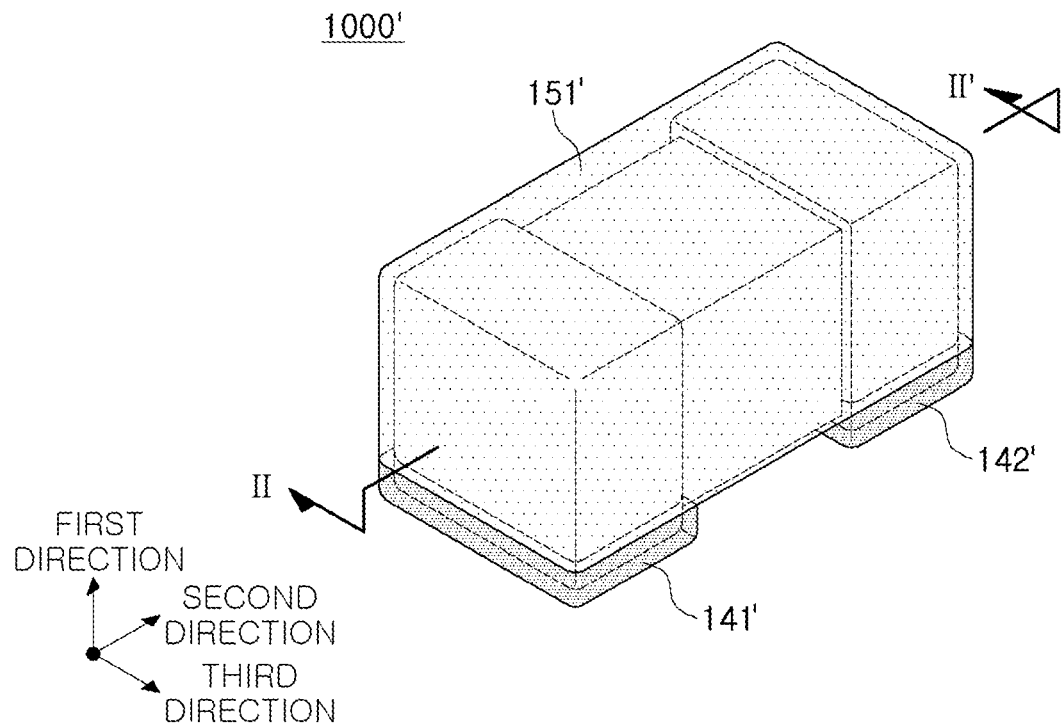
FIG. 6 is a perspective view schematically illustrating a multilayer electronic component according to another exemplary embodiment of the present disclosure.
Figure 7:
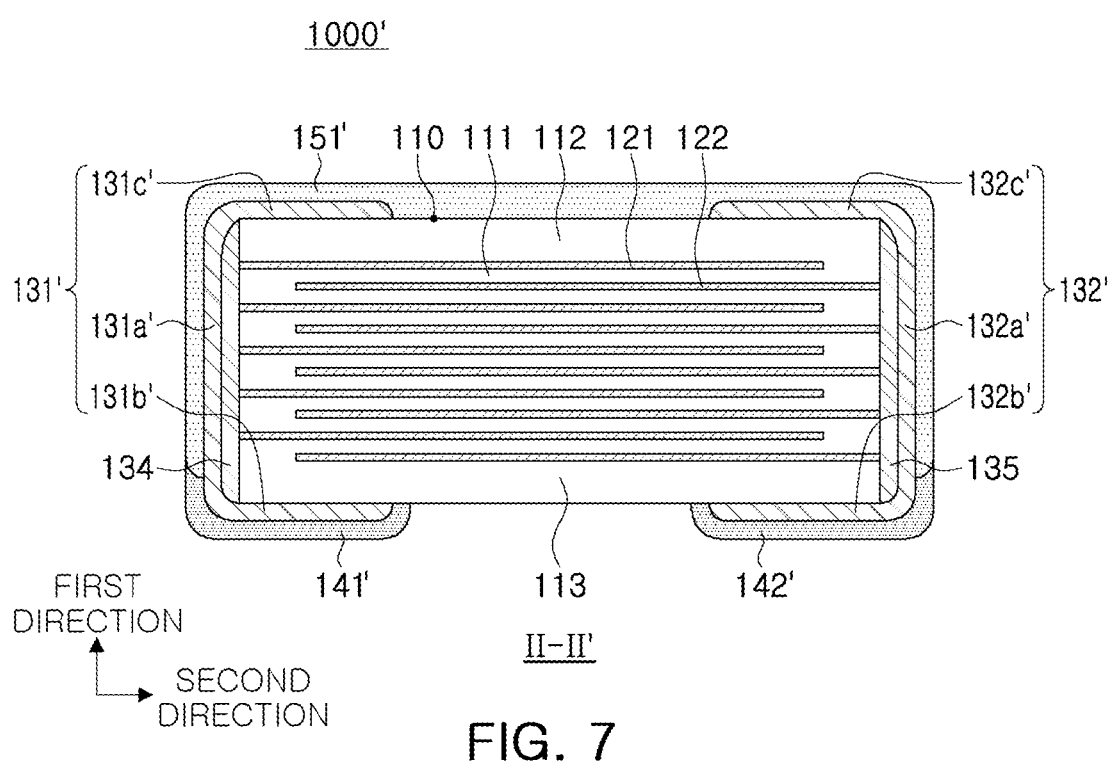
FIG. 7 is a cross-sectional view taken along line II-II' of FIG. 6.

FIG. 6 is a perspective view schematically illustrating the multilayer electronic component 1000' according to another exemplary embodiment of the present disclosure; and FIG. 7 is a cross-sectional view taken along line II-II' of FIG. 6.

Referring to FIGS. 6 and 7, the multilayer electronic component 1000' according to another exemplary embodiment of the present disclosure may include: a body 110 including a dielectric layer 111 and first and second internal electrodes 121 and 122 alternately disposed while having the dielectric layer 111 interposed therebetween, and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction; a first external electrode 131' including a first connection portion 131a' disposed on the third surface 3, a first band portion 131b' extended from the first connection portion 131a' onto a portion of the first surface 1, and a third band portion 131c' extended from the first connection portion 131a' onto a portion of the second surface 2; a second external electrode 132' including a second connection portion 132a' disposed on the fourth surface 4, a second band portion 132b' extended from the second connection portion 132a' onto a portion of the first surface 1, and a fourth band portion 132c' extended from the second connection portion 132a' onto a portion of the second surface 2; an insulating layer 151' disposed on the first and second connection portions, and covering the third and fourth band portions 131c' and 132c'; a first plating layer 141' disposed on the first band portion 131b'; and a second plating layer 142' disposed on the second band portion 132b'.

The external electrodes 131' and 132' may respectively be disposed on the third surface 3 and fourth surface 4 of the body 110. The external electrodes 131' and 132' may be the first and second external electrodes 131' and 132' respectively disposed on the third and fourth surfaces 3 and 4 of the body 110, and respectively connected to the first and second internal electrodes 121 and 122.

The external electrodes 131' and 132' may be the first external electrode 131' including the first connection portion 131a' disposed on the third surface 3, the first band portion 131b' extended from the first connection portion 131a' onto a portion of the first surface 1 and the third band portion 131c' extended from the first connection portion 131a' onto a portion of the second surface 2, and the second external electrode 132' including the second connection portion 132a' disposed on the fourth surface 4, the second band portion 132b' extended from the second connection portion 132a' onto a portion of the first surface 1 and the fourth band portion 132c' extended from the second connection portion 132a' onto a portion of the second surface 2.

In the multilayer electronic component 1000' according to another exemplary embodiment of the present disclosure, a first additional electrode layer 134 may be disposed between the first connection portion 131a' and the third surface 3, and a second additional electrode layer 135 may be disposed between the second connection portion 132a' and the fourth surface 4.

In another exemplary embodiment, the first additional electrode layer 134 may be disposed not to deviate from the third surface 3, and the second additional electrode layer 135 may be disposed not to deviate from the fourth surface 4. Accordingly, the multilayer electronic component 1000' may have a further smaller size.

The additional electrode layer 134 or 135 may be a fired electrode including the conductive metal and glass, or may be the plating layer including the conductive metal and resin.

The first or second additional electrode layer 134 or 135 may improve the electrical connectivity between the internal electrode 121 or 122 and the external electrode 131' or 132', have excellent bonding forces with the external electrode 131' and 132', and thus serve to further improve mechanical bonding force of the external electrode 131' or 132' and to suppress the occurrence and propagation of the radiation cracking by including at least one of nickel (Ni) and the alloy of nickel (Ni) as described below.

The first or second external electrode 131' or 132' of the multilayer electronic component 1000' according to another exemplary embodiment of the present disclosure may include copper (Cu), and include copper (Cu) as a main component. Through this configuration, it is possible to improve flexural strength of the multilayer electronic component 1000' by using the ductility of copper (Cu) while improving the electrical conductivity of the external electrode 131' or 132'. In addition, copper (Cu) may have excellent wettability to the metal plating layer, and it is thus possible to improve plating property of the plating layer 141 or 142 described below when the external electrode 131' or 132' includes copper (Cu).

Meanwhile, a firing temperature for forming the insulating layer 151' may be increased when the insulating layer 151' includes a glass component to protect the multilayer electronic component 1000' from a tensile stress occurring due to the thermal contraction of the solders 191 and 192. The radiation cracking may thus occur in the multilayer electronic component 1000' by such a thermal stress.

In particular, the first or second external electrode 131' or 132' may include copper (Cu) or include copper (Cu) as its main component. In this case, copper (Cu) of the external electrode 131' or 132' may be diffused to the internal electrode including nickel (Ni) due to high heat for forming the insulating layer 151', which may further increase the possibility of causing the radiation cracking.

The first or second additional electrode layer 134 or 135 of the multilayer electronic component 1000' according to another exemplary embodiment of the present disclosure may include at least one of nickel (Ni) and the alloy of nickel (Ni), thereby suppressing the radiation cracking caused by the thermal stress from being propagated to the internal electrode 121 or 122 and suppressing copper (Cu) in the external electrode 131' or 132' from being diffused to the internal electrode 121 or 122 to prevent the occurrence and propagation of the radiation cracking.

Alternatively, the first or second additional electrode layer 134 or 135 of the multilayer electronic component 1000' according to another exemplary embodiment of the present disclosure may include nickel (Ni) as its main component, thereby suppressing the radiation cracking from being propagated to the internal electrode 121 or 122 and further suppressing copper (Cu) included in the external electrode 131' or 132' from being diffused to the internal electrode 121 or 122 to prevent the occurrence and propagation of the radiation cracking.

Meanwhile, content of copper (Cu) included in the first or second external electrode 131' or 132' may be 50 mol % or more compared to 100 mol of the conductive metal included in the external electrode; and the content of nickel (Ni) included in the first or second additional electrode layer 134 or 135 may be 50 mol % or more compared to 100 mol of the conductive metal included in the additional electrode layer, and is not limited thereto.

In addition, the alloy of nickel (Ni) is not particularly limited as long as the alloy is the conductive metal having the excellent electrical conductivity. For example, the alloy of nickel (Ni) may be an alloy including nickel (Ni), and further including at least one selected from copper (Cu), chromium (Cr), silver (Ag), tin (Sn) and palladium (Pd).

A component of the first or second additional electrode layer 134 or 135 may be calculated from an image observed using the scanning electron microscope-energy dispersive X-ray spectroscopy (SEM-EDS). In detail, the multilayer electronic component may be polished to its central position in the width direction (i.e. third direction) to expose a cross section in the length and thickness direction (i.e. L-T cross section), and the number of moles of each conductive metal element included in the additional electrode layer may then be measured from a central region among the regions obtained by dividing the additional electrode layer into five equal portions in the thickness direction by using the EDS.

Hereinafter, multilayer electronic components according to various exemplary embodiments of the present disclosure are described in detail, and omitted are descriptions overlapping those of the multilayer electronic component 1000 according to an exemplary embodiment of the present disclosure and the multilayer electronic component 1000' according to another exemplary embodiment of the present disclosure.

The description basically describes that in the multilayer electronic components according to various exemplary embodiments, no additional electrode layer is disposed between the external electrode and the third or fourth surface as in the multilayer electronic component 1000 according to another exemplary embodiment of the present disclosure. However, the same may also be applied to the case where the additional electrode layer is disposed between the external electrode and the third or fourth surface, as in the multilayer electronic component 1000' according to another exemplary embodiment of the present disclosure.

Figure 8:
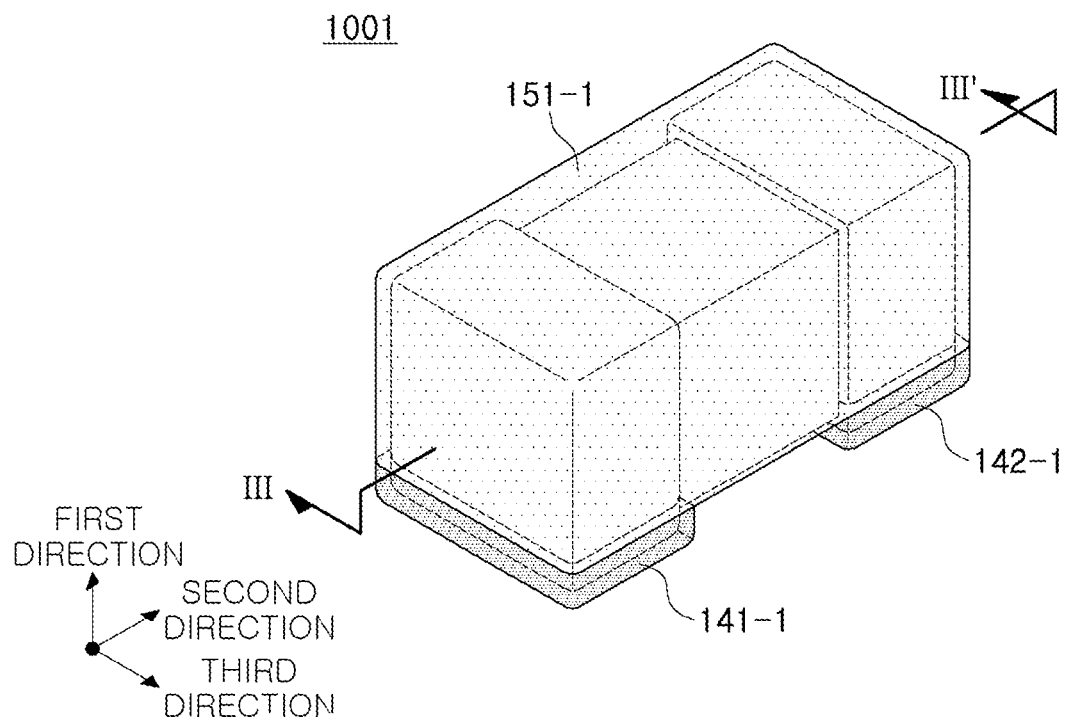
FIG. 8 is a perspective view schematically illustrating a multilayer electronic component according to another exemplary embodiment of the present disclosure.
Figure 9:
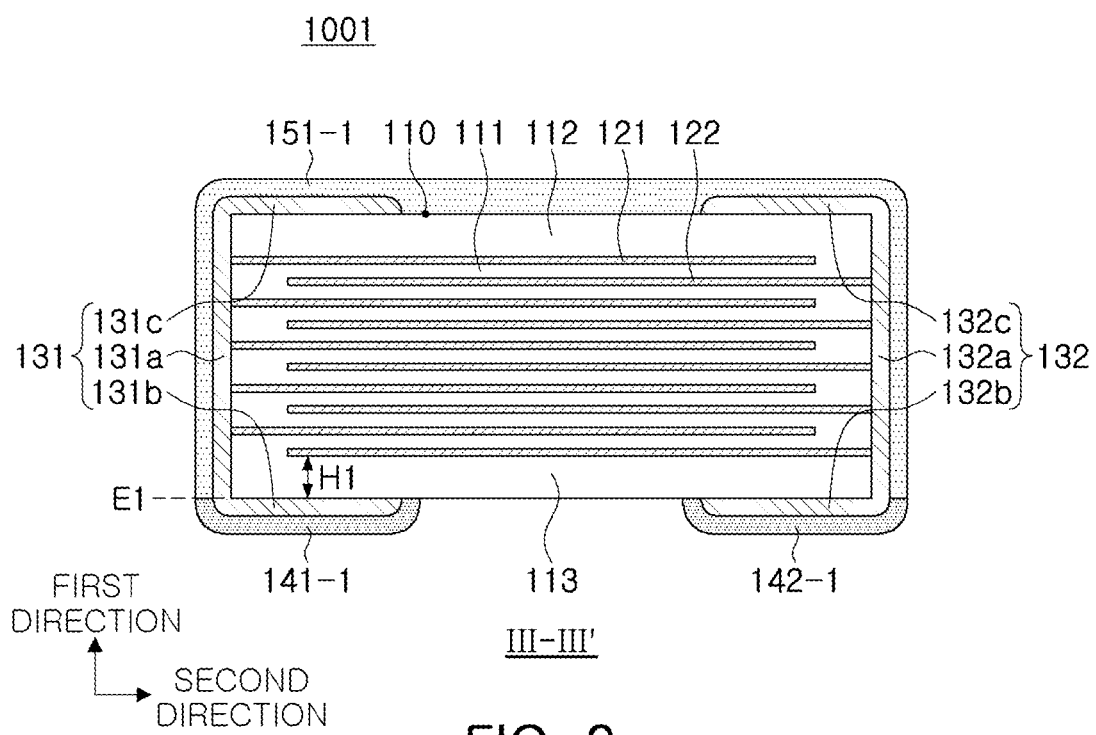
FIG. 9 is a cross-sectional view taken along line III-III' of FIG. 8.

FIG. 8 is a perspective view schematically illustrating a multilayer electronic component 1001 according to another exemplary embodiment of the present disclosure; and FIG. 9 is a cross-sectional view taken along line III-III' of FIG. 8.

Referring to FIGS. 8 and 9, the multilayer electronic component 1001 according to another exemplary embodiment of the present disclosure may have first and second plating layers 141-1 and 142-1 each disposed on a level the same as or below the extension line E1 of the first surface. Accordingly, it is possible to minimize the height of the solder when the multilayer electronic component is mounted on the board and to minimize the space in which the multilayer electronic component is mounted.

In addition, an insulating layer 151-1 may be extended below the extension line of the first surface to be in contact with the first and second plating layers 141-1 and 142-1.

Figure 10:
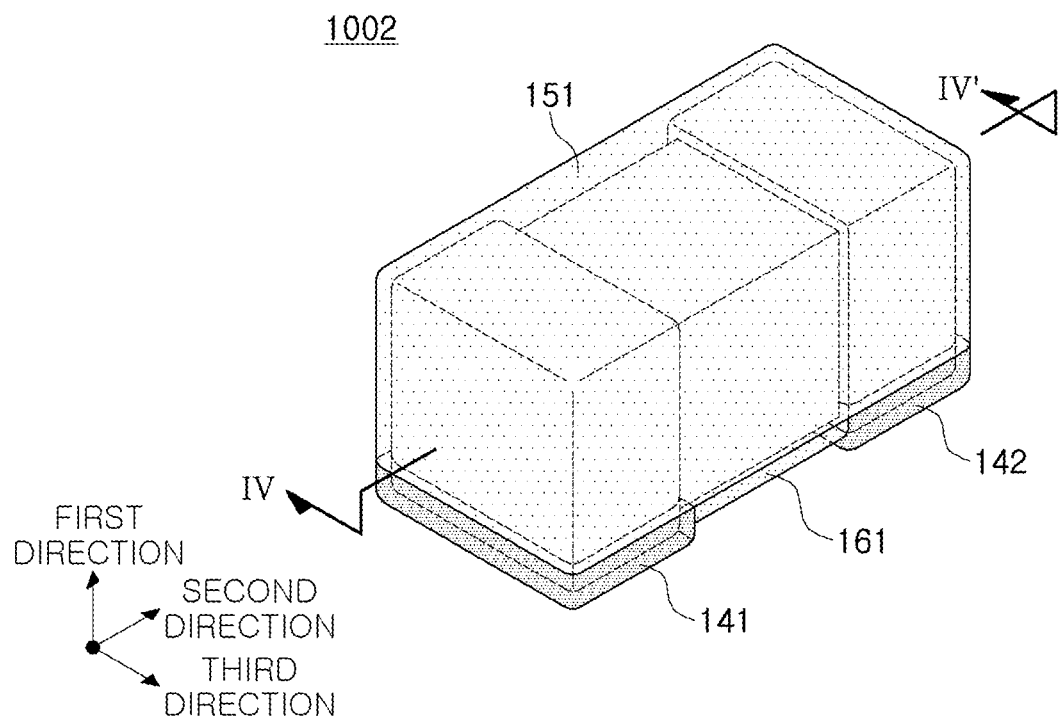
FIG. 10 is a perspective view schematically illustrating a multilayer electronic component according to another exemplary embodiment of the present disclosure.
Figure 11:
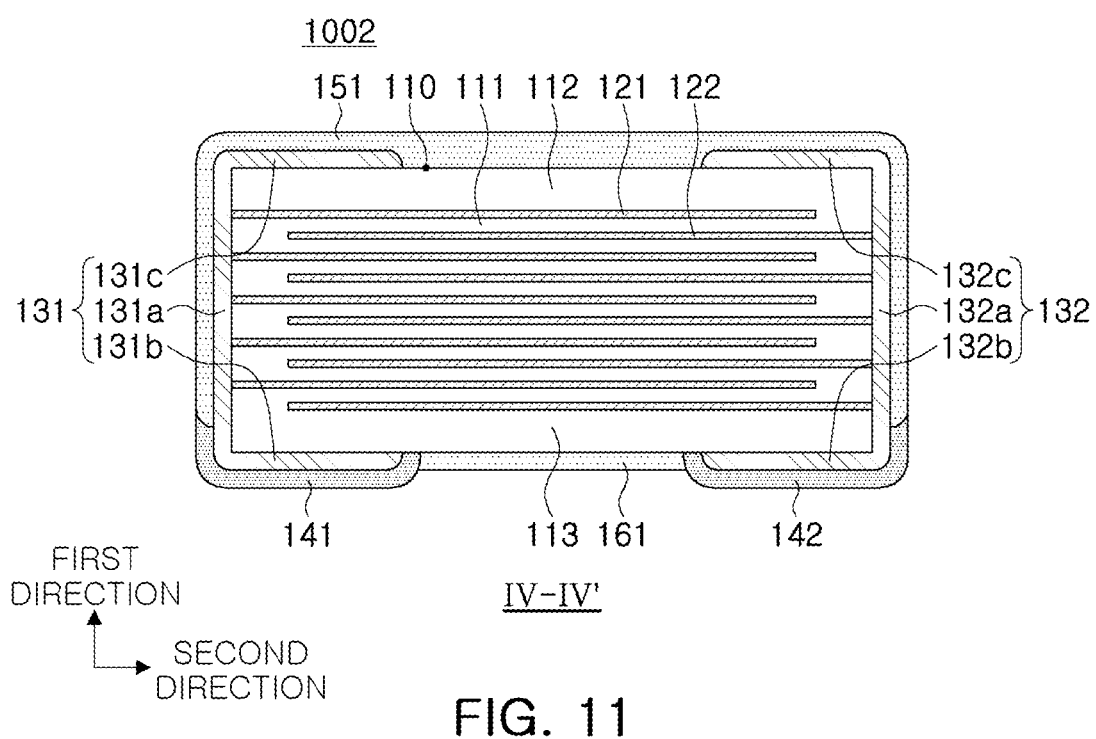
FIG. 11 is a cross-sectional view taken along line IV-IV' of FIG. 10.

FIG. 10 is a perspective view schematically illustrating a multilayer electronic component 1002 according to another exemplary embodiment of the present disclosure; FIG. 11 is a cross-sectional view taken along line IV-IV' of FIG. 10.

Referring to FIGS. 10 and 11, the multilayer electronic component 1002 according to another exemplary embodiment of the present disclosure may further include an additional insulating layer 161 disposed on the first surface 1 and between the first band portion 131b and the second band portion 132b. Accordingly, it is possible to prevent the leakage current or the like which may occur between the first band portion 131b and the second band portion 132b under the high-voltage current.

The additional insulating layer 161 may not need to be limited to a particular type. For example, the additional insulating layer 161 may include glass like the insulating layer 151. However, it is not necessary to limit the additional insulating layer 161 and the insulating layer 151 to the same material, and the two insulating layers may be made of materials different from each other. For example, the additional insulating layer 161 may include one or more selected from epoxy resin, acrylic resin, ethyl cellulose or the like.

Figure 12:
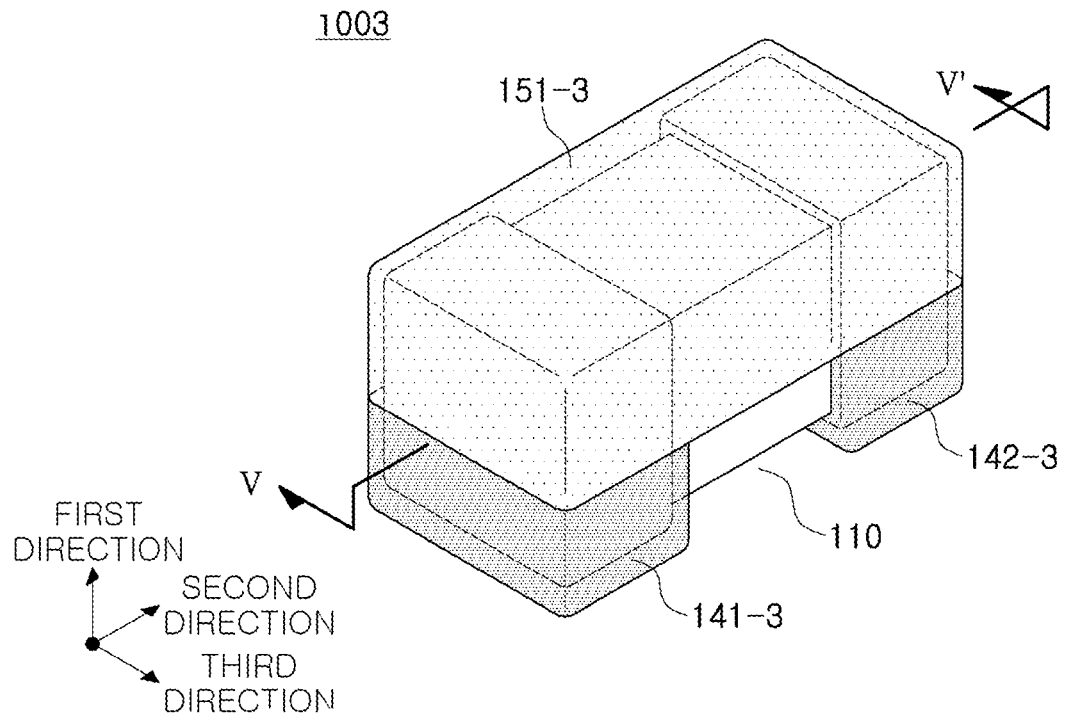
FIG. 12 is a perspective view schematically illustrating a multilayer electronic component according to another exemplary embodiment of the present disclosure.
Figure 13:
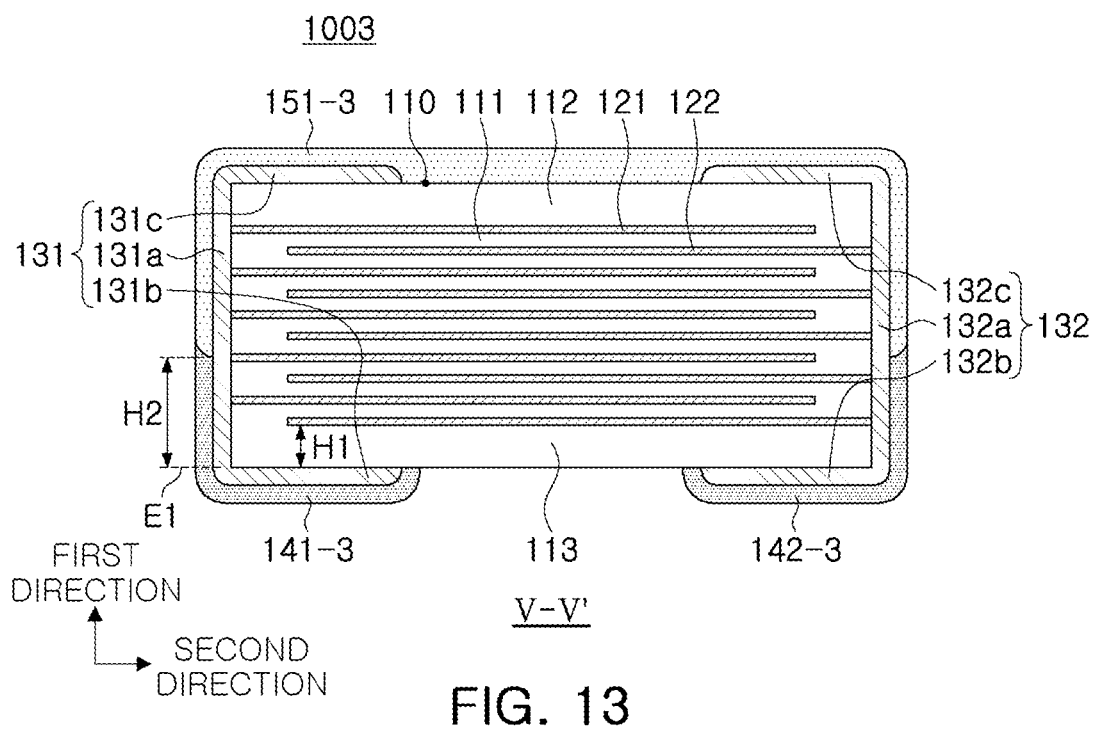
FIG. 13 is a cross-sectional view taken along line V-V' of FIG. 12.

FIG. 12 is a perspective view schematically illustrating a multilayer electronic component 1003 according to another exemplary embodiment of the present disclosure; and FIG. 13 is a cross-sectional view taken along line V-V' of FIG. 12.

Referring to FIGS. 12 and 13, in the multilayer electronic component 1003 according to another exemplary embodiment, H1<H2 when H1 indicates an average size of a region in the first direction, measured from the first surface 1 to the internal electrode disposed closest to the first surface 1 among the first and second internal electrodes 121 and 122, and H2 indicates an average size of a plating layer 141-3 or 142-3 in the first direction, measured from the extension line E1 of the first surface 1 to an end of the plating layer 141-3 or 142-3 disposed on the first or second connection portion 131a or 132a. Accordingly, it is possible to improve the bonding strength by increasing an area in which the multilayer electronic component is in contact with the solder when the multilayer electronic component is mounted on the board.

H2<T/2 when T indicates the average size of the body 110 in the first direction. That is, H1<H2<T/2. The reason is that the moisture resistance reliability improved by the insulating layer may be reduced when H2 is T/2 or more.

H1 and H2 may be the values each obtained by averaging the values measured in the cross section (i.e., L-T cross section) of the body 110, cut in the first and second directions at five equally spaced points in the third direction. H1 may indicate the average of the values measured at the point where the internal electrode, disposed closest to the first surface 1 in each cross section, is connected to the external electrode, H2 may indicate the average of the values measured based on the end of the plating layer in contact with the external electrode, and the extension line E1 of the first surface serving as the reference when measuring H1 and H2 may be the same. In addition, T may be an average value after measuring a maximum size of the body 110 in the first direction in each cross section.

Figure 14:
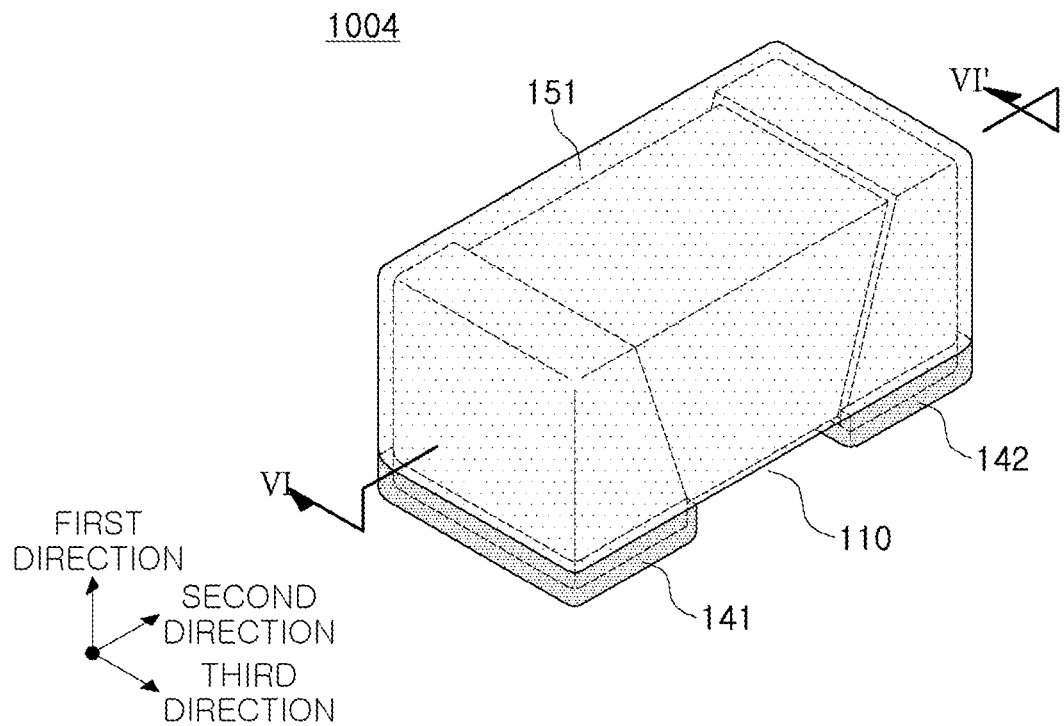
FIG. 14 is a perspective view schematically illustrating a multilayer electronic component according to another exemplary embodiment of the present disclosure.
Figure 15:
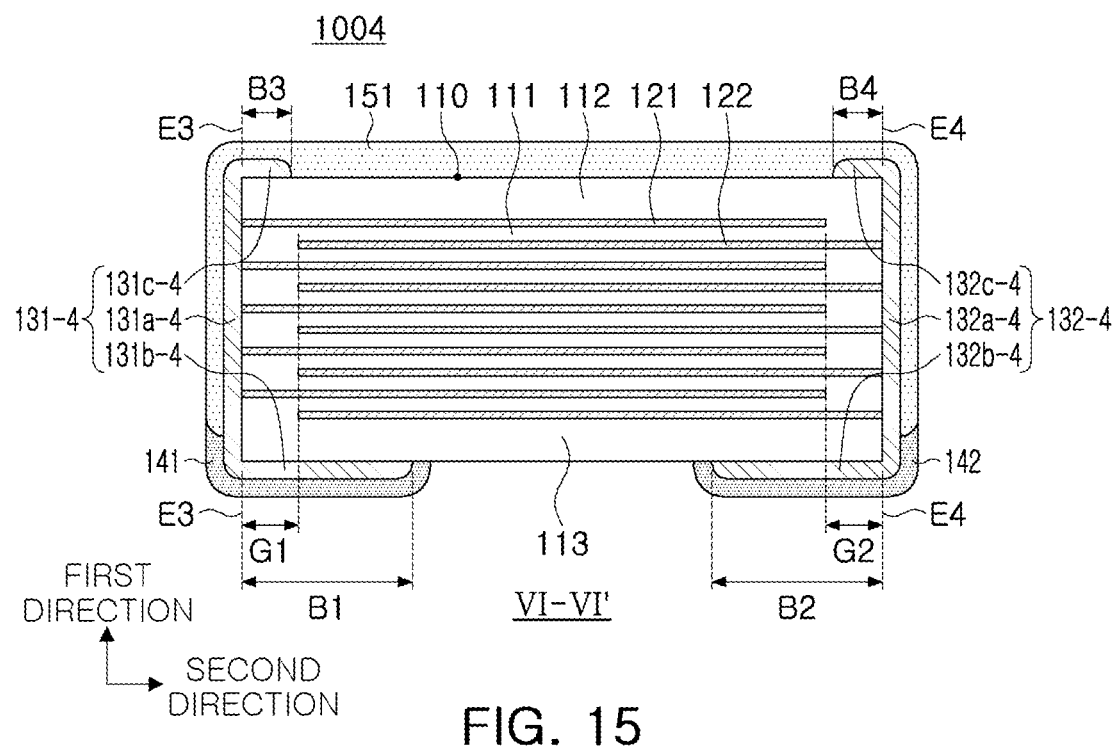
FIG. 15 is a cross-sectional view taken along line VI-VI' of FIG. 14.

FIG. 14 is a perspective view schematically illustrating a multilayer electronic component 1004 according to another exemplary embodiment of the present disclosure; and FIG. 15 is a cross-sectional view taken along line VI-VI' of FIG. 14.

Referring to FIGS. 14 and 15, in the multilayer electronic component 1004 according to another exemplary embodiment of the present disclosure, the average length B1 of the first band portion 131b-4 may be longer than an average length B3 the third band portion 131c-4, and an average length of the second band portion 132b-4 may be longer than an average length B4 of the fourth band portion 132c-4. Accordingly, it is possible to improve the bonding strength by increasing the area in which the multilayer electronic component is in contact with the solder when the multilayer electronic component is mounted on the board.

In more detail, B3<B1 and B4<B2 when B1 indicates an average size of the first band portion 131b-4 in the second direction, measured from the extension line E3 of the third surface 3 to an end of the first band portion 131b-4, B2 indicates an average size of the second band portion 132b-4 in the second direction, measured from the extension line E4 of the fourth surface 4 to an end of the second band portion 132b-4, B3 indicates an average size of the third band portion 131c-4 in the second direction, measured from the extension line E3 of the third surface 3 to an end of the first band portion 131b-4, and B4 indicates an average size of the fourth band portion 132c-4 in the second direction, measured from the extension line E4 of the fourth surface 4 to an end of the fourth band portion 132c-4.

Here, $0.2 \leq B1/L \leq 0.4$ and $0.2 \leq B2/L \leq 0.4$ when L indicates the average size of the body 110 in the second direction.

B1, B2, B3, B4 and L may be values each obtained by averaging values measured in the cross section (i.e. L-T cross section) of the body 110, cut in the first and second directions at five equally spaced points in the third direction.

In addition, the first external electrode 131-4 may include a first side band portion extended from the first connection portion 131a-4 to portions of the fifth and sixth surfaces, and the second external electrode 132-4 may include a second side band portion extended from the second connection portion 132a-4 to portions of the fifth and sixth surfaces. Here, the first or second side band portion may have a size gradually increased in the second direction as being closer to the first surface. That is, the first or second side band portion may have a tapered shape or a trapezoidal shape.

Further, $B3 \leq G1$ and $B4 \leq G2$ when B3 indicates the average size of the third band portion 131c-4 in the second direction, measured from the extension line E3 of the third surface 3 to the end of the third band portion 131c-4, B4 indicates the average size of the fourth band portion 132c-4 in the second direction, measured from the extension line E4 of the fourth surface 4 to the end of the fourth band portion 132c-4, G1 indicates an average size of a region in the second direction, where the third surface 3 and the second internal electrode 122 are spaced apart from each other, and G2 indicates an average size of a region in the second direction, where the fourth surface 4 and the first internal electrode 121 are spaced apart from each other. Accordingly, it is possible to minimize a volume of the external electrode, thereby increasing the capacitance of the multilayer electronic component 1004 per unit volume.

In the cross section cut in the first and second directions from a center of the body in the third direction, G1 may indicate a value obtained by averaging sizes of the region in the second direction, measured from any five second internal electrodes positioned in the center of the body in the first direction to the third surface spaced apart from the internal electrodes, and G2 may indicate a value obtained by averaging sizes of the region in the second direction, measured from any five first internal electrodes positioned in the center of the body in the first direction to the fourth surface spaced apart from the internal electrodes.

Further, G1 and G2 may indicate values each obtained from the cross section (i.e., L-T cross section) of the body 110, cut in the first and second directions at five equally spaced points in the third direction, and these values may further be generalized by taking G1 and G2 as their averages.

However, it is not intended to limit the present disclosure to $B3 \leq G1$ and $B4 \leq G2$, and a case where $B3 \geq G1$ and $B4 \geq G2$ may also be included as another exemplary embodiment of the present disclosure. Accordingly, in another exemplary embodiment, $B3 \geq G1$ and $B4 \geq G2$ when B3 indicates an average size of the third band portion in the second direction, measured from the extension line of the third surface 3 to an end of the third band portion, B4 indicates an average size of the fourth band portion in the second direction, measured from the extension line of the fourth surface 4 to an end of the fourth band portion, G1 indicates an average size of a region in the second direction, where the third surface and the second internal electrode are spaced apart from each other, and G2 indicates an average size of a region in the second direction, where the fourth surface and the first internal electrode are spaced apart from each other.

Figure 16:
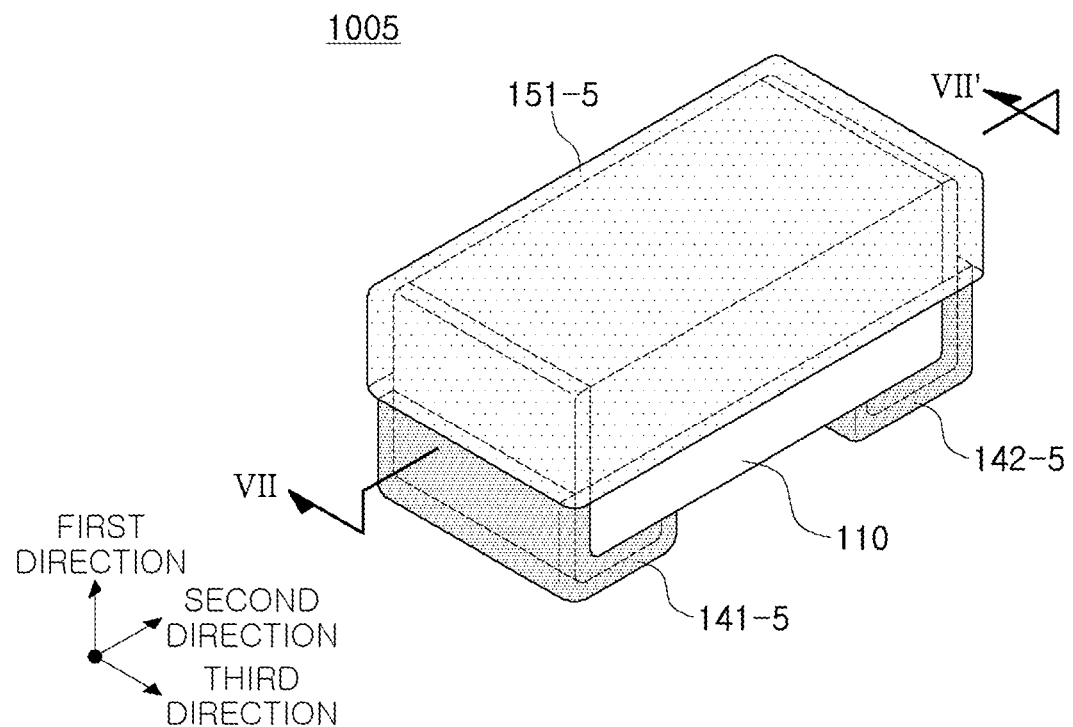
FIG. 16 is a perspective view schematically illustrating a multilayer electronic component according to another exemplary embodiment of the present disclosure.
Figure 17:
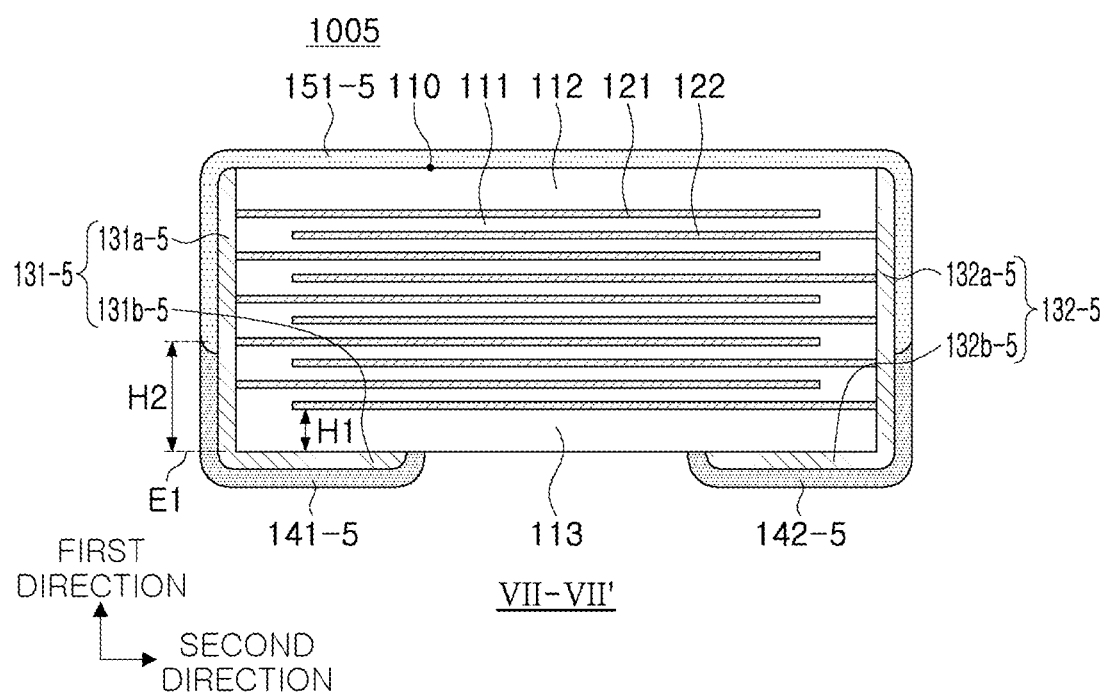
FIG. 17 is a cross-sectional view taken along line VII-VII' of FIG. 16.

FIG. 16 is a perspective view schematically illustrating a multilayer electronic component 1005 according to another exemplary embodiment of the present disclosure; and FIG. 17 is a cross-sectional view taken along line VII-VII of FIG. 16.

Referring to FIGS. 16 and 17, first and second external electrodes 131-5 and 132-5 of the multilayer electronic component 1005 according to another exemplary embodiment of the present disclosure may not be disposed on the second surface and may be disposed on the third, fourth and first surfaces to each have an L-shape. That is, the first and second external electrodes 131-5 and 132-5 may be disposed below the extension line of the second surface.

The first external electrode 131-5 may include a first connection portion 131a-5 disposed on the third surface 3 and a first band portion 131b-5 extended from the first connection portion 131a-5 to a portion of the first surface 1, and the second external electrode 132-5 may include a second connection portion 132a-5 disposed on the fourth surface 4 and a second band portion 132b-5 extended from the second connection portion 132a-5 to a portion of the first surface 1. The external electrodes 131-5 and 132-5 may not be disposed on the second surface 2, and an insulating layer 151-5 may cover the entire second surface 2. Accordingly, it is possible to minimize volumes of the external electrodes 131-5 and 132-5, thereby further improving the capacitance of the multilayer electronic component 1005 per unit volume. However, the insulating layer 151-5 may not need to be limited to covering the entire second surface 2. The insulating layer may not cover the partial or entire second surface 2, and be separated to respectively cover the first and second connection portions 131a-5 and 132a-5.

In addition, the insulating layer 151-5 may cover the partial fifth and sixth surfaces, thereby further improving the reliability of the multilayer electronic component. Here, portions of the fifth and sixth surfaces, which are not covered by the insulating layer 151-5, may be externally exposed.

Further, the insulating layer 151-5 may cover the entire fifth and sixth surfaces. In this case, none of the fifth and sixth surfaces may be externally exposed to further improve the moisture resistance reliability.

A first plating layer 141-5 may be disposed on the first band portion 131b-5, and a second plating layer 142-5 may be disposed on the second band portion 132b-5. The first and second plating layers 141-5 and 142-5 may respectively be extended to portions of the first and second connection portions 132a-5 and 132b-5.

Here, none of the external electrodes 131-5 and 132-5 may also be disposed on the fifth and sixth surfaces 5 and 6. That is, the external electrodes 131-5 and 132-5 may be disposed only on the third, fourth and first surfaces.

H1<H2 when H1 indicates the average size of the region in the first direction, measured from the first surface 1 to the internal electrode disposed closest to the first surface 1 among the first and second internal electrodes 121 and 122, and H2 indicates an average size of the first or second plating layer 141-5 or 142-5 in the first direction, measured from the extension line E1 of the first surface 1 to an end of the plating layer disposed on the first or second connection portion 131a-5 or 132a-5. Accordingly, it is possible to improve the bonding strength by increasing the area in which the multilayer electronic component is in contact with the solder when the multilayer electronic component is mounted on the board, and to increase an area in which the external electrode 131-5 or 132-5 and the plating layer 141-5 or 142-5 in contact with each other, thereby suppressing an increase in equivalent series resistance (ESR).

H2<T/2 when T indicates the average size of the body 110 in the first direction. That is, H1<H2<T/2. The reason is that the moisture resistance reliability improved by the insulating layer may be reduced when H2 is T/2 or more.

In addition, the first or second plating layer 141-5 or 142-5 may cover a portion of the insulating layer 151-1 on the third or fourth surface. That is, the plating layer 141-5 or 142-5 may cover an end of the insulating layer 151-5 on the third or fourth surface. Accordingly, it is possible to strengthen a bonding force of the insulating layer 151-5 and the plating layer 141-5 or 142-5, thereby improving the reliability of the multilayer electronic component 1005.

In addition, the insulating layer 151-5 may cover a portion of the first or second plating layer 141-5 or 142-5 on the third or fourth surface. That is, the insulating layer 151-5 may cover an end of the plating layer 141-5 or 142-5 on the third or fourth surface. Accordingly, it is possible to strengthen the bonding force of the insulating layer 151-5 and the plating layer 141-5 or 142-5, thereby improving the reliability of the multilayer electronic component 1005.

Figure 18:
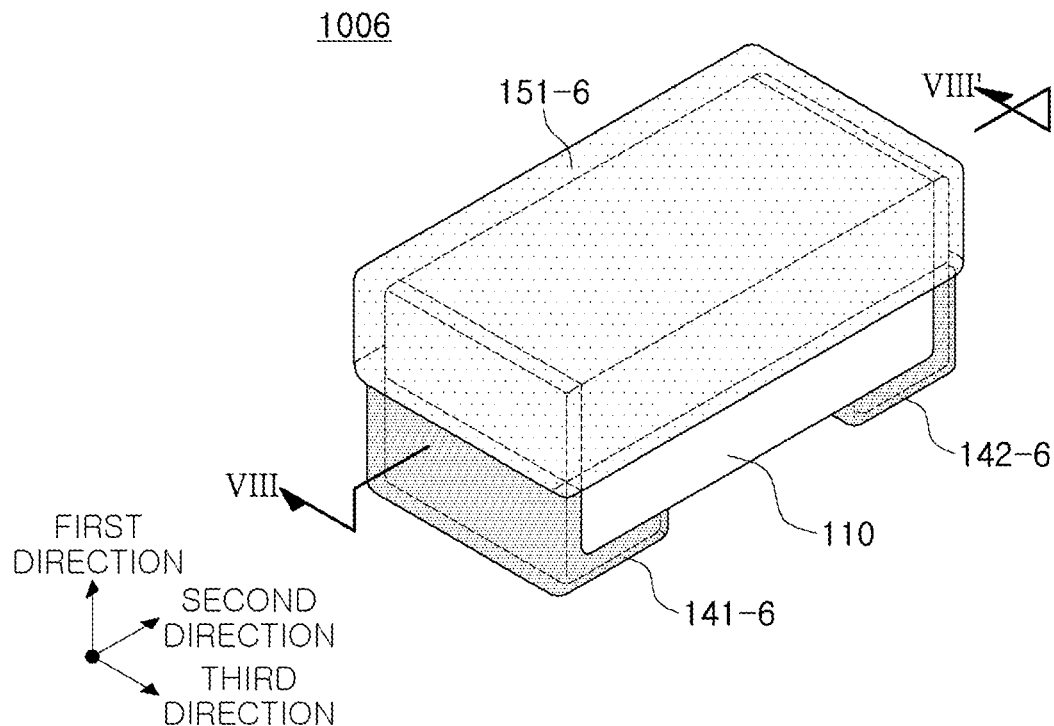
FIG. 18 is a perspective view schematically illustrating a multilayer electronic component according to another exemplary embodiment of the present disclosure.
Figure 19:
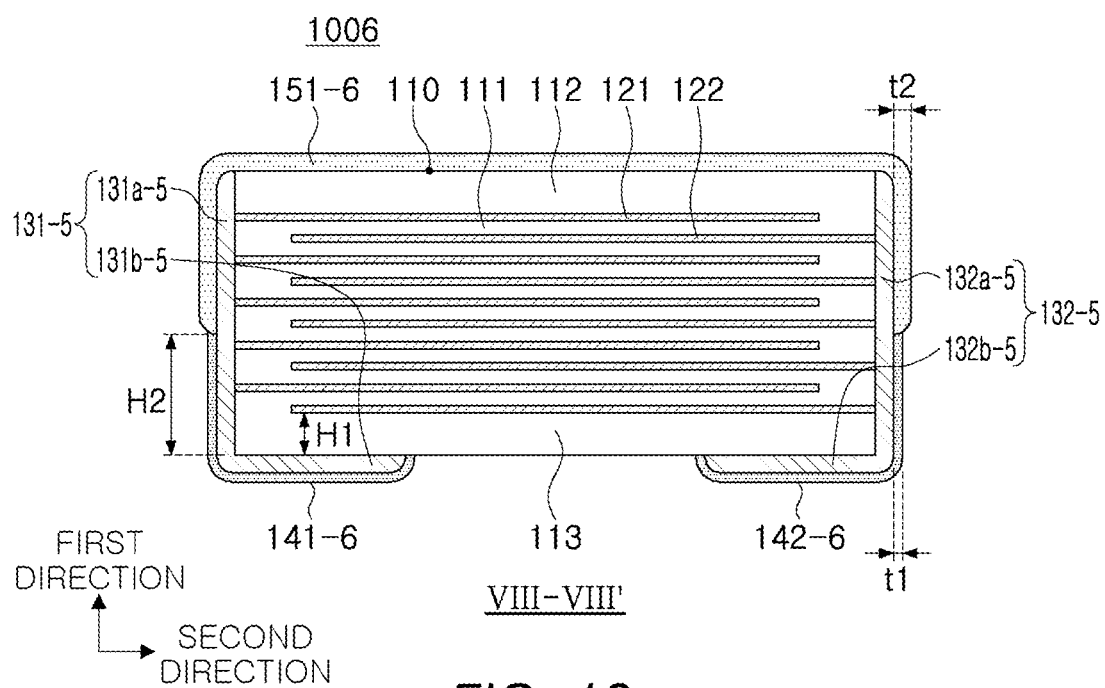
FIG. 19 is a cross-sectional view taken along line VIII-VIII' of FIG. 18.

FIG. 18 is a perspective view schematically illustrating a multilayer electronic component 1006 according to another exemplary embodiment of the present disclosure; and FIG. 19 is a cross-sectional view taken along line VIII-VIII of FIG. 18.

Referring to FIGS. 18 and 19, in the multilayer electronic component 1006 according to another exemplary embodiment of the present disclosure, first or second plating layer 141-6 or 142-6 may have an average thickness t1 smaller than an average thickness t2 of an insulating layer 151-6.

The insulating layer 151-6 may serve to prevent the penetration of the external moisture or plating solution. However, the insulating layer 151-6 may have weak connectivity with the plating layer 141-6 or 142-6, which may cause delamination of the plating layer 141-6 or 142-6. When the plating layer is delaminated, bonding strength of the multilayer electronic component with the board 180 may be reduced. Here, the delamination of the plating layer 141-6 or 142-6 may indicate that the plating layer is partially dropped or physically separated from the external electrode 131-5 or 132-5. The connectivity between the plating layer and the insulating layer may be weak. In this case, it may increase a possibility that a gap between the insulating layer and the plating layer is widened or that a foreign material may infiltrate, which may allow the plating layer to be vulnerable to an external impact and then delaminated.

According to another exemplary embodiment of the present disclosure, the plating layer may have the average thickness t1 made smaller than the average thickness t2 of the insulating layer, thereby reducing an area in which the plating layer and the insulating layer are in contact with each other. It is thus possible to suppress the occurrence of the delamination, thereby improving the bonding strength of the multilayer electronic component 1000 with the board 180.

The average thickness t1 of the first or second plating layer 141-6 or 142-may be a value obtained by averaging its thicknesses measured at five equally spaced points on the first or second connection portion 131a-5 or 132a-5 or the first and second band portion 131b-5 or 132b-5, and the average thickness t2 of the insulating layer 151-6 may be a value obtained by averaging its thicknesses measured at five equally spaced points on the first or second connection portion 131a-5 or 132a-5.

Figure 20:
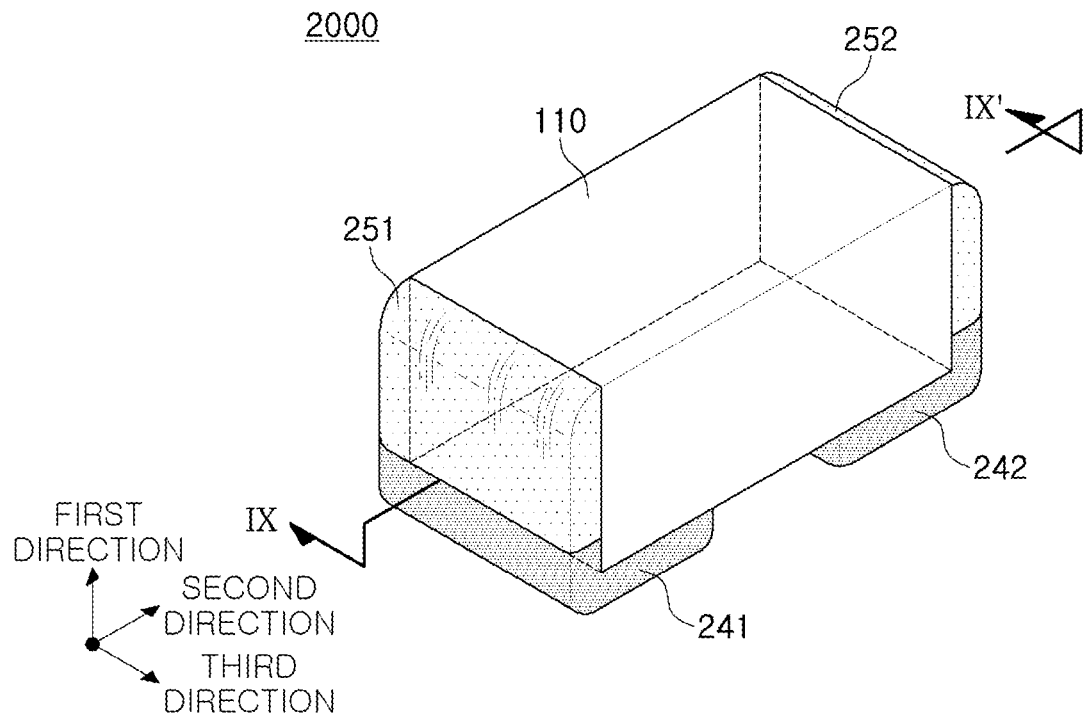
FIG. 20 is a perspective view schematically illustrating a multilayer electronic component according to another exemplary embodiment of the present disclosure.
Figure 21:
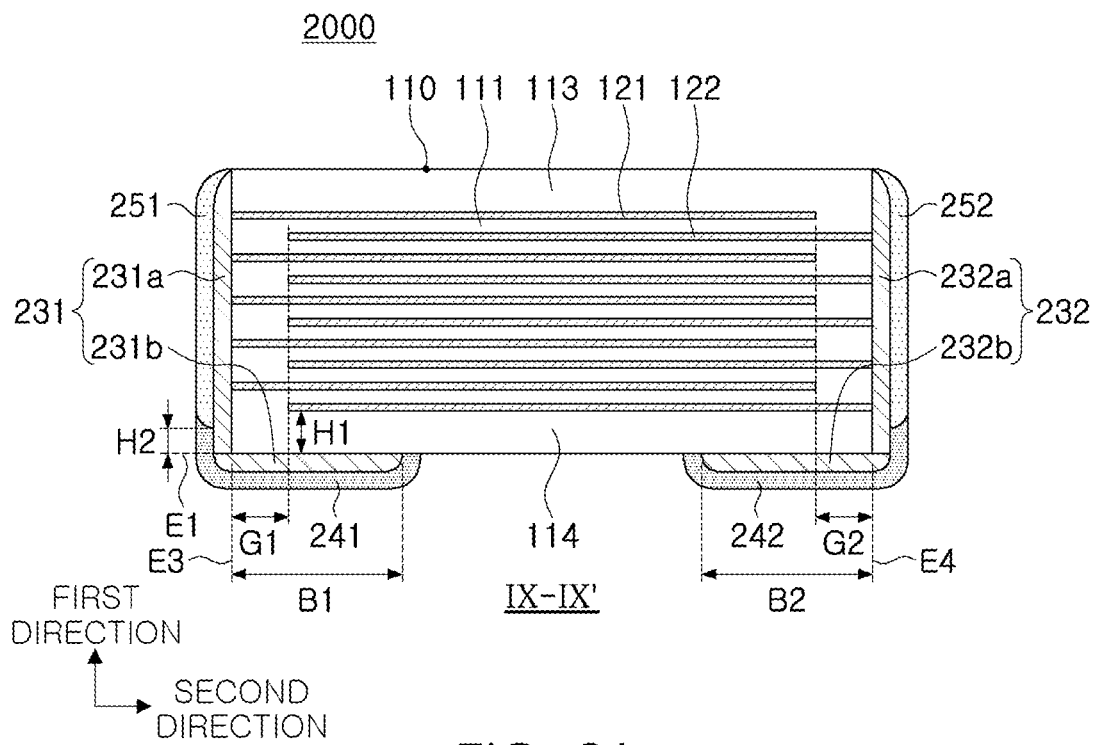
FIG. 21 is a cross-sectional view taken along line IX-IX' of FIG. 20.

FIG. 20 is a perspective view schematically illustrating a multilayer electronic component 2000 according to another exemplary embodiment of the present disclosure; and FIG. 21 is a cross-sectional view taken along line IX-IX' of FIG. 20.

Hereinafter, a multilayer electronic component 2000 according to another exemplary embodiment of the present disclosure is described in detail with reference to FIGS. 20 and 21. However, contents overlapping those described above are omitted to avoid redundant description.

The multilayer electronic component 2000 according to another exemplary embodiment of the present disclosure may include: a body 110 including a dielectric layer 111 and first and second internal electrodes 121 and 122 alternately disposed while having the dielectric layer 111 interposed therebetween, and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction; a first external electrode 231 including a first connection electrode 231a disposed on the third surface and a first band electrode 231b disposed on the first surface 1 and connected to the first connection electrode 231a; a second external electrode 232 including a second connection electrode 232a disposed on the fourth surface 4 and a second band electrode 232b disposed on the first surface and connected to the second connection electrode 232a; a first insulating layer 251 disposed on the first connection electrode; a second insulating layer 252 disposed on the second connection electrode; a first plating layer 241 disposed on the first band electrode; and a second plating layer 242 disposed on the second band electrode. The first or second connection electrode 231a or 232a may include at least one of nickel (Ni) and an alloy of nickel (Ni), and the first or second band electrode 231b or 232b may include copper (Cu).

The first connection electrode 231a may be disposed on the third surface 3 to be connected to the first internal electrode 121, and the second connection electrode 231b may be disposed on the fourth surface 4 to be connected to the second internal electrode 122. In addition, the first insulating layer 251 may be disposed on the first connection electrode 231a, and the second insulating layer 252 may be disposed on the second connection electrode 232a.

Conventionally, the external electrode may be mainly formed using a paste including the conductive metal, i.e., a method in which an exposed surface of the internal electrode of the body is dipped into the paste. However, the external electrode formed by the dipping method may have an excessive thickness in a central portion thereof in the thickness direction. In addition, even excluding this thickness imbalance problem of the external electrode formed by the dipping method, the internal electrode may be exposed to the third or fourth surface of the body. Therefore, the external electrode disposed on the third or fourth surface may have a predetermined thickness or more to suppress the penetration of moisture and the plating solution through the external electrode.

On the other hand, the present disclosure may include the insulating layer 251 or 252 disposed on the connection electrode 231*a* or 232*a*, thereby ensuring sufficient reliability even when the connection electrode 231*a* or 232*a* on the third or fourth surface to which the internal electrode is exposed has a smaller thickness.

The first and second connection electrodes 231*a* and 232*a* may each have a shape corresponding to those of the third and fourth surfaces 3 and 4, and the surfaces of the first and second connection electrode 231*a* and 232*a*, facing the body 110, may each have the same area as those of the third and fourth surfaces 3 and 4 of the body 110. The first and second connection electrodes 231*a* and 232*a* may each be disposed not to deviate from the third and fourth surfaces 3 and 4. The connection electrode 231*a* or 232*a* may not be extended to the first, second, fifth and sixth surface 1, 2, 5 or 6 of the body 110. In detail, the first or second connection electrode 231*a* or 232*a* in another exemplary embodiment may be spaced apart from the fifth and sixth surfaces. Accordingly, it is possible to minimize the volume of the external electrode while ensuring sufficient connectivity between the internal electrode 121 or 122 and the external electrode 231 or 232, thereby increasing the capacitance of the multilayer electronic component 2000 per unit volume.

In this regard, the first or second connection electrode 231*a* or 232*a* may be spaced apart from the second surface 2. That is, none of the external electrodes 231 and 232 may be disposed on the second surface to further minimize the volumes of the external electrodes 231 and 232, thereby further increasing the capacitance of the multilayer electronic component 2000 per unit volume.

However, the connection electrode 231*a* or 232*a* may include a corner portion extended to a corner of the body 110. That is, in another exemplary embodiment, the first connection electrode 231*a* may include the corner portions (not shown) extended to the 1-3 corner and the 2-3 corner, and the second connection electrode 232*a* may include the corner portions (not shown) extend to the 1-4 corner and the 2-4 corner.

In addition, the connection electrode 231*a* or 232*a* may have a uniform and small thickness compared to the external electrode formed by the conventional dipping method.

A method of forming the connection electrode 231*a* or 232*a* may not need to be particularly limited. For example, the connection electrode may be formed by transferring a sheet including the conductive metal or an organic material such as a binder on the third or fourth surface.

The thickness of the connection electrode 231*a* or 232*a* is not particularly limited, and may be 2 to 7 μm for example. Here, the thickness of the connection electrode 231*a* or 232*a* may indicate a maximum thickness, and indicate a size of the connection electrode 231*a* or 232*a* in the second direction.

In another exemplary embodiment, the first and second connection electrode 231*a* or 232*a* may include the same metal and glass as those included in the internal electrode 121 or 122. The first and second connection electrode 231*a* or 232*a* may include the same metal as the metal included in the internal electrode 121 or 122*m* thus having improved electrical connectivity with the internal electrodes 121 and 122, and the first and second connection electrode 231*a* or 232*a* may include glass, thus having improved bonding force with the body 110 and/or the insulating layer 251 or 252. Here, nickel (Ni) may be the same metal as the metal included in the internal electrode 121 or 122.

In another exemplary embodiment, the first or second connection electrode 231*a* or 232*a* may include any one or more of nickel (Ni) and the alloy of nickel (Ni), thereby suppressing the radiation cracking from occurring in the multilayer electronic component 2000 by the stress occurring while forming the insulating layer 251 or 252.

Alternatively, the first or second connection electrode 231*a* or 232*a* may include nickel (Ni) as its main component, thereby further suppressing the occurrence of the radiation cracking.

The content of nickel (Ni) included in the first or second connection electrode 231*a* or 232*a* may be 50 mol % or more compared to 100 mol of the conductive metal included in the connection electrode, is not limited thereto, and may be sufficient to suppress the occurrence and propagation of the radiation cracking.

A component of the first or second connection electrode 231*a* or 232*a* may be measured by using the same method as the above-described method of measuring the component of the first or second external electrode 131 or 132.

The first and second insulating layers 251 and 252 may each be disposed on the first and second connection electrodes 231*a* and 232*a*, thus serving to prevent the formation of the plating layer on the first and second connection electrodes 231*a* and 232*a*. In addition, the first and second insulating layer 251 or 252 may improve the sealing characteristic, thus serving to minimize the penetration of the external moisture or the plating solution.

The material included in the first or second insulating layer 251 or 252 may not need to be particularly limited, and the first or second insulating layer 251 or 252 may have the electrical insulation property by including the insulation material. For example, the insulation material included in the first or second insulating layer 251 or 252 may have the electrical insulation property. For example, the insulation material included in the insulating layer 251 or 252 may be one or more selected from epoxy resin, acrylic resin, ethyl cellulose or the like, or glass. In more detail, the material included in the first or second insulating layer 251 or 252 may be a glass material having excellent resistance to the plating solution and a mole fraction of silicon (Si) of 20 mol % or more and 65 mol % or less. In another exemplary embodiment, the multilayer electronic component 2000 may include the first or second insulating layer 251 or 252 including glass and then be mounted on the board. In this case, it is possible to prevent the crack from occurring in the multilayer electronic component 2000 due to its thermal contraction which may occur in the solder reflow process.

Meanwhile, a temperature for firing the glass may be high when the first or second insulating layer 251 or 252 includes the glass material, and the thermal stress may thus be induced in the multilayer electronic component in a process of forming the insulating layer 251 or 252. In addition, the radiation cracking may be induced by the diffusion of nickel (Ni) to the internal electrode when the external electrode 231 or 232 includes copper (Cu).

According to the multilayer electronic component 2000 according to another exemplary embodiment of the present disclosure, the first or second connection electrode 231*a* or 232*a* may include at least one of nickel (Ni) and the alloy of nickel (Ni), thereby effectively suppressing the occurrence and propagation of the radiation cracking; and according to the multilayer electronic component 2000' according to another exemplary embodiment of the present disclosure, a first or second additional electrode layer 234 or 235 may be disposed between the first or second connection electrode 231a or 232a and the third or fourth surface, thereby effectively suppressing the occurrence and propagation of the radiation cracking. It is thus possible to more remarkably suppress the occurrence and propagation of the radiation cracking when the first or second insulating layer 251 or 252 includes glass.

A method of forming the first or second insulating layer 251 or 252 may not need to be particularly limited. For example, the external electrodes 231 and 232 may be formed on the body 110 and the first or second insulating layer 251 or 252 may then be made by applying the paste including glass powder to the external electrodes or by dipping the external electrodes into the paste including glass and then heat-treating the same.

The first and second band electrode 231b or 232b may be disposed on the first surface 1 of the body 110. The first and second band electrodes 231b and 232b may each be in contact with the first and second connection electrodes 231a and 232a, and thus each be electrically connected to the first and second internal electrodes 121 and 122.

The external electrode formed by the conventional dipping method may have a large thickness on the third or fourth surface, also be partially extended to the first, second, fifth and sixth surfaces, and thus may have difficulty in securing a high effective volume ratio.

On the other hand, another exemplary embodiment of the present disclosure may have the first and second connection electrode 231a or 232a disposed on the surface to which the internal electrode is exposed, and the first or second band electrode 231b or 232b disposed on the surface on which the multilayer electronic component is mounted on the board, thereby ensuring the high effective volume ratio.

Meanwhile, when the internal electrodes 121 and 122 are stacked on each other in the first direction, the multilayer electronic component 2000 may be horizontally mounted on the board so that the internal electrodes 121 and 122 are parallel to the surface on which the multilayer electronic component is mounted. However, the present disclosure is not limited to the horizontal mounting, and when the internal electrodes 121 and 122 are stacked on each other in the third direction, the multilayer electronic component may be vertically mounted on the board so that the internal electrodes 121 and 122 are perpendicular to the surface on which the multilayer electronic component is mounted.

The first or second band electrode 231b or 232b may be made of any material as long as the material have the electrical conductivity such as the metal, and may use the specific material determined in consideration of the electrical characteristic, the structural stability or the like. For example, the first or second band electrode 231 or 232b may be a fired electrode including the conductive metal and glass, and formed using a method of applying a paste including the conductive metal and glass to the first surface of the body. However, the band electrode is not limited thereto, and may be a plating layer in which the conductive metal is plated on the first surface of the body.

The conductive metal included in the first or second band electrode 231 or 232*bs* may use the material having the excellent electrical conductivity, and is not particularly limited. For example, the conductive metal may be at least one of nickel (Ni), copper (Cu) and alloys thereof, and may include the same metal as the metal included in the internal electrode 121 or 122.

Meanwhile, in another exemplary embodiment, in order to ensure the sealing characteristic and a higher strength, the first external electrode 231 may further include a third band electrode disposed on the second surface 2 and connected to the first connection electrode 231a, and the second external electrode 232 may further include a fourth band electrode (not shown) disposed on the second surface 2 and connected to the second connection electrode 232a.

In another exemplary embodiment, $B1 \geq G1$, $B3 \leq G1$, $B2 \geq G2$ and $B4 \leq G2$ when B1 indicates a distance from the extension line E3 of the third surface 3 to an end of the first band electrode 231b, B2 indicates a distance from the extension line E4 of the fourth surface 4 to an end of the second band electrode 232b, B3 indicates a distance from the extension line E3 of the third surface 3 to an end of the third band electrode (not shown), B4 indicates a distance from the extension line E4 of the fourth surface 4 to an end of the fourth band electrode (not shown), G1 indicates an average size of a region in the second direction, where the third surface 3 and the second internal electrode 122 are spaced apart from each other, and G2 indicates an average size of a region in the second direction, where the fourth surface 4 and the first internal electrode 121 are spaced apart from each other. Accordingly, it is possible to minimize the volume of the external electrode, thereby increasing the capacitance of the multilayer electronic component 200 per unit volume and to simultaneously increase the area in which the multilayer electronic component is in contact with the solder when the multilayer electronic component is mounted on the board, thereby improving the bonding strength.

However, it is not intended to limit the present disclosure to $B1 \geq G1$, $B3 \leq G1$, $B2 \geq G2$ and $B4 \leq G2$, and a case where $B1 \geq G1$, $B3 \geq G1$, $B2 \geq G2$ and $B4 \geq G2$ may also be included as another exemplary embodiment of the present disclosure. Accordingly, in another exemplary embodiment, $B1 \geq G1$, $B3 \geq G1$, $B2 \geq G2$, and $B4 \geq G2$ when B1 indicates the distance from the extension line E3 of the third surface to the end of the first band electrode 231b, B2 indicates the distance from the extension line E4 of the fourth surface to the end of the second band electrode 232b, B3 indicates the distance from the extension line of the third surface to the end of the third band electrode (not shown), B4 indicates the distance from the extension line of the fourth surface to the end of the fourth band electrode (not shown), G1 indicates the average size of the region in the second direction, where the third surface and the second internal electrode 122 are spaced apart from each other, and G2 indicates the average size of the region in the second direction, where the fourth surface and the first internal electrode 121 are spaced apart from each other.

The first or second plating layer 241 or 242 may be disposed on the first or second band portion 131b or 132b. The first or second plating layer 241 or 242 may allow the multilayer electronic component to be more easily mounted on the board. The plating layer 241 or 242 is not limited to a particular type, may include at least one of nickel (Ni), tin (Sn), palladium (Pd) and alloys thereof, or may include a plurality of layers.

As a more specific example of the plating layer 241 or 242, the plating layer 241 or 242 may be a nickel (Ni) plating layer or a tin (Sn) plating layer for example, and may have the Ni plating layer and the Sn plating layer sequentially formed on the first or second band portion 131b or 132b.

In another exemplary embodiment, the first and second plating layers 241 and 242 may respectively be extended to partially cover the first and second connection portions 231a and 232a.

H1≥H2 when H1 indicates the average size of the region in the first direction, measured from the first surface 1 to the internal electrode disposed closest to the first surface 1 among the first and second internal electrodes 121 and 122, and H2 indicates an average size of the first or second plating layer 241 or 242 in the first direction, measured from the extension line E1 of the first surface 1 to an end of the plating layer disposed on the first or second connection electrode 231a or 232a. Accordingly, it is possible suppress the plating solution from penetrating into the internal electrode during the plating process, thereby allowing the multilayer electronic component to have the improved reliability.

Meanwhile, when the conductive metal included in the first or second band electrode 231b or 232b includes nickel (Ni) as its main component, nickel (Ni) may be easily oxidized by the plating solution or the moisture to have a lower plating property.

In another exemplary embodiment, the first or second band electrode 231b or 232b may include copper (Cu), thereby improving the plating property of the plating layer 241 or 242 described below. In particular, the first or second band electrode 231b or 232b may be disposed on the first surface of the body 110, thereby allowing the multilayer electronic component to be more easily mounted on the board.

Therefore, according to another exemplary embodiment, the first or second connection electrode 231a or 232a may include at least one of nickel (Ni) and the alloy of nickel (Ni), and the first or second band electrode may include copper (Cu), thereby suppressing the occurrence of the radiation cracking, securing a good plating property and allowing the multilayer electronic component to be more easily mounted on the board.

Alternatively, the first or second connection electrode 231a or 232a may include nickel (Ni) as its main component, and the first or second band electrode 231b or 232b may include copper (Cu) as its main component, thereby making the above-described effects more remarkable.

The content of nickel (Ni) included in the first or second connection electrode 231a or 232a may be 50 mol % or more compared to 100 mol of the conductive metal included in the connection electrode, is not limited thereto, and may be sufficient to suppress the occurrence and propagation of the radiation cracking.

The content of copper (Cu) included in the first or second band electrode 231b or 232b may be 50 mol % or more compared to 100 mol of the conductive metal included in the band electrode, is not limited thereto, and may be sufficient to secure the plating property.

In another exemplary embodiment, the first plating layer 241 may cover the end of the insulating layer 251, disposed on the first external electrode 231, and the second plating layer 242 may cover the end of the insulating layer 252, disposed on the second external electrode 232. Accordingly, it is possible to strengthen a bonding force of the insulating layer 251 or 252 and the plating layer 241 or 242, thereby improving the reliability of the multilayer electronic component 2000.

In another exemplary embodiment, the first insulating layer 251 may cover an end of the first plating layer 241, disposed on the first external electrode 231, and the second insulating layer 252 may cover an end of the second plating layer 242, disposed on the second external electrode 232. Accordingly, it is possible to strengthen a bonding force of the insulating layer 251 and the plating layer 241 or 242, thereby improving the reliability of the multilayer electronic component 2000.

Figure 22:
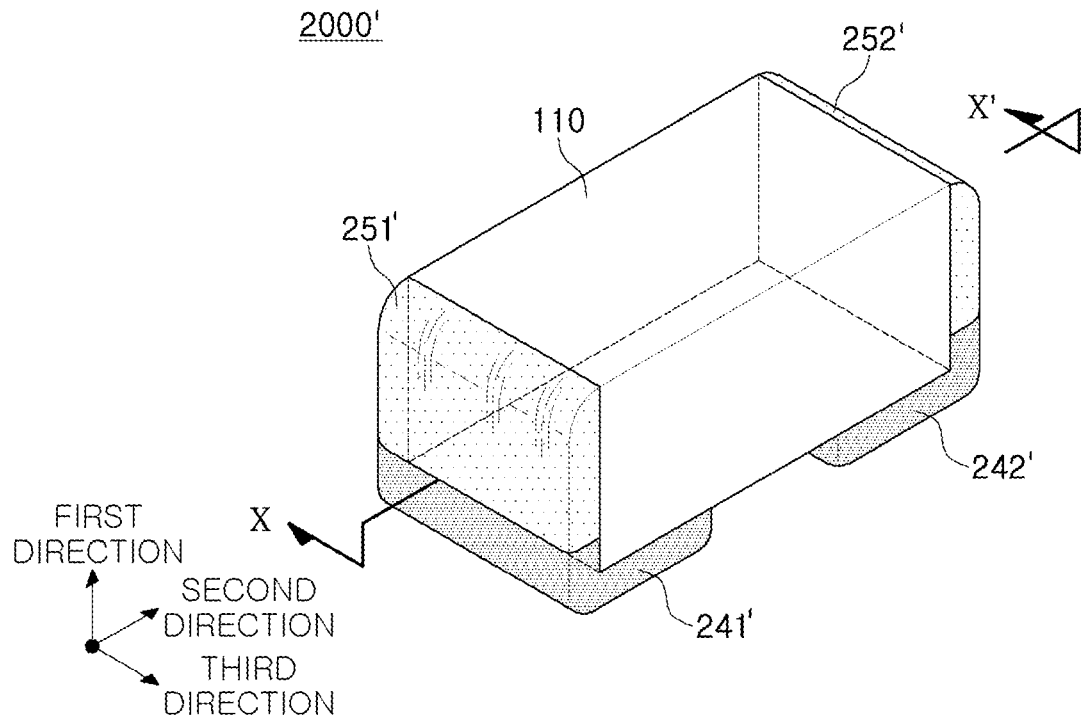
FIG. 22 is a perspective view schematically illustrating a multilayer electronic component according to another exemplary embodiment of the present disclosure.
Figure 23:
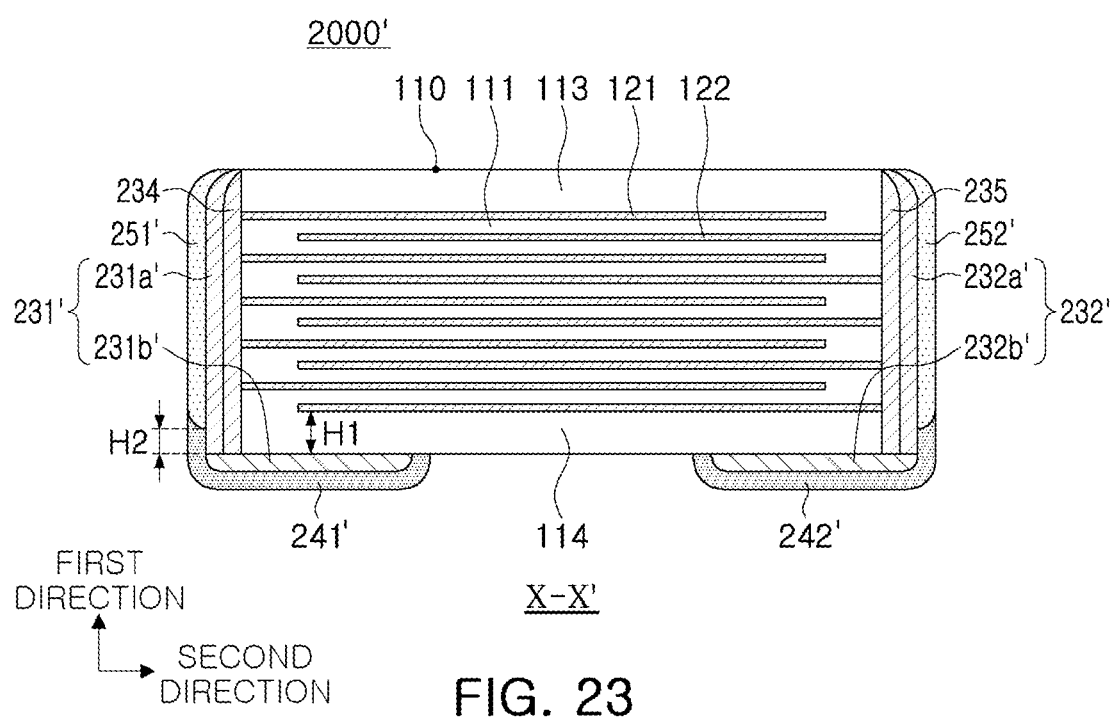
FIG. 23 is a cross-sectional view taken along line X-X' of FIG. 22.

FIG. 22 is a perspective view schematically illustrating a multilayer electronic component 2000' according to another exemplary embodiment of the present disclosure; and FIG. 23 is a cross-sectional view taken along line X-X' of FIG. 22.

Referring to FIGS. 22 and 23, the multilayer electronic component 2000' according to another exemplary embodiment of the present disclosure may include: the body 110; a first external electrode 231' including a first connection electrode 231a' disposed on the third surface 3 and a first band electrode 231b' disposed on the first surface 1 and connected to the first connection electrode 231a'; a second external electrode 232' including a second connection electrode 232a' disposed on the fourth surface 4 and a second band electrode 232b' disposed on the first surface 1 and connected to the second connection electrode 232a'; a first insulating layer 251' disposed on the first connection electrode; a second insulating layer 252' disposed on the second connection electrode; a first plating layer 241' disposed on the first band electrode 231b'; and a second plating layer 242' disposed on the second band electrode 232b'. A first additional electrode layer 234 may be disposed between the first connection electrode 231a' and the third surface 3, and a second additional electrode layer 235 may be disposed between the second connection electrode 232a' and the fourth surface 4.

Here, the first or second connection electrode 231a' or 232a' may include copper (Cu), and the additional electrode layer 234 or 235 may include at least one of nickel (Ni) and an alloy of nickel (Ni), thereby suppressing the occurrence of the radiation cracking.

Alternatively, the first or second connection electrode 231a' or 232a' may include copper (Cu) as its main component, and the additional electrode layer 234 or 235 may include nickel (Ni) as its main component, thereby further remarkably suppressing the occurrence of the radiation cracking.

Hereinafter, the description describes various examples of the multilayer electronic component 2000 or 2000' according to another exemplary embodiment of the present disclosure. The description basically describes the multilayer electronic component 2000. However, the following examples may also be applied to the multilayer electronic component 2000' including the additional electrode layer.

Figure 24:
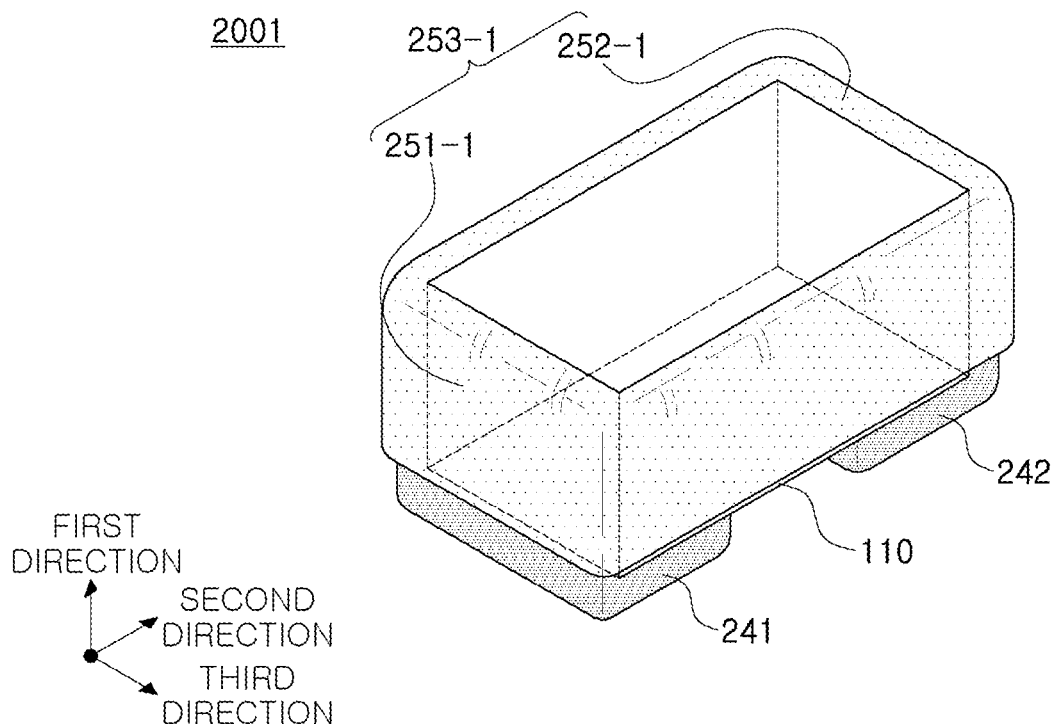
FIG. 24 illustrates a modified example of FIG. 20.

FIG. 24 illustrates a modified example of FIG. 20. Referring to FIG. 24, in a modified example 2001 of the multilayer electronic component 2000 according to another exemplary embodiment of the present disclosure, first and second insulating layers 251-1 and 252-1 may be extended to the fifth and sixth surfaces 5 and 6 and connected to each other to be a single insulating layer 253-1. Here, the insulating layer 253-1 formed by connecting the first and second insulating layers to each other may cover the partial fifth and sixth surfaces.

Figure 25:
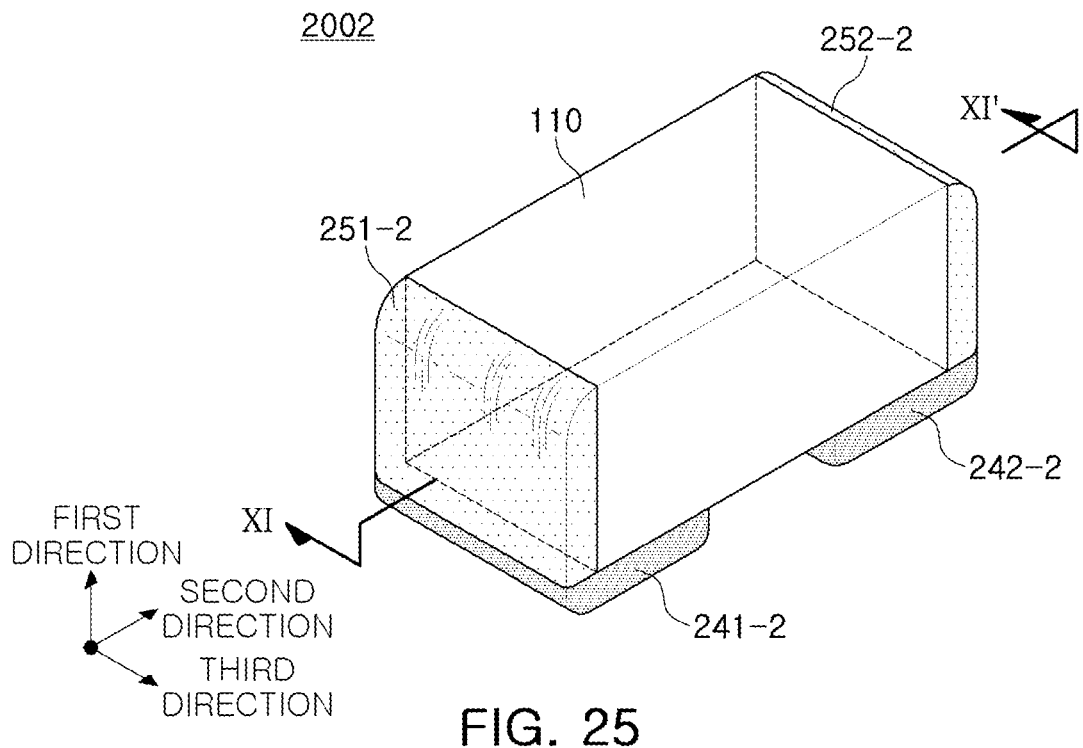
FIG. 25 is a perspective view schematically illustrating a multilayer electronic component according to another exemplary embodiment of the present disclosure.
Figure 26:
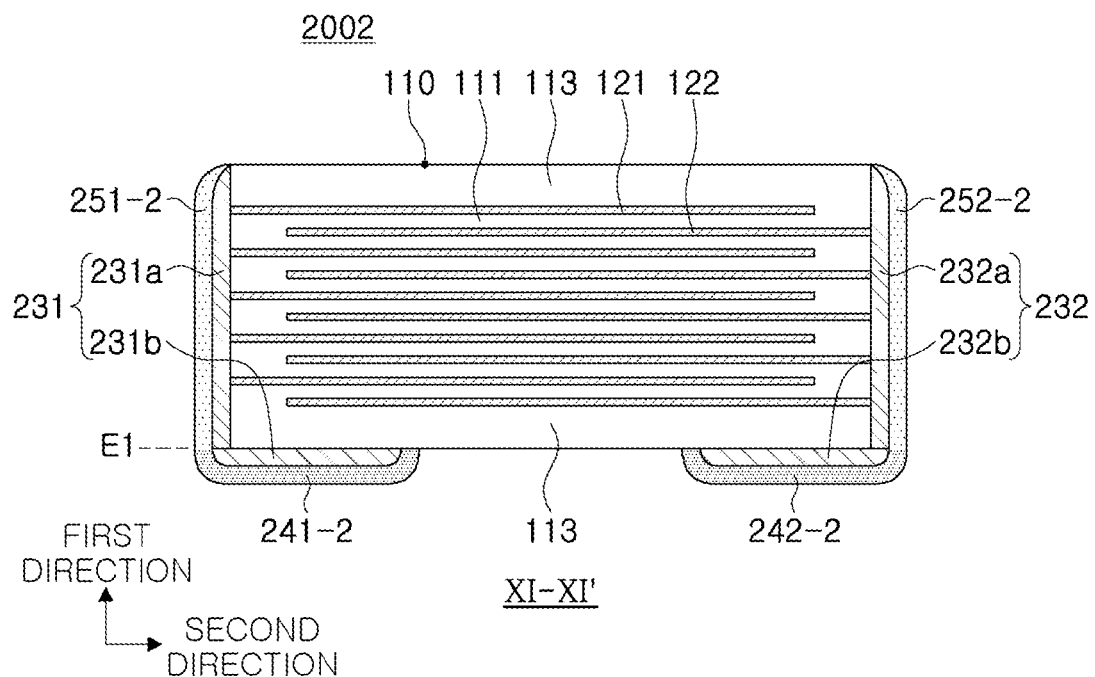
FIG. 26 is a cross-sectional view taken along line XI-XI' of FIG. 25.

FIG. 25 is a perspective view schematically illustrating a multilayer electronic component 2002 according to another exemplary embodiment of the present disclosure; and FIG. 26 is a cross-sectional view taken along line XI-XI' of FIG. 25.

Referring to FIGS. 25 and 26, the multilayer electronic component 2002 according to another exemplary embodiment of the present disclosure may have first and second plating layers 241-2 and 242-2 each disposed on a level the same as or below the extension line of the first surface. Accordingly, it is possible to minimize the height of the solder when the multilayer electronic component is mounted on the board and to minimize the space in which the multilayer electronic component is mounted.

In addition, first and second insulating layers 251-2 and 252-2 may each be extended below the extension line of the first surface to be in contact with the first and second plating layers 241-2 and 242-2.

Figure 27:
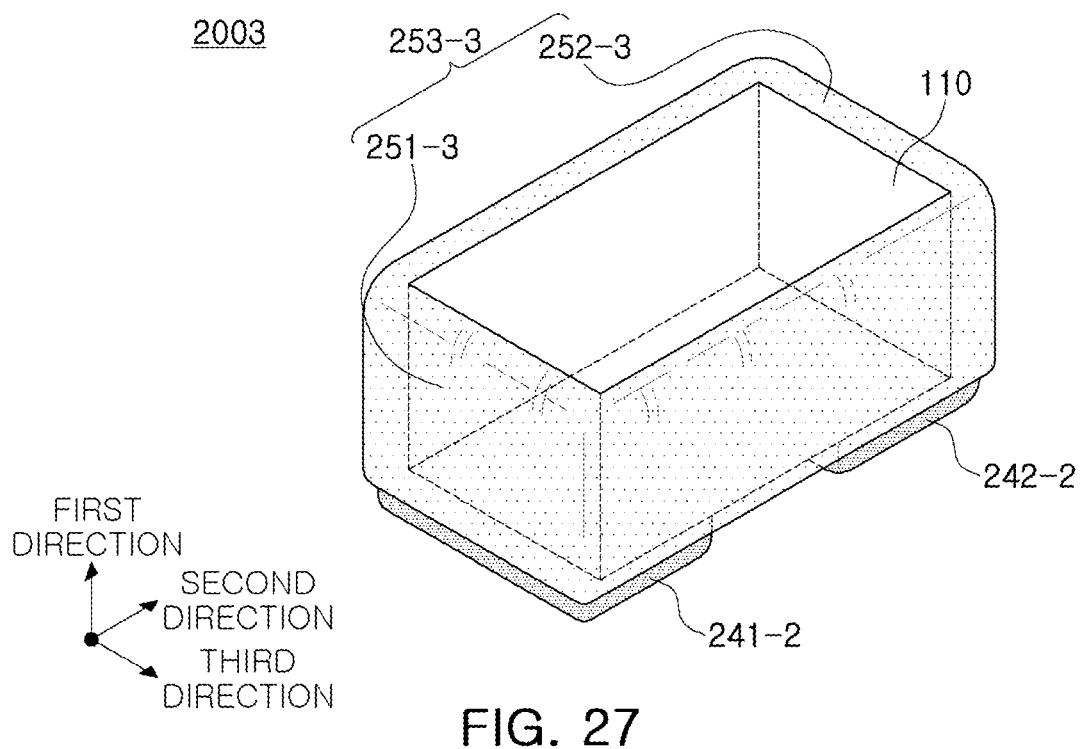
FIG. 27 illustrates a modified example of FIG. 25.

FIG. 27 illustrates a modified example of FIG. 25. Referring to FIG. 27, in a modified example 2003 of the multilayer electronic component 2003 according to another exemplary embodiment of the present disclosure, first and second insulating layers 251-3 and 252-3 may be extended to the fifth and sixth surfaces 5 and 6 and connected to each other to be a single insulating layer 253-3. Here, the insulating layer 253-3 formed by connecting the first and second insulating layers to each other may cover the entire fifth and sixth surfaces 5 and 6.

Figure 28:
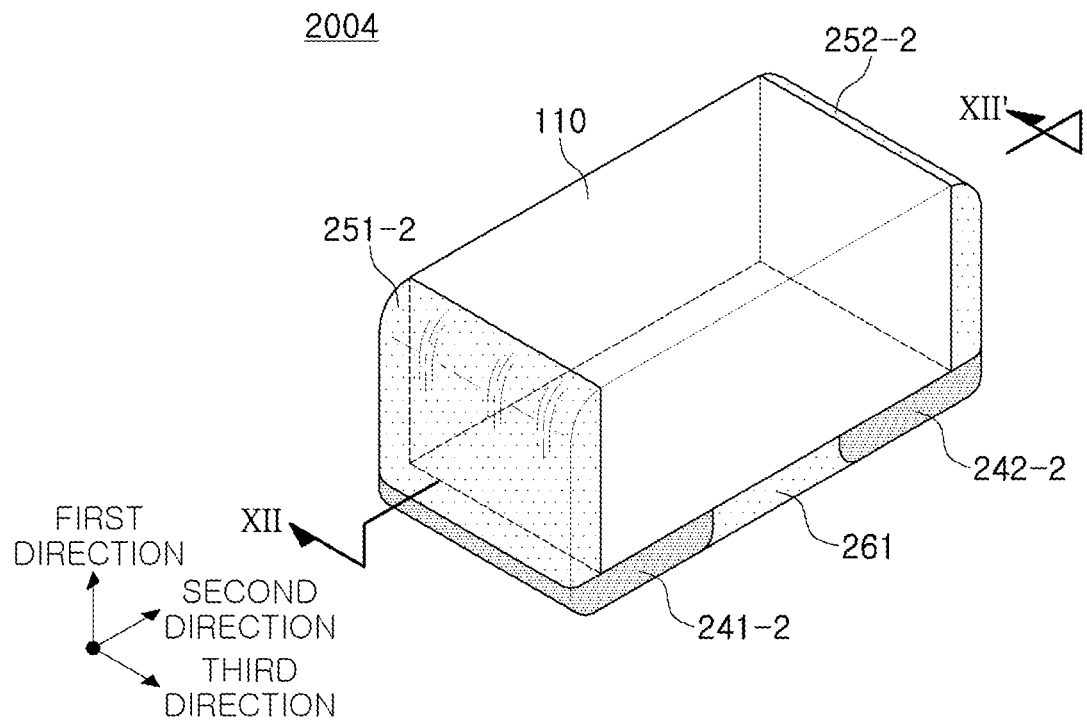
FIG. 28 is a perspective view schematically illustrating a multilayer electronic component according to another exemplary embodiment of the present disclosure.
Figure 29:
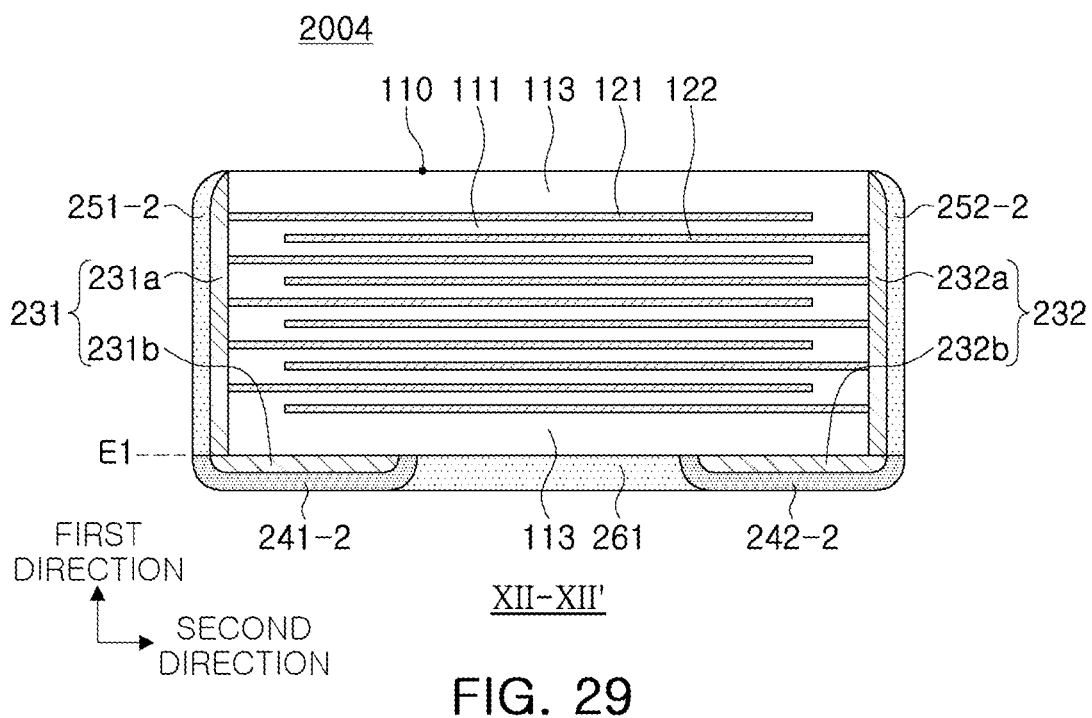
FIG. 29 is a cross-sectional view taken along line XII-XII' of FIG. 26.

FIG. 28 is a perspective view schematically illustrating a multilayer electronic component 2004 according to another exemplary embodiment of the present disclosure; and FIG. 29 is a cross-sectional view taken along line XII-XII' of FIG. 26.

Referring to FIGS. 28 and 29, the multilayer electronic component 2004 according to another exemplary embodiment of the present disclosure may further include an additional insulating layer 261 disposed on the first surface 1 and between the first band electrode 231b and the second band electrode 232b. Accordingly, it is possible to prevent the leakage current or the like which may occur between the first band electrode 231b and the second band electrode 232b under the high-voltage current.

The additional insulating layer 261 may not need to be limited to a particular type. For example, the additional insulating layer 261 may include glass like the first or second insulating layer 251-2 or 252-2. However, it is not necessary to limit the additional insulating layer 261 and the first or second insulating layer 251-2 or 252-2 to the same material, and the two insulating layers may be made of materials different from each other. For example, the additional insulating layer may include one or more selected from epoxy resin, acrylic resin, ethyl cellulose or the like.

Figure 30:
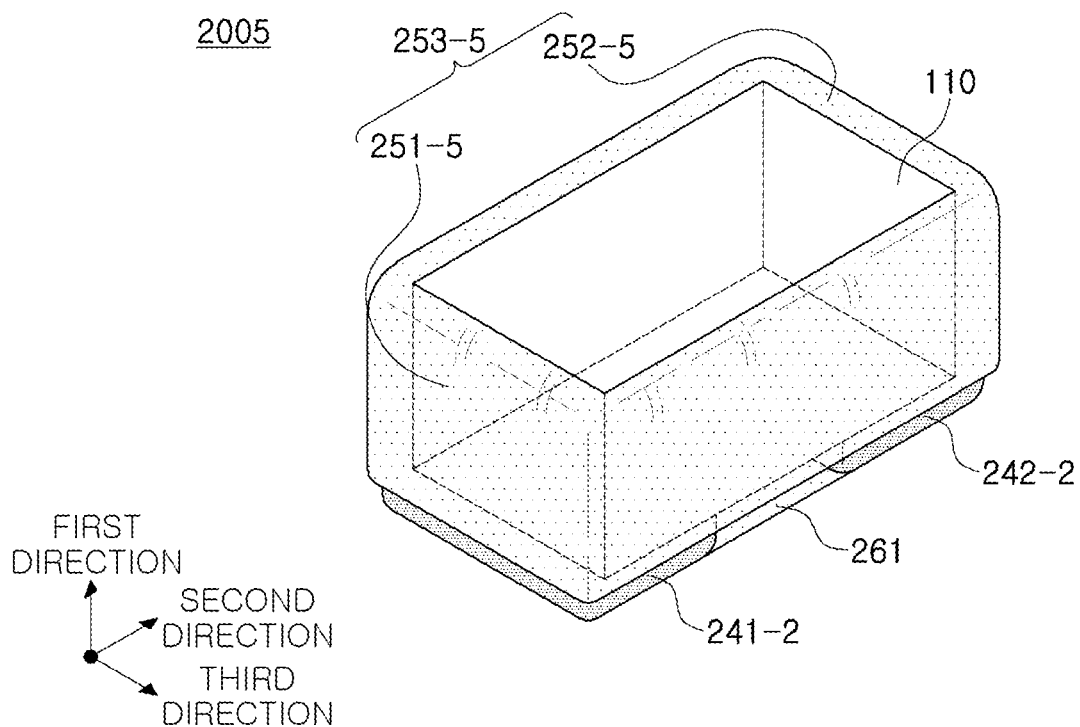
FIG. 30 illustrates a modified example of FIG. 28.

FIG. 30 illustrates a modified example of FIG. 28. Referring to FIG. 30, in the modified example 2005 of the multilayer electronic component 2004 according to another exemplary embodiment of the present disclosure, first and second insulating layers 251-5 and 252-5 may be extended to the fifth and sixth surfaces 5 and 6 and connected to each other to be a single insulating layer 253-5.

Figure 31:
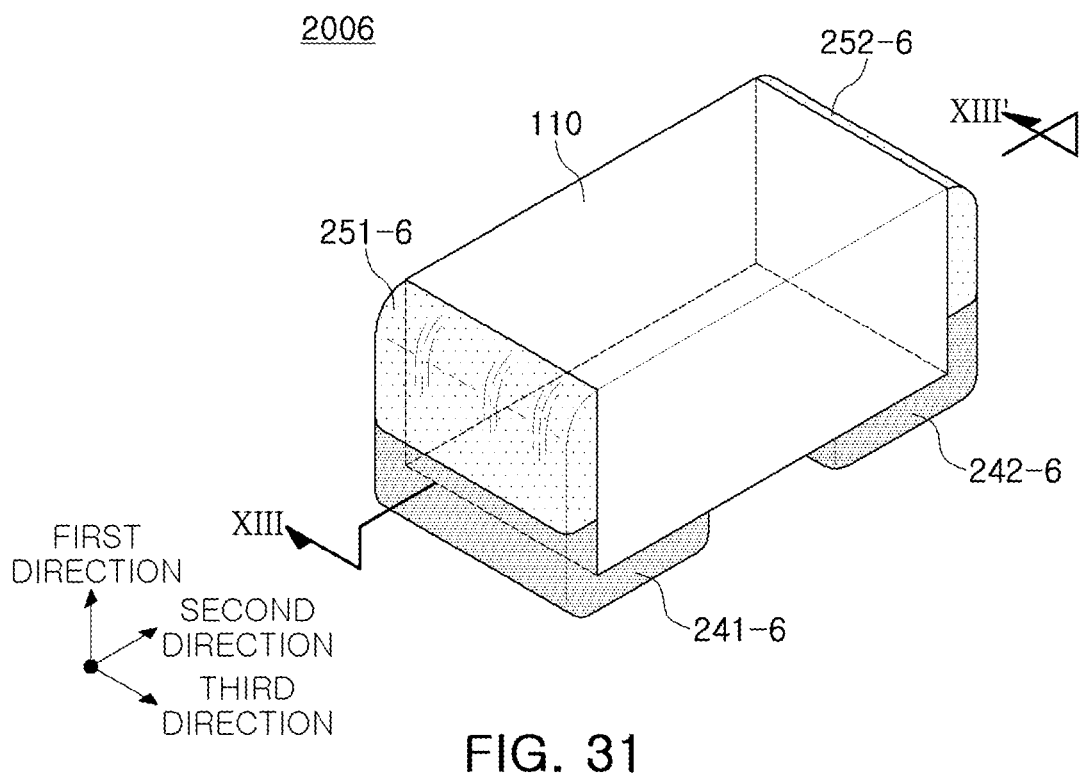
FIG. 31 is a perspective view schematically illustrating a multilayer electronic component according to another exemplary embodiment of the present disclosure.
Figure 32:
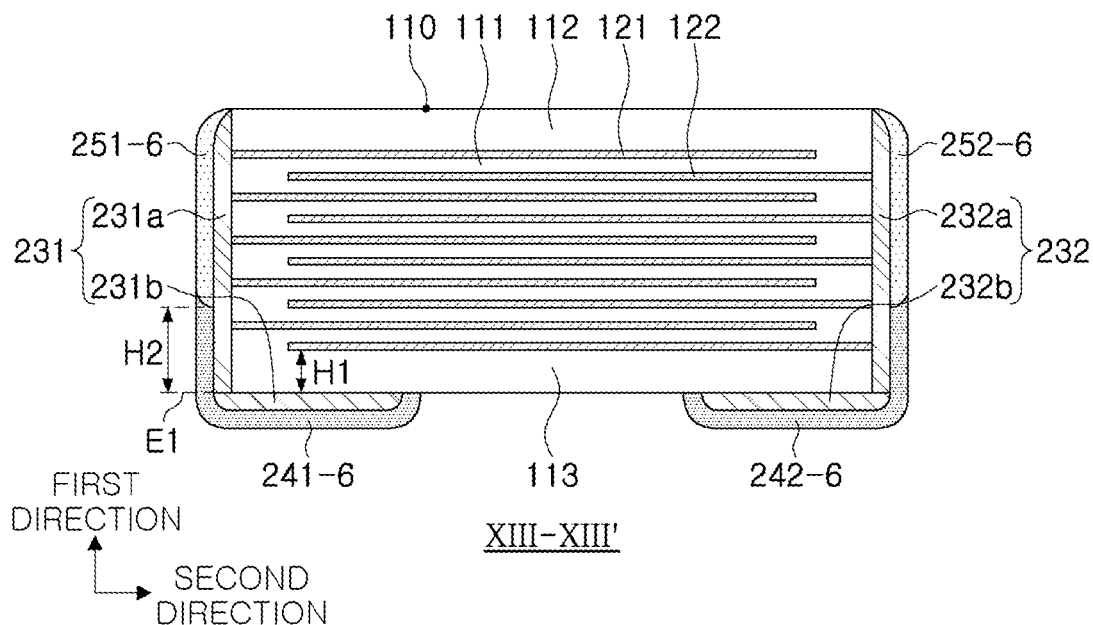
FIG. 32 is a cross-sectional view taken along line XIII-XIII' of FIG. 31.

FIG. 31 is a perspective view schematically illustrating a multilayer electronic component 2006 according to another exemplary embodiment of the present disclosure; and FIG. 32 is a cross-sectional view taken along line XIII-XIII' of FIG. 31.

Referring to FIGS. 31 and 32, the multilayer electronic component 2006 according to another exemplary embodiment may include a first insulating layer 251-6 disposed on the first connection electrode 231a and a second insulating layer 252-6 disposed on the second connection electrode 232a, wherein H1<H2 when H1 indicates the average size of the region in the first direction, measured from the first surface 1 to the internal electrode disposed closest to the first surface 1 among the first and second internal electrodes 121 and 122, and H2 indicates an average size of the first or second plating layer 241-6 or 242-6 in the first direction, measured from the extension line of the first surface 1 to an end of the plating layer disposed on the first or second connection electrode 231a or 232a. Accordingly, it is possible to improve the bonding strength by increasing the area in which the multilayer electronic component is in contact with the solder when the multilayer electronic component is mounted on the board.

H2<T/2 when T indicates the average size of the body 110 in the first direction. That is, H1<H2<T/2. The reason is that the moisture resistance reliability improved by the insulating layer may be reduced when H2 is T/2 or more.

Figure 33:
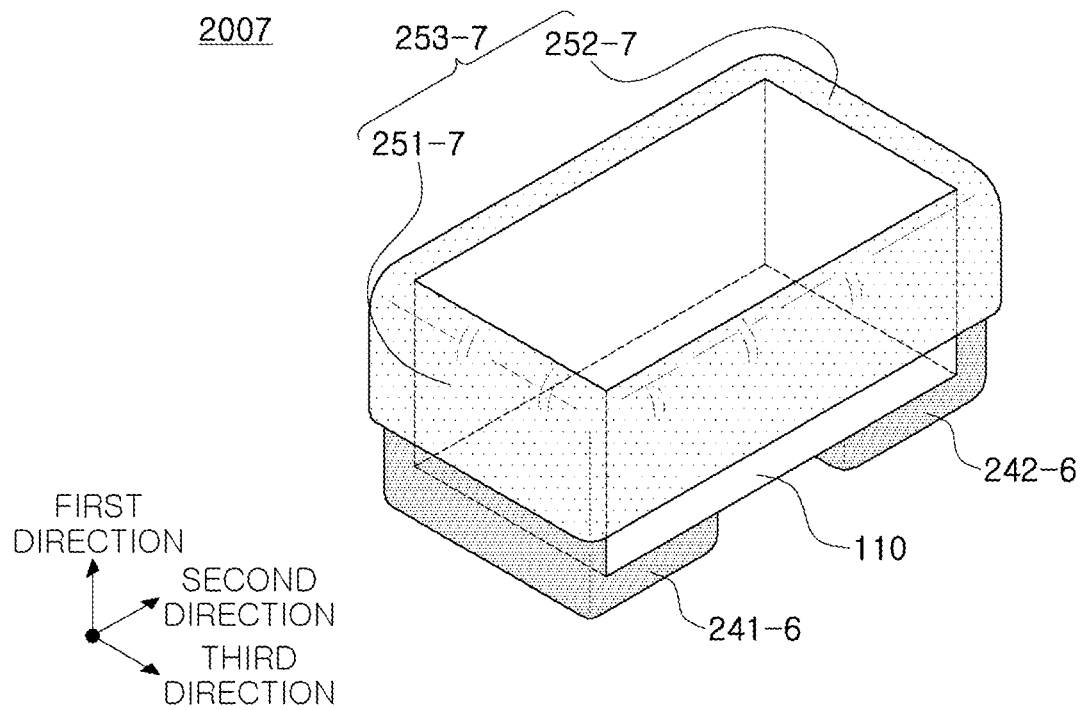
FIG. 33 illustrates a modified example of FIG. 31.

FIG. 33 illustrates a modified example of FIG. 31. Referring to FIG. 33, in a modified example 2007 of the multilayer electronic component 2006 according to another exemplary embodiment of the present disclosure, first and second insulating layers 251-7 and 252-7 may be extended to the fifth and sixth surfaces 5 and 6 and connected to each other to be a single insulating layer 253-7.

Figure 34:
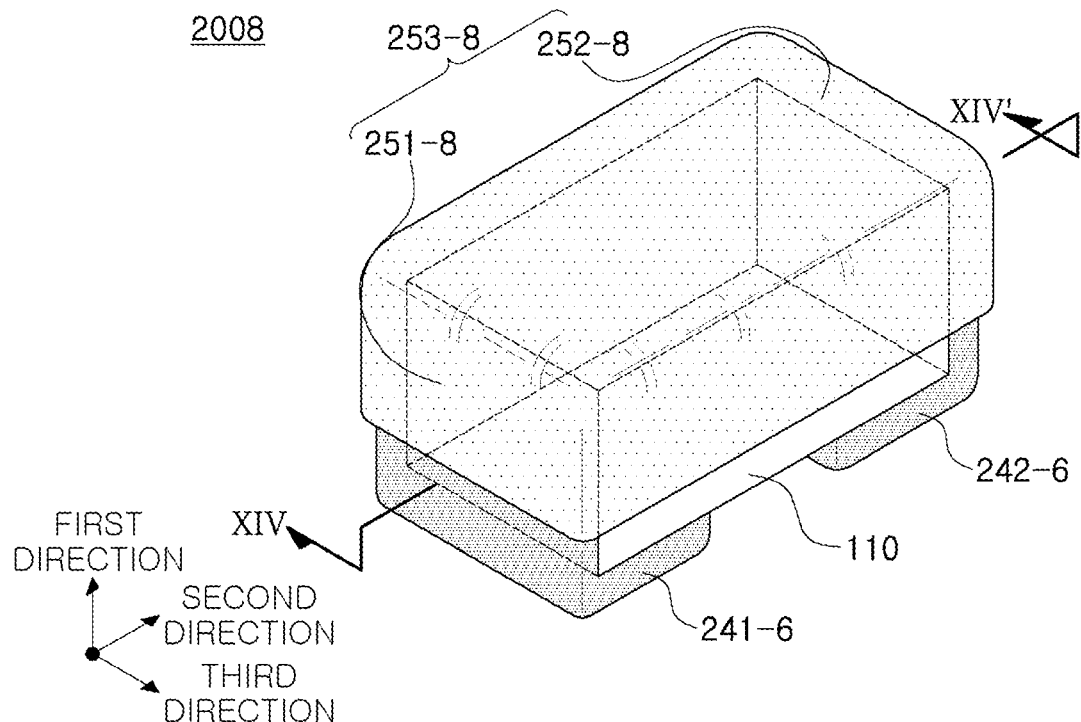
FIG. 34 is a perspective view schematically illustrating a multilayer electronic component according to another exemplary embodiment of the present disclosure.
Figure 35:
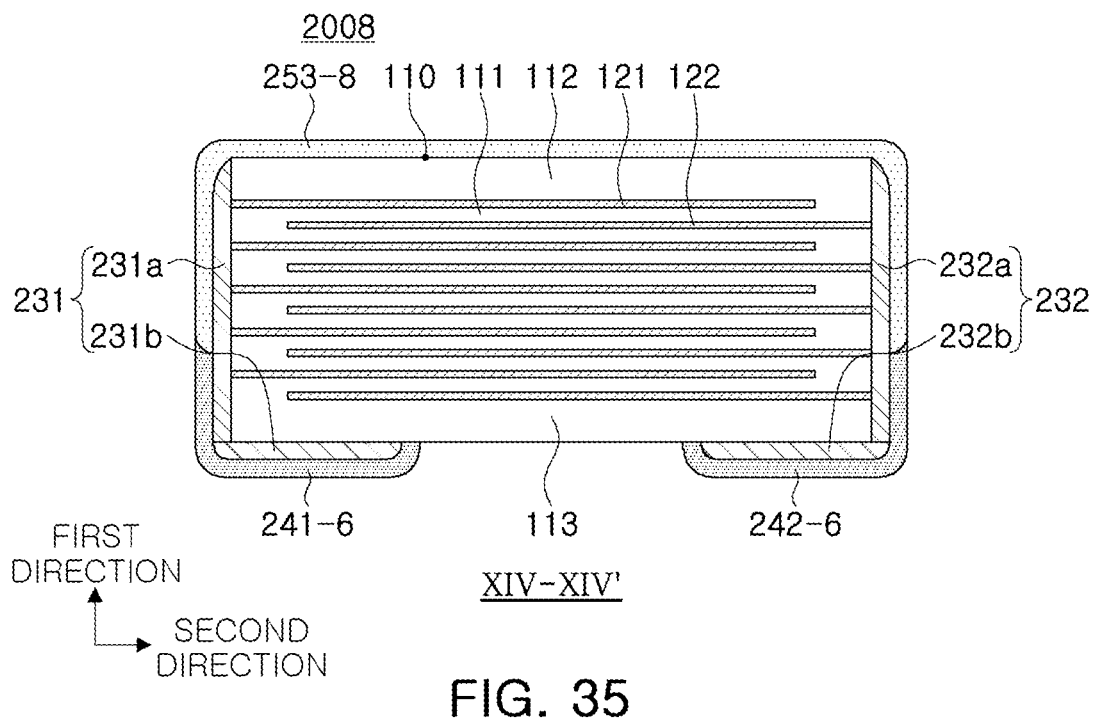
FIG. 35 is a cross-sectional view taken along line XIV-XIV' of FIG. 34.

FIG. 34 is a perspective view schematically illustrating a multilayer electronic component 2008 according to another exemplary embodiment of the present disclosure; and FIG. 35 is a cross-sectional view taken along line XIV-XIV' of FIG. 34.

Referring to FIGS. 34 and 35, in the multilayer electronic component 2008 according to another exemplary embodiment of the present disclosure, first and second insulating layers 251-8 and 252-8 may be extended to the fifth and sixth surfaces 5 and 6 and connected to each other to be a single insulating layer 253-8. As shown in FIG. 33, the insulating layer 253-8 may cover the entire second surface and the partial fifth and sixth surfaces.

Figure 36:
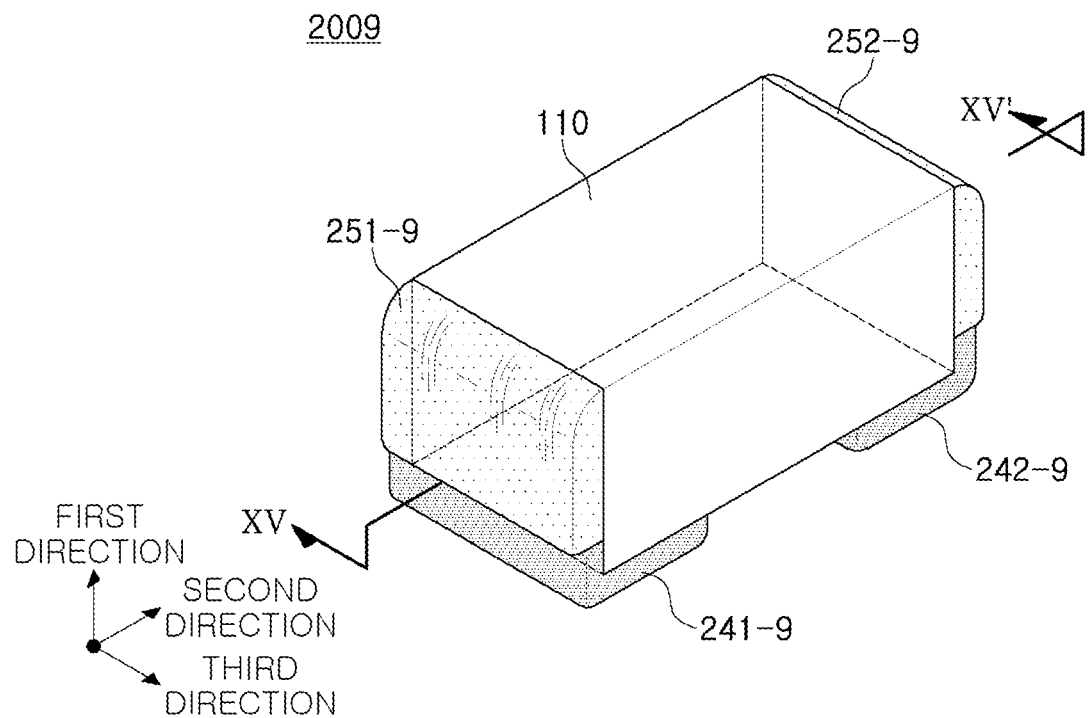
FIG. 36 is a perspective view schematically illustrating a multilayer electronic component according to another exemplary embodiment of the present disclosure.
Figure 37:
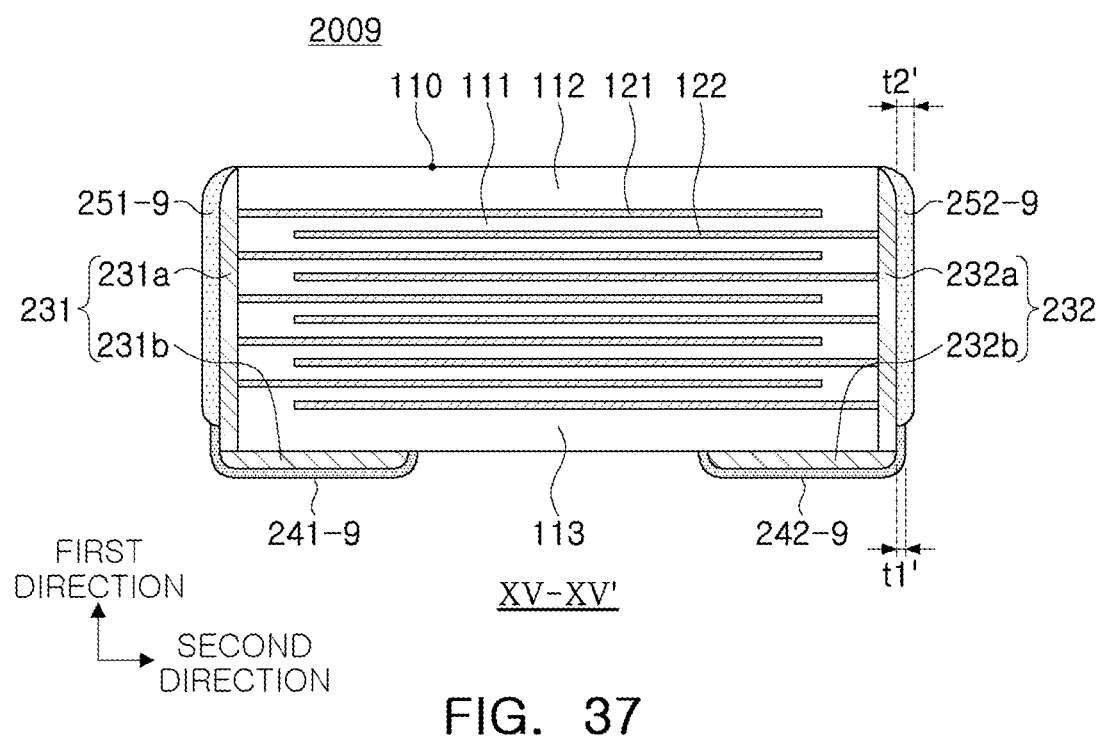
FIG. 37 is a cross-sectional view taken along line XV-XV' of FIG. 36.

FIG. 36 is a perspective view schematically illustrating a multilayer electronic component 2009 according to another exemplary embodiment of the present disclosure; and FIG. 37 is a cross-sectional view taken along line XV-XV' of FIG. 36.

Referring to FIGS. 36 and 37, in the multilayer electronic component 2009 according to another exemplary embodiment of the present disclosure, a first or second plating layer 241-9 or 242-9 may have an average thickness t1' smaller than an average thickness t2' of a first or second insulating layer 251-9 or 252-9.

According to another exemplary embodiment of the present disclosure, the first or second plating layer 241-9 or 242-9 may have the average thickness t1' made smaller than the average thickness t2' of the first or second insulating layer 251-9 or 252-9, thereby reducing the area in which the plating layer and the insulating layer are in contact with each other. It is thus possible to suppress the occurrence of the delamination, thereby improving the bonding strength of the multilayer electronic component 2009 with the board 180.

The average thickness t1' of the first or second plating layer 241-9 or 242-9 may be a value obtained by averaging its thicknesses measured at five equally spaced points on the first or second connection electrode 231a or 232a, or the first and second band electrode 231b or 232b, and the average thickness t2' of the insulating layer 251-9 or 252-9 may be a value obtained by averaging its thicknesses measured at five equally spaced points on the first or second connection electrode 231a or 232a.

Figure 38:
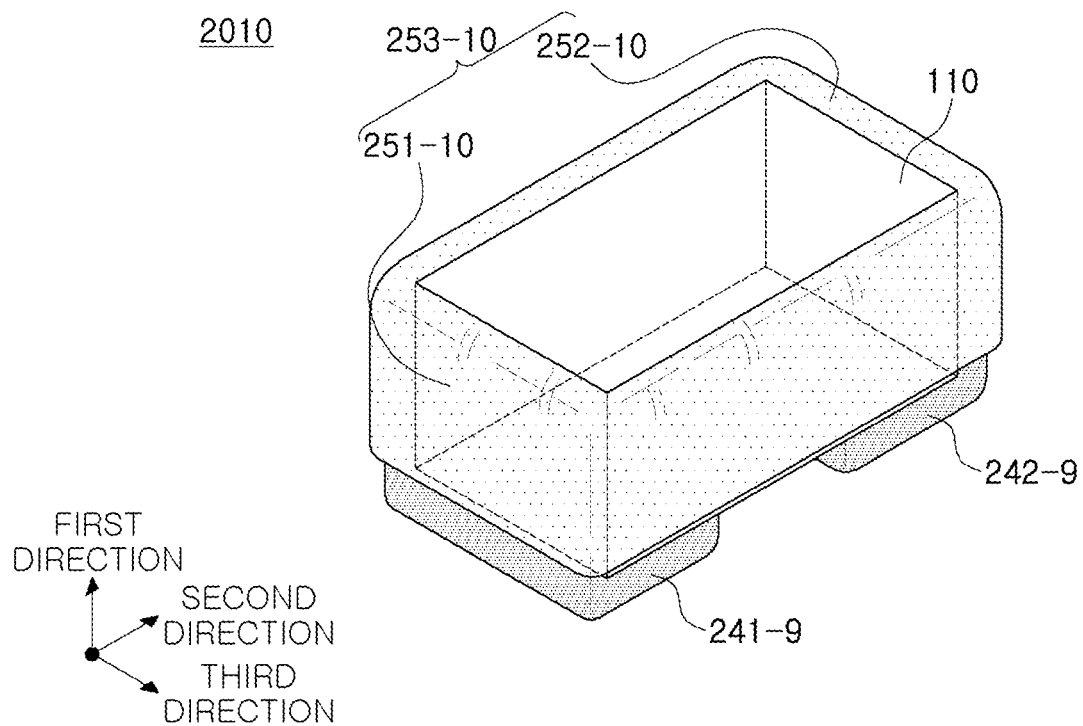
FIG. 38 illustrates a modified example of FIG. 36.

FIG. 38 illustrates a modified example of FIG. 36. Referring to FIG. 38, in a modified example 2010 of the multilayer electronic component 2009 according to another exemplary embodiment of the present disclosure, first and second insulating layers 251-10 and 252-10 may be extended to the fifth and sixth surfaces 5 and 6 and connected to each other to be a single insulating layer 253-10.

Figure 39:
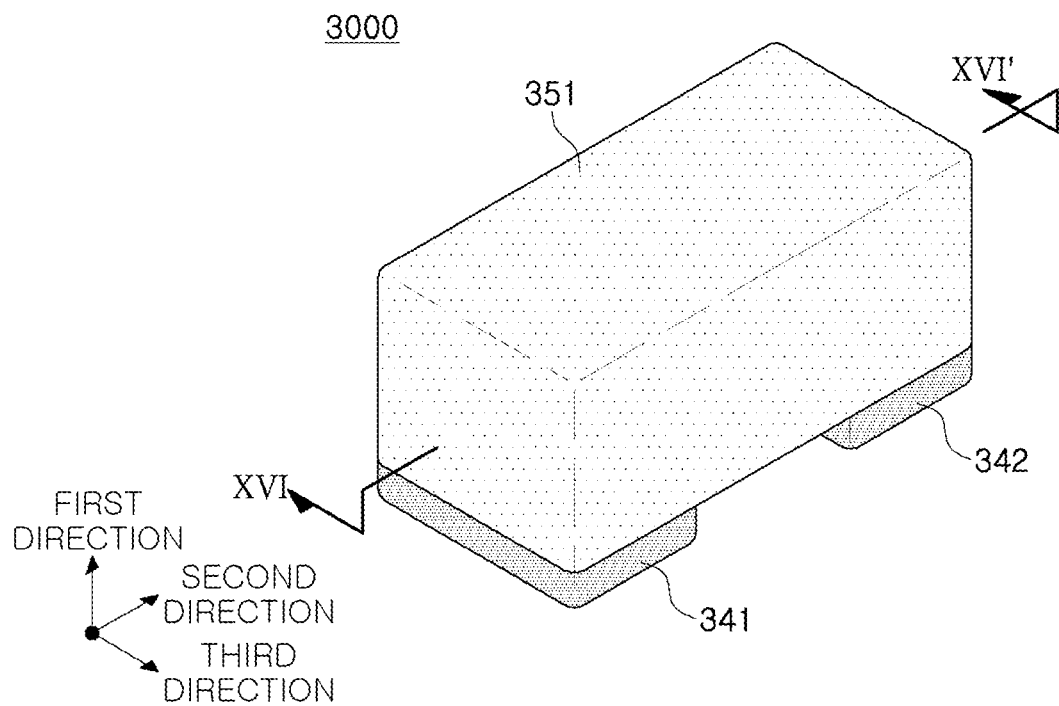
FIG. 39 is a perspective view schematically illustrating a multilayer electronic component according to another exemplary embodiment of the present disclosure.
Figure 40:
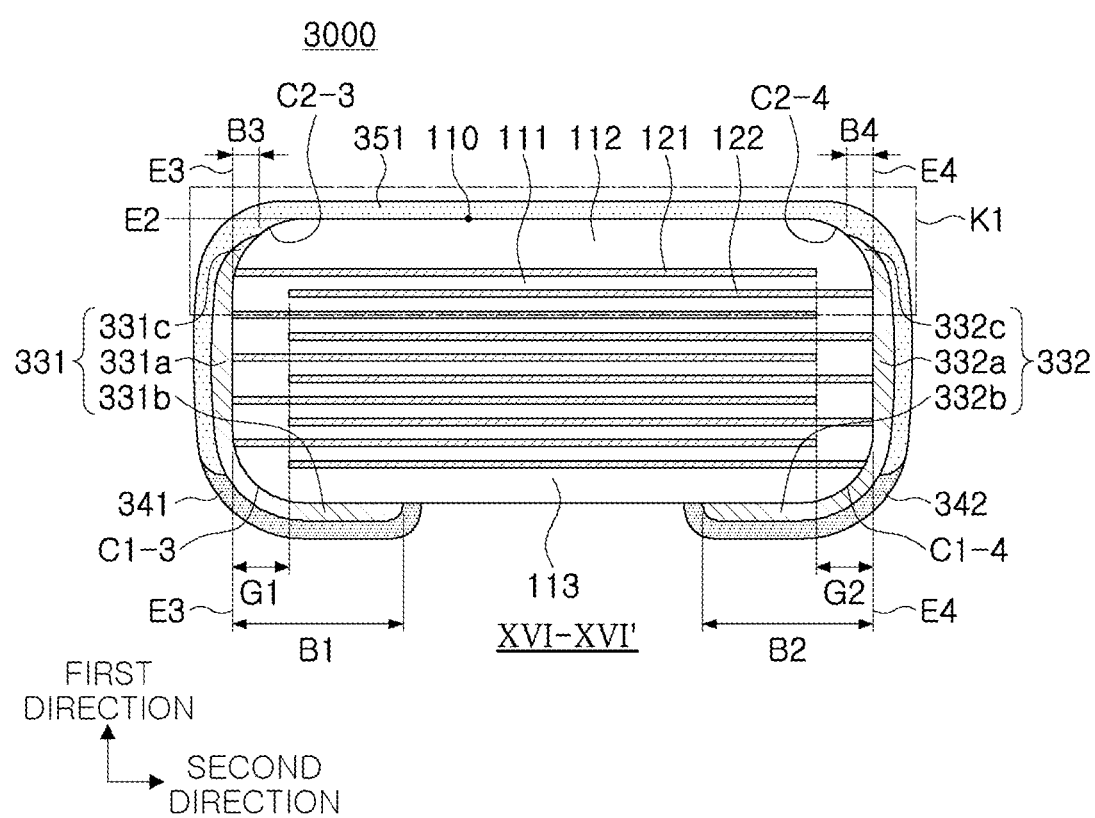
FIG. 40 is a cross-sectional view taken along line XVI-XVI' of FIG. 39.

FIG. 39 is a perspective view schematically illustrating a multilayer electronic component 3000 according to another exemplary embodiment of the present disclosure; FIG. 40 is a cross-sectional view taken along line XVI-XVI' of FIG. 39; and FIG. 41 is an enlarged view of a region K1 of FIG. 40.

Figure 41:
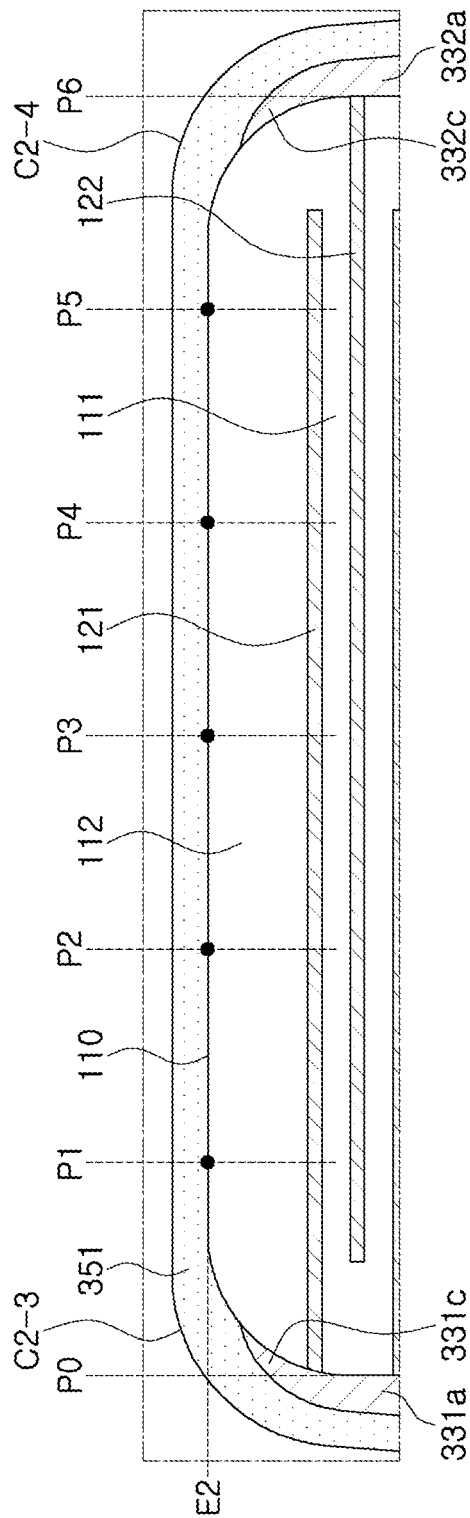
FIG. 41 is an enlarged view of a region K1 of FIG. 40.

Referring to FIGS. 39 through 41, the multilayer electronic component 3000 according to another exemplary embodiment of the present disclosure may include: a body 110 including a dielectric layer 111 and first and second internal electrodes 121 and 122 alternately disposed while having the dielectric layer 111 interposed therebetween, and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction; a first external electrode 331 including a first connection portion 331a disposed on the third surface 3, a first band portion 331b extended from the first connection portion 331a onto a portion of the first surface 1, and a first corner portion 331c extended from the first connection portion 331a onto a corner connecting the second and third surfaces 2 and 3 of the body to each other; a second external electrode 332 including a second connection portion 332a disposed on the fourth surface 4, a second band portion 332b extended from the second connection portion 332a onto a portion of the first surface 1, and a second corner portion 332c extended from the second connection portion 332a onto a corner connecting the second and fourth surfaces 2 and 4 of the body to each other; an insulating layer 351 disposed on the first and second connection portions 331a and 332a, and covering the second surface 2 and the first and second corner portions 331c and 332c; a first plating layer 341 disposed on the first band portion 331b; and a second plating layer 342 disposed on the second band portion 332b. The insulating layer 351 may include silicone-based resin.

In another exemplary embodiment, B3≤G1 and B4≤G2 when B3 indicates an average size of the first corner portion 331c in the second direction, measured from the extension line E3 of the third surface 3 to an end of the corner portion 331c, B4 indicates an average size of the second corner portion 332c in the second direction, measured from the extension line of the fourth surface 4 to an end of the corner portion 332c, G1 indicates the average size of the region in the second direction, where the third surface 3 and the second internal electrode 122 are spaced apart from each other, and G2 indicates the average size of the region in the second direction, where the fourth surface 4 and the first internal electrode 121 are spaced apart from each other. Accordingly, it is possible to minimize volumes of the external electrodes 331 and 332, thereby increasing the capacitance of the multilayer electronic component 3000 per unit volume.

Here, B1≥G1 and B2≥G2 when B1 indicates an average size of the first band portion 331b in the second direction, measured from the extension line E3 of the third surface 3 to an end of the first band portion 331b, and B2 indicates an average size of the second band portion 332b in the second direction, measured from the extension line E4 of the fourth surface 4 to an end of the second band portion 332b. Accordingly, it is possible to improve the bonding strength by increasing the area in which the multilayer electronic component is in contact with the solder when the multilayer electronic component is mounted on the board.

The multilayer electronic component 3000 according to another exemplary embodiment may include the body 110 including the dielectric layer 111 and the first and second internal electrodes 121 and 122 alternately disposed while having the dielectric layer 111 interposed therebetween, and including the first and second surfaces 1 and 2 opposing each other in the first direction, the third and fourth surfaces 3 and 4 connected to the first and second surfaces 1 and 2 and opposing each other in the second direction, the fifth and sixth surfaces 5 and 6 connected to the first to fourth surfaces 1 to 4 and opposing each other in the third direction. The body 110 of the multilayer electronic component 3000 may have the same configuration as the body 110 of the multilayer electronic component 1000, except that an end of the first or second surface of the body is contracted, as described below.

The external electrodes 331 and 332 may respectively be disposed on the third surface 3 and fourth surface 4 of the body 110. The external electrodes 331 and 332 may be the first and second external electrodes 331 and 332 respectively disposed on the third and fourth surfaces 3 and 4 of the body 110, and respectively connected to the first and second internal electrodes 121 and 122.

The external electrodes 331 and 332 may be the first external electrode 331 including the first connection portion 331a disposed on the third surface 3, the first band portion 331b extended from the first connection portion 331a onto a portion of the first surface 1, and the first corner portion 331c extended from the first connection portion 331a onto the corner connecting the second and third surfaces 2 and 3 to each other; and the second external electrode 332 including the second connection portion 332a disposed on the fourth surface 4, the second band portion 332b extended from the second connection portion 332a onto a portion of the first surface 1, and the second corner portion 332c extended from the second connection portion 332a onto the corner connecting the second and fourth surfaces 2 and 4 to each other. The first connection portion 331a may be connected to the first internal electrode 121 on the third surface 3, and the second connection portion 332a may be connected to the second internal electrode 122 on the fourth surface 4.

In another exemplary embodiment, the first or second connection portion 331a or 332a may be spaced apart from the fifth and sixth surfaces 5 and 6. Accordingly, the multilayer electronic component 3000 may have a further smaller size by minimizing proportions of the external electrodes 331 and 332.

The margin regions in which none of the internal electrodes 121 and 122 is disposed may overlap each other on the dielectric layer 111, and the step difference may thus occur due to the thicknesses of the internal electrodes 121 and 122. Accordingly, the corners connecting the first surface and the third to sixth surfaces and/or the corners connecting the second surface and the third to the fifth surface may be contracted toward the center of the body 110 in the first direction, based on the first surface or the second surface. Alternatively, due to the contraction phenomenon in the sintering process of the body, the corners connecting the first surface 1 and the third to sixth surfaces 3, 4, 5 and 6 to each other and/or the corners connecting the second surface 2 and the third to the sixth surfaces 3, 4, 5 and 6 to each other may be contracted toward the center of the body 110 in the first direction, based on the first surface or the second surface. Alternatively, the separate process may be performed to round the corners connecting respective surfaces of the body 110 to each other in order to prevent the chipping defect or the like, and the corners connecting the first and third to sixth surfaces to each other and/or the corners connecting the second surface and the third to sixth surfaces to each other may thus each have the round shape.

The corners may include the 1-3 corner c1-3 connecting the first surface and the third surface to each other, the 1-4 corner c1-4 connecting the first surface and the fourth surface to each other, the 2-3 corner c2-3 connecting the second surface and the third surface to each other, and the 2-4 corner c2-4 connecting the second surface and the fourth surface to each other. In addition, the corners may include the 1-5 corner connecting the first surface and the fifth surface to each other, the 1-6 corner connecting the first surface and the sixth surface to each other, the 2-5 corner connecting the second surface and the fifth surface to each other, and the 2-6 corner connecting the second surface and the sixth surface to each other. However, in order to suppress the step difference caused by the internal electrodes 121 and 122, the internal electrodes may be stacked on each other and then cut to be exposed to the fifth and sixth surfaces 5 and 6 of the body, and one dielectric layer or two or more dielectric layers may be stacked on both the sides of the capacitance formation portion Ac in the third direction (i.e., the width direction) to form the margin portions 114 and 115. In this case, the corner connecting the first surface and the fifth or sixth surface to each other and the corner connecting the second surface and the fifth or sixth surface to each other may not be contracted.

Meanwhile, the first to sixth surfaces of the body 110 may generally be the flat surfaces, and the non-flat regions may be the corners. In addition, the region of the external electrode 131 or 132, disposed on the corner of the body 110 may be the corner portion.

In this regard, the first or second connection portion 331c or 332c may be spaced apart from the extension line E2 of the second surface 2, and the first or second connection portion 331c or 332c may be spaced apart from the second surface 2. That is, none of the external electrodes 331 and 332 may be disposed on the second surface to further minimize the volumes of the external electrodes 331 and 332, thereby further increasing the capacitance of the multilayer electronic component 3000 per unit volume. In addition, the first corner portion 331c may be disposed on a portion of the 2-3 corner C2-3 connecting the third surface and the second surface to each other, and the second corner portion 332c may be disposed on a portion of the 2-4 corner C2-4 connecting the fourth surface and the second surface to each other.

The extension line E2 of the second surface may be defined as follows.

The extension line E2 of the second surface may indicate a straight line passing through a point where P2 and the second surface meet each other and a point where P4 and the second surface meet each other when drawing seven straight lines P0, P1, P2, P3, P4, P5, P6 and P7 in the thickness direction to have equal intervals from the third surface to the fourth surface in the length direction in the length-thickness cross section (i.e., L-T cross section) cut in a center of the multilayer electronic component 3000 in the width direction.

Meanwhile, the external electrode 331 or 332 may be made of any material having the electrical conductivity such as the metal, may use the specific material determined in consideration of the electrical characteristic, the structural stability or the like, and may have the multilayer structure.

The external electrode 331 or 332 may be a fired electrode including conductive metal and glass, or a resin-based electrode including the conductive metal and resin.

In addition, the external electrode 331 or 332 may be made by sequentially forming the fired electrode and the resin-based electrode on the body. In addition, the external electrode 331 or 332 may be formed by transferring a sheet including the conductive metal to the body or by transferring the sheet including the conductive metal to the fired electrode.

The conductive metal included in the external electrode 331 or 332 may use the material having the excellent electrical conductivity, and is not particularly limited. For example, the conductive metal may be at least one of copper (Cu), nickel (Ni), palladium (Pd), silver (Ag), tin (Sn), chromium (Cr) and alloys thereof. The external electrode 331 or 332 may include at least one of nickel (Ni) and an alloy of nickel (Ni), thereby further improving its connectivity with the internal electrode 121 or 122 including nickel (Ni).

The insulating layer 351 may be disposed on the first and second connection portions 331a and 332a.

The first or second connection portion 331a or 332a may be a portion connected to the internal electrode 121 or 122, and thus be a pathway for the penetration of the plating solution in the plating process or the penetration of the moisture when the multilayer electronic component is actually used. In the present disclosure, the insulating layer 351 may be disposed on the connection portions 331a and 332a, thereby preventing the penetration of the external moisture or the penetration of the plating solution.

The insulating layer 351 may be in contact with the first and second plating layers 341 and 342. Here, the insulating layer 351 may be in contact with the first and second plating layers 341 and 342 to partially cover the ends thereof, or the first and second plating layers 341 and 342 may be in contact with the insulating layer 351 to partially cover the end thereof.

The insulating layer 353 may be disposed on the first and second connection portions 331a and 332a, and may cover the second surface and the first and second corner portions 331c and 332c. In addition, the insulating layer 353 may cover a region where an end of the first or second corner portion 331c or 332c and the body 110 are in contact with each other to prevent the pathway for the penetration of the moisture, thereby further improving the moisture resistance reliability of the multilayer electronic component.

The insulating layer 351 may be disposed on the second surface and extended to the first and second connection portions 331a and 332a. In addition, the insulating layer may cover the entire second surface when none of the external electrodes 331 and 332 is disposed on the second surface. Meanwhile, the insulating layer 351 may not be necessarily disposed on the second surface, the insulating layer may not be disposed on the partial or entire second surface, and the insulating layer may be separated into two layers and disposed on each of the first and second connection portions 331a and 332a. However, even in this case, the insulating layer may cover the entire first and second corner portions 331c 332c. The insulating layer may be disposed below the extension line of the second surface when not disposed on the entire second surface. In addition, even when not disposed on the second surface, the insulating layer may be disposed on the first and second connection portions 331a and 332a and extended to the fifth and sixth surfaces to be a single insulating layer.

In another exemplary embodiment, the insulating layer 351 may cover the partial fifth and sixth surfaces to improve the reliability of the multilayer electronic component. Here, portions of the fifth and sixth surfaces, which are not covered by the insulating layer 151, may be externally exposed.

Further, the insulating layer 351 may cover the entire fifth and sixth surfaces. In this case, none of the fifth and sixth surfaces may be externally exposed to further improve the moisture resistance reliability.

The insulating layer 351 may serve to prevent the plating layers 341 and 342 from being formed on the external electrodes 331 and 332 on which the insulating layer 351 is disposed, and improve the sealing characteristic to minimize the penetration of the external moisture, plating solution or the like. The component, composition, average thickness and resultant effect of the insulating layer 351 may be the same as those the insulating layer 151, 251, 252 or 253 included in the multilayer electronic component 1000 or 2000 and various embodiments thereof, and descriptions thereof are thus omitted.

The first and second plating layers 341 and 342 may respectively be disposed on the first and second band portions 331b and 332b. The plating layers 341 and 342 may allow the multilayer electronic component to be more easily mounted on the board, be disposed on the band portions 331b and 332b to minimize the space in which the multilayer electronic component is mounted, and minimize the penetration of the plating solution to the internal electrode, thereby improving the reliability of the multilayer electronic component. One end of the first and second plating layer 341 or 342 may be in contact with the first surface, and the other end thereof may be in contact with the insulating layer 351.

The plating layer 341 or 342 is not limited to a particular type, may include at least one of copper (Cu), nickel (Ni), tin (Sn), silver (Ag), gold (Au), palladium (Pd) and alloys thereof, or may include a plurality of layers.

As a more specific example of the plating layer 341 or 342, the plating layer 341 or 342 may be a nickel (Ni) plating layer or a tin (Sn) plating layer, and may have the Ni plating layer and the Sn plating layer sequentially formed on the first and second band portion 331b or 332b.

In another exemplary embodiment, the first plating layer 341 may cover an end of the insulating layer 351, disposed on the first external electrode 331, and the second plating layer 342 may cover an end of the insulating layer 351, disposed on the second external electrode 332. Accordingly, it is possible to strengthen a bonding force of the insulating layer 351 and the plating layer 341 or 342, thereby improving the reliability of the multilayer electronic component 3000. In addition, it is possible to first form the insulating layer 351 before forming the plating layer 341 or 342 on the external electrode 331 or 332, thereby more reliably suppressing the penetration of the plating solution in the process of forming the plating layer. As the insulating layer is formed before the plating layer, the plating layer 341 or 342 may cover the end of the insulating layer 351.

In another exemplary embodiment, the insulating layer 351 may cover an end of the first plating layer 341, disposed on the first external electrode 331, and the insulating layer 351 may cover an end of the second plating layer 342, disposed on the second external electrode 332. Accordingly, it is possible to strengthen the bonding force of the insulating layer 351 and the plating layer 341 or 342, thereby improving the reliability of the multilayer electronic component 3000.

In another exemplary embodiment, the first and second plating layers 341 and 342 may respectively be extended to partially cover the first and second connection portions 331a and 332a. $H1 \geq H2$ when H1 indicates the average size of the internal electrode in the first direction, disposed closest to the first surface 1 among the first and second internal electrodes 121 and 122, and H2 indicates the average size of the first or second plating layer 341 or 342 in the first direction, measured from the extension line E1 of the first surface 1 to an end of the plating layer disposed on the first or second connection portion 331a or 332a. Accordingly, it is possible suppress the plating solution from penetrating into the internal electrode during the plating process, thereby allowing the multilayer electronic component to have the improved reliability.

In another exemplary embodiment, $H1<H2$ when H1 indicates the average size of the region in the first direction, measured from the first surface 1 to the internal electrode disposed closest to the first surface among the first and second internal electrodes 121 and 122, and H2 indicates the average size of the plating layer 341 or 342 in the first direction, measured from the extension line E1 of the first surface to the end of the plating layer 341 or 342 disposed on the first or second connection portion 331a or 332a. Accordingly, it is possible to improve the bonding strength by increasing the area in which the multilayer electronic component is in contact with the solder when the multilayer electronic component is mounted on the board. $H2<T/2$ when T indicates the average size of the body 110 in the first direction. That is, $H1<H2<T/2$. The reason is that the moisture resistance reliability improved by the insulating layer may be reduced when H2 is T/2 or more.

In another exemplary embodiment, the first and second plating layers 341 and 342 may be disposed on a level the same as or below the extension line of the first surface. Accordingly, it is possible to minimize the height of the solder when the multilayer electronic component is mounted on the board and to minimize the space in which the multilayer electronic component is mounted. In addition, the insulating layer 351 may be extended below the extension line of the first surface to be in contact with the first and second plating layers 341 and 342.

In another exemplary embodiment, $0.2 \leq B1/L \leq 0.4$ and $0.2 \leq B2/L \leq 0.4$ when L indicates the average size of the body 110 in the second direction, B1 indicates an average size of the first band portion 331b in the second direction, measured from the extension line E3 of the third surface 3 to an end of the first band portion 331b, and B2 indicates an average size of the second band portion 332b in the second direction, measured from the extension line E4 of the fourth surface 4 to an end of the second band portion 332b.

When B1/L and B2/L are less than 0.2, it may be difficult to secure the sufficient bonding strength. On the other hand, when B2/L is greater than 0.4, the leakage current may occur between the first band portion 331b and the second band portion 332b under the high-voltage current, and the first band portion 331b and the second band portion 332b may be electrically connected with each other due to the plating spread or the like during the plating process.

In another exemplary embodiment, the multilayer electronic component may further include an additional insulating layer disposed on the first surface and between the first band portion 331b and the second band portion 332b. Accordingly, it is possible to prevent the leakage current or the like which may occur between the first band electrode 331b and the second band electrode 332b under the high-voltage current.

The additional insulating layer may not need to be limited to a particular type. For example, the additional insulating layer may include the silicon-based resin. However, it is not necessary to limit the additional insulating layer and the insulating layer 351 to the same material, and the two insulating layers may be made of materials different from each other. For example, the additional insulating layer may include one or more selected from epoxy resin, acrylic resin, ethyl cellulose or the like, or may include glass.

In another exemplary embodiment, B3<B1 and B4<B2 when B1 indicates an average size of the first band portion 331b in the second direction, measured from the extension line E3 of the third surface 3 to an end of the first band portion 331b, and B2 indicates an average size of the second band portion 332b in the second direction, measured from the extension line E4 of the fourth surface 4 to an end of the second band portion 332b. The average length B1 of the first band portion 331b may be longer than the average length B3 of the first corner portion 331c, and the average length B2 of the second band portion 332b may be longer than the average length B4 of the second corner portion 332c. Accordingly, it is possible to improve the bonding strength by increasing the area in which the multilayer electronic component is in contact with the solder when the multilayer electronic component is mounted on the board.

In more detail, B3<B1 and B4<B2 when B1 indicates the average size of the first band portion 331b in the second direction, measured from the extension line E3 of the third surface 3 to the end of the first band portion 331b, B2 indicates the average size of the second band portion 332b in the second direction, measured from the extension line E4 of the fourth surface 4 to the end of the second band portion 332b, B3 indicates the average size of the first corner portion 331c in the second direction, measured from the extension line E3 of the third surface 3 to an end of the first corner portion 331c, and B4 indicates the average size of the second corner portion 332c in the second direction, measured from the extension line E4 of the fourth surface 4 to an end of the second corner portion 332c.

In another exemplary embodiment, an average thickness of the first or second plating layer 341 or 342 may be smaller than the average thickness of the insulating layer 351.

The insulating layer 351 may serve to prevent the penetration of the external moisture or plating solution. However, the insulating layer 351 may have weak connectivity with the plating layer 341 or 342, which may cause delamination of the plating layer. When the plating layer is delaminated, the bonding strength of the multilayer electronic component with the board 180 may be reduced. Here, the delamination of the plating layer may indicate that the plating layer is partially dropped or physically separated from the external electrode 331 or 332. The connectivity between the plating layer and the insulating layer may be weak. In this case, it may increase the possibility that a gap between the insulating layer and the plating layer is widened or that a foreign material may infiltrate, which may allow the plating layer to be vulnerable to an external impact and then delaminated.

According to another exemplary embodiment of the present disclosure, the plating layer may have the average thickness made smaller than the average thickness of the insulating layer, thereby reducing the area in which the plating layer and the insulating layer are in contact with each other. It is thus possible to suppress the occurrence of the delamination, thereby improving the bonding strength of the multilayer electronic component 3000 with the board.

The multilayer electronic component 3000 may not need to be limited to a particular size.

However, in order for the multilayer electronic component to have the smaller size and simultaneously have the higher capacitance, it is necessary to increase the number of stacks by allowing the dielectric layer and the internal electrode to each have the smaller thickness. The multilayer electronic component 3000 having a size of 1005 (i.e., length×width of 1.0 mm×0.5 mm) or less may thus have the more remarkably improved reliability and the capacitance per unit volume according to the present disclosure.

Therefore, in consideration of the manufacturing error, the size of the external electrode and the like, when having the length of 1.1 mm or less and the width of 0.55 mm or less, the multilayer electronic component 3000 may have the more remarkably improved reliability according to the present disclosure. Here, the length of the multilayer electronic component 3000 may indicate the maximum size of the multilayer electronic component 3000 in the second direction, and the width of the multilayer electronic component 3000 may indicate the maximum size of the multilayer electronic component 3000 in the third direction.

As set forth above, the present disclosure may provide the multilayer electronic component having the higher reliability and the improved capacitance per unit volume by including the insulating layer disposed on the connection portion of the external electrode and the plating layer disposed on the band portion of the external electrode.

The present disclosure may also provide the multilayer electronic component which may be mounted in the minimal space.

The present disclosure may also provide the multilayer electronic component which may include the external electrode including at least one of nickel (Ni) and the alloy of nickel (Ni), thereby suppressing the occurrence and propagation of radiation cracking.

The present disclosure may also provide the multilayer electronic component in which at least one of nickel (Ni) and the alloy of nickel (Ni) is included between the external electrode and the third and fourth surfaces of the body, thereby suppressing the occurrence and propagation of radiation cracking.

The term "an exemplary embodiment" used herein does not refer to the same exemplary embodiment, and is provided to emphasize a particular feature different from that of another exemplary embodiment. However, exemplary embodiments provided herein may be implemented by being combined in whole or in part one with one another. For example, one element described in a particular exemplary embodiment may be understood as a description related to another exemplary embodiment even if it is not described in another exemplary embodiment, unless an opposite or contradictory description is provided therein.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
   a first external electrode including a first connection portion disposed on the third surface and a first band portion extended from the first connection portion onto a portion of the first surface;

a second external electrode including a second connection portion disposed on the fourth surface and a second band portion extended from the second connection portion onto a portion of the first surface;

a first insulating layer disposed on the first connection portion;

a second insulating layer disposed on the second connection portion;

a first plating layer disposed on the first band portion;

a second plating layer disposed on the second band portion;

a first additional electrode layer disposed between the first connection portion and the third surface; and a second additional electrode layer disposed between the second connection portion and the fourth surface, wherein the first insulating layer and the second insulating layer include glass, wherein the first or second external electrode includes copper (Cu), and the first or second additional electrode layer includes at least one of nickel (Ni) and an alloy of nickel (Ni), wherein the glass included in the first and second insulating layers include Si, and wherein the molar fraction of Si included in the first and second insulating layers is 20 mol % or more and 65 mol % or less.

2. The multilayer electronic component of claim 1, wherein H1≥H2 in which H1 indicates an average size of a region in the first direction, measured from the first surface to an internal electrode disposed closest to the first surface among the first and second internal electrodes, and H2 indicates an average size of the first or second plating layer in the first direction, measured from an extension line of the first surface to an end of the first or second plating layer disposed on the first or second connection portion.

3. The multilayer electronic component of claim 1, wherein H1<H2 in which H1 indicates an average size of a region in the first direction, measured from the first surface to an internal electrode disposed closest to the first surface among the first and second internal electrodes, and H2 indicates an average size of the first or second plating layer in the first direction, measured from an extension line of the first surface to an end of the first or second plating layer disposed on the first or second connection portion.

4. The multilayer electronic component of claim 1, wherein the first or second plating layer is disposed below an extension line of the first surface.

5. The multilayer electronic component of claim 1, wherein 0.2≤B1/L≤0.4 and 0.2≤B2/L≤0.4 in which L indicates an average size of the body in the second direction, B1 indicates an average size of the first band portion in the second direction, measured from an extension line of the third surface to an end of the first band portion, and B2 indicates an average size of the second band portion in the second direction, measured from an extension line of the fourth surface to an end of the second band portion.

6. The multilayer electronic component of claim 1, further comprising an additional insulating layer disposed on the first surface and between the first band portion and the second band portion.

7. The multilayer electronic component of claim 1, wherein the dielectric layer has an average thickness of 0.35 µm or less.

8. The multilayer electronic component of claim 1, wherein the first or second internal electrode has an average thickness of 0.35 µm or less.

9. The multilayer electronic component of claim 1, wherein the body further includes:

a capacitance formation portion including the first and second internal electrodes alternately disposed while having the dielectric layer interposed therebetween, and a cover portion disposed on each of two surfaces of the capacitance formation portion in the first direction, wherein the cover portion has an average size of 15 µm or less in the first direction.

10. The multilayer electronic component of claim 1, wherein the first or second plating layer has an average thickness lower than an average thickness of the first and second insulating layer.

11. The multilayer electronic component of claim 1, wherein the first plating layer is disposed to cover an end close to the first surface of the first insulating layer, and the second plating layer is disposed to cover an end close to the first surface of the second insulating layer.

12. The multilayer electronic component of claim 1, wherein the first insulating layer is disposed to cover the end disposed on the first external electrode of the first plating layer, and the second insulating layer covers the end disposed on the second external electrode of the second plating layer.

13. The multilayer electronic component of claim 1, wherein the first external electrode includes a first side band portion extended from the first connection portion onto portions of the fifth and sixth surfaces, the second external electrode includes a second side band portion extended from the second connection portion onto portions of the fifth and sixth surfaces, and the first or second side band portion has a size increased in the second direction as being closer to the first surface.

14. The multilayer electronic component of claim 1, wherein the first or second external electrode is spaced apart from the fifth and sixth surfaces.

15. The multilayer electronic component of claim 1, wherein the first or second external electrode is spaced apart from the second surface.

16. The multilayer electronic component of claim 1, wherein the first and second insulating layers extend to the fifth and sixth surfaces and are connected to each other.

17. The multilayer electronic component of claim 1, wherein the first and second insulating layer are not disposed on the second, fifth and sixth surfaces.

18. The multilayer electronic component of claim 1, wherein the body has a 1-3 corner connecting the first and third surfaces to each other, a 1-4 corner connecting the first and fourth surfaces to each other, a 2-3 corner connecting the second and third surfaces to each other, and a 2-4 corner connecting the second surface and the fourth surface to each other, the 1-3 corner and the 2-3 corner are contracted toward a center of the body in the first direction as being closer to the third surface, and the 1-4 corner and the 2-4 corner are contracted toward the center of the body in the first direction as being closer to the fourth surface, and the first external electrode includes a corner portion disposed on the 1-3 corner and a corner portion extended from the first connection portion onto the 2-3 corner, and the second external electrode includes a corner portion disposed on the 1-4 corner and a corner portion extended from the second connection portion onto the 2-4 corner.

19. The multilayer electronic component of claim 18, of wherein B3≤G1 and B4≤G2 in which B3 indicates an average size of the first corner portion in the second direction, measured from an extension line of the third surface to an end of the first corner portion, B4 indicates an average size of the second corner portion in the second direction, measured from an extension line of the fourth surface to an end of the second corner portion, G1 indicates an average size of a region in the second direction, where the third surface and the second internal electrode are spaced apart from each other, and G2 indicates an average size of a region in the second direction, where the fourth surface and the first internal electrode are spaced apart from each other.

20. The multilayer electronic component of claim 1, wherein the first external electrode includes a first connection electrode disposed on the third surface and a first band electrode disposed on the first surface and connected to the first connection electrode,
the second external electrode includes a second connection electrode disposed on the fourth surface and a second band electrode disposed on the first surface and connected to the second connection electrode.

21. The multilayer electronic component of claim 20, wherein the first and second connection electrodes are spaced apart from the fifth and sixth surfaces.

22. The multilayer electronic component of claim 20, wherein the first and second connection electrodes are spaced apart from the second surface.

23. The multilayer electronic component of claim 20, wherein the first external electrode further includes a third band electrode disposed on the second surface and connected to the first connection electrode and,
wherein the second external electrode further includes a fourth band electrode disposed on the second surface and connected to the second connection electrode.

24. The multilayer electronic component of claim 20, wherein the first connection electrode and the second connection electrode include the same metal as the metal included in the internal electrode.

25. The multilayer electronic component of claim 20, wherein the first band electrode and the second band electrode are firing electrodes containing conductive metal and glass.

26. The multilayer electronic component of claim 20, wherein the first connection electrode and the second connection electrode are firing electrodes containing conductive metal and glass.

27. The multilayer electronic component of claim 20, wherein the first band electrode and the second band electrode are plating layers.

28. The multilayer electronic component of claim 20, wherein the first connection electrode and the second connection electrode are plating layers.

29. The multilayer electronic component of claim 1, wherein the first external electrode further includes a third band portion extending from the first connection portion to a portion of the second surface, and
wherein the second external electrode further includes a fourth band portion extending from the second connection portion to a portion of the second surface.

30. A multilayer electronic component comprising:
a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface and a first band portion extended from the first connection portion onto a portion of the first surface;
a second external electrode including a second connection portion disposed on the fourth surface and a second band portion extended from the second connection portion onto a portion of the first surface;
a first insulating layer disposed on the first connection portion;
a second insulating layer disposed on the second connection portion;
a first plating layer disposed on the first band portion;
a second plating layer disposed on the second band portion;
a first additional electrode layer disposed between the first connection portion and the third surface; and
a second additional electrode layer disposed between the second connection portion and the fourth surface,
wherein the first insulating layer and the second insulating layer include glass,
wherein the first or second external electrode includes copper (Cu), and the first or second additional electrode layer includes at least one of nickel (Ni) and an alloy of nickel (Ni),
wherein H1<H2 in which H1 indicates an average size of a region in the first direction, measured from the first surface to an internal electrode disposed closest to the first surface among the first and second internal electrodes, and H2 indicates an average size of the first or second plating layer in the first direction, measured from an extension line of the first surface to an end of the first or second plating layer disposed on the first or second connection portion, and
wherein H2<T/2 in which T indicates an average size of the body in the first direction.

* * * * *